United States Patent [19]

Tump

[11] Patent Number: 4,882,784
[45] Date of Patent: Nov. 21, 1989

[54] LOSS-IN-WEIGHT FEEDER SYSTEM

[75] Inventor: Ronald S. Tump, Whitewater, Wis.

[73] Assignee: Moksnes Manufacturing Co., Inc., Whitewater, Wis.

[21] Appl. No.: 117,077

[22] Filed: Nov. 4, 1987

[51] Int. Cl.[4] .................... G01G 11/08; G01G 13/16; G06F 15/20

[52] U.S. Cl. .................... 364/567; 177/105; 198/504; 198/505; 222/58; 364/479

[58] Field of Search ............... 177/16, 105, 114, 122, 177/123; 198/504, 505; 222/56, 58; 364/479, 567

[56] References Cited

U.S. PATENT DOCUMENTS

| | | | |
|---|---|---|---|
| Re. 30,967 | 6/1982 | Ferrara et al. | 222/58 |
| Re. 32,101 | 4/1986 | Ricciardi et al. | 177/50 X |
| Re. 32,102 | 4/1986 | Ricciardi et al. | 222/56 |
| 3,855,458 | 12/1974 | Motter et al. | 364/567 X |
| 3,889,848 | 6/1975 | Ricciardi et al. | 222/58 |
| 3,967,758 | 7/1976 | Ferrara et al. | 222/58 |
| 3,985,266 | 10/1976 | Wright, Jr. | 198/504 X |
| 4,054,784 | 10/1977 | Ricciardi et al. | 222/58 X |
| 4,100,984 | 7/1978 | Klopfenstein et al. | 177/123 X |
| 4,111,272 | 9/1978 | Ricciardi et al. | 177/50 X |
| 4,111,336 | 9/1978 | Ward et al. | 222/58 |
| 4,320,855 | 3/1982 | Ricciardi et al. | 222/58 X |
| 4,524,886 | 6/1985 | Wilson et al. | 222/58 |
| 4,552,235 | 11/1985 | Brunnschweiler | 177/114 X |
| 4,579,252 | 4/1986 | Wilson et al. | 177/114 X |
| 4,580,698 | 4/1986 | Ladt et al. | 177/16 X |
| 4,635,819 | 1/1987 | Wilson et al. | 222/58 |

Primary Examiner—Parshotam S. Lall
Assistant Examiner—Edward R. Cosimano
Attorney, Agent, or Firm—Foley & Lardner

[57] ABSTRACT

A loss-in-weight feeder for discharging a flowable substance from a reservoir through a controllable discharge member under regulated conditions is comprised of a scale for producing signals representative of the weight of material in the feeder, such weight signals being digitized by a digital converter, the output of which accumulated and fed into a computer and storage device for establishing the actual rate of the feeder, comparing the actual feed rate with a desired feed rate input into the storage device, and developing a correction signal based on any deviation between the actual and desired feed rates and applied to the feeder to adjust the actual feed rate through the discharge member.

19 Claims, 83 Drawing Sheets

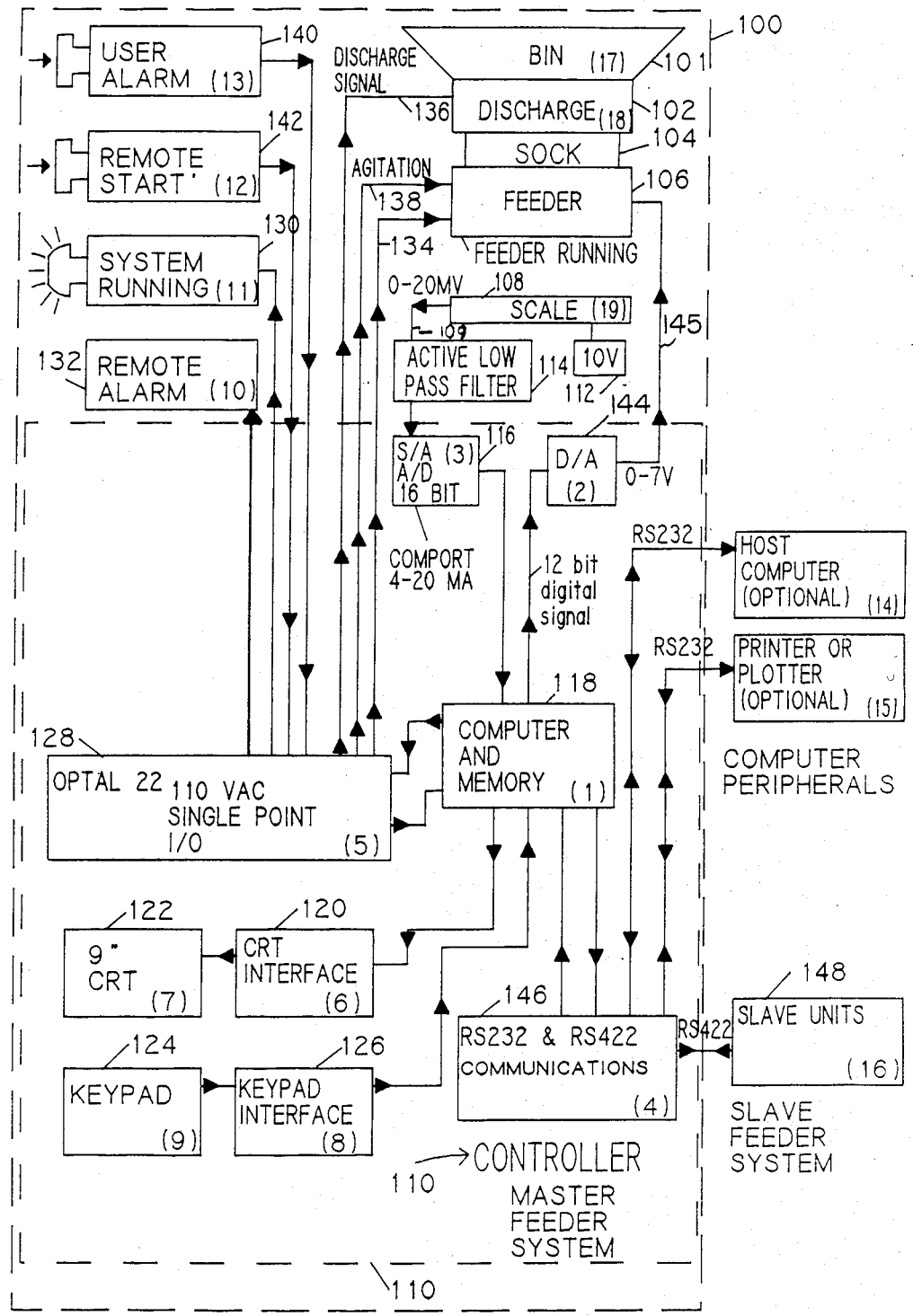

FIG. 3A

| | | 300 |
|---|---|---|
| MODE | 0=GRAVIMETRIC | 1=VOLUMETRIC | 2=BATCHING | 301 |
| | MAXI / FEED | 302 |
| | MINI / FEED | 304 |
| %SLAVE | GRAVIMETRIC MODE | VOLUMETRIC MODE | BATCHING MODE | 306 |
| SLAVES | MASTER UNIT | SLAVE ONE UNIT ADDRESS | SLAVE TWO UNIT ADDRESS | SLAVE THREE UNIT ADDRESS | SLAVE FOUR UNIT ADDRESS | SLAVE FIVE UNIT ADDRESS | SLAVE SIX UNIT ADDRESS | SLAVE SEVEN UNIT ADDRESS | NOT USED | 308 |
| | LSBT | 310 |
| %TOL | GRAVIMETRIC MODE | VOLUMETRIC MODE | BATCHING MODE | 312 |
| %TOL/SHUT | GRAVIMETRIC MODE | VOLUMETRIC MODE | BATCHING MODE | 314 |
| | FULL | 316 |
| | OV/FIL | 318 |
| | REFILL | 320 |
| | LOW/SHUT | 322 |
| | TOTAL/DATE | 324 |
| | # SLAVES | 326 |
| | DEC | 328 |

FIG. 3B

| | |
|---|---|
| 2DECT | 330 |
| SAMP/INT | 332 |
| MAX/DIG | 334 |
| MIN/DIGA | 336 |
| %HS | 338 |
| %LS | 340 |
| DELAY | 342 |
| CAP | 344 |
| PARTS | 346 |
| MINGAIN | 348 |
| GAIN | 350 |
| GAIN/INC | 352 |
| AFUG | 354 |
| SECUR | 356 |
| SBUF | 358 |
| ATIME | 360A |

FIG 3C

| | BTIME | | | 360 |
|---|---|---|---|---|
| %LTOL | GRAVIMETRIC MODE | VOLUMETRIC MODE | BATCHING MODE | 362 |
| %LTOL/ SHUT | GRAVIMETRIC MODE | VOLUMETRIC MODE | BATCHING MODE | 364 |

STATUS/ INFO 366

| FEED/RATE | P/FEED | MDEV | RUN/TOTAL | HOP/WEIGHT | S/STATUS | 0 START/ RUNNING FOR ALL 3 MODES | 0-4 NOT USED | A/STATUS |
|---|---|---|---|---|---|---|---|---|
| | | | | | | 1 FIRST STAGE OF STARTUP COMPLETED | 5 EXTERNAL ALARM | |
| | | | | | | 2 SECOND STAGE OF STARTUP COMPLETED | 6 OVER TOLERANCE WARNIG | |
| | | | | | | 3 SYSTEM RUNNING | 7 UNDER TOLERANCE WARNING | |
| | | | | | | 4 UNIT IS IN REFILL MODE | 8 OVER TOLERANCE SHUTDOWN | |
| | | | | | | 5 SYSTEM IS HALTED | 9 UNDER TOLERANCE SHUTDOWN | |
| | | | | | | 6 POST REFILL | 10 MODE SELECT CONFLICT SHUTDOWN | |
| | | | | | | 7-15 NOT USED | 11 COMMUNICATION FAILURE SHUTDOWN | |
| | | | | | | 15 | 12 TIMER TIME OUT SHUTDOWN | |
| | | | | | | | 13 HOPPER LOW LEVEL SHUTDOWN | |
| 368 | 370 | 372 | 374 | 376 | 378 | | 14 HOPPER OVER FULL SHUTDOWN | 380 |

| | F/TIME | | | 382 |
|---|---|---|---|---|
| | O/RUN/TOTAL | | | 384 |
| ?LBS | 0=lbs | 1=g | 2=kgs | 386 |
| | LAGIT | | | 388 |
| | HAGIT | | | 390 |
| | EARLY | | | 392 |
| | INC | | | 394 |
| | DCALBS | | | 396 |
| | CALBS | | | 398 |
| | CALH.Z | | | 400 |

FIG. 3E

| -A/STATUS 448 | MASTER UNIT | SLAVE ONE | SLAVE TWO | SLAVE THREE | SLAVE FOUR | SLAVE FIVE | SLAVE SIX | SLAVE SEVEN | NOT USED |
|---|---|---|---|---|---|---|---|---|---|
| | \multicolumn{9}{c|}{SOUND} | | | | | | | | | |

| | SOUND | 450 |
|---|---|---|
| #SCREEN 452 | 0=SINGLE UNIT / 1=MULTI UNITS | |
| | ALARMS | 454 |
| | 3TIMER | 456 |
| | IOC | 458 |
| | 1X | 460 |
| | 4X | 462 |
| | 2X | 464 |
| | S%SLAVE | 466 |
| | SMODE | 468 |
| | SMXF | 470 |
| | SMF | 472 |
| | TSTAT | 474 |
| | ACCUM | 206a |
| | RQUEUE | 210a |

FIG. 3G

| AST 489 | SLAVE ONE BIT 1 | SLAVE TWO BIT 2 | SLAVE THREE BIT 3 | SLAVE FOUR BIT 4 | SLAVE FIVE BIT 5 | SLAVE SIX BIT 6 | SLAVE SEVEN BIT 7 | ALL OTHER BITS ARE NOT USED AS FLGS | 300 |
|---|---|---|---|---|---|---|---|---|---|
| | MTRT | | | | | | | | |
| | 6X | | | | | | | | |
| | MSMAX | | | | | | | | |
| | IMSTIMER | | | | | | | | |
| | ?MASTER | | | | | | | | |
| | ME | | | | | | | | |
| | XBUF | | | | | | | | |
| | RBUF | | | | | | | | |
| | 3X | | | | | | | | |
| | H.Z | | | | | | | | 204a |
| | DOWN | | | | | | | | |
| | 1H.Z | | | | | | | | 202a |
| | 2H.Z | | | | | | | | 200a |

DISPLAY CURRENT ALARMS (OP04)

GET FUNCTION KEY AND ALSO LIVE UPDATE OF OPERATIONS SCREEN (OP05)

UPDATE OPERATIONS SCREEN (OP06)

START/STOP FEEDER (OP07)

FILL OR STOP FILLING THE HOPPER (OP08)

ENTER SLAVES OR MASTER (OP 12)

CONTROL VOLUMETRIC (FC06)

LOSS-IN-WEIGHT FEEDER SYSTEM

This is a continuation-in-part of application Ser. No. 81,474 filed Aug. 4, 1987, now abandoned.

FIELD OF THE INVENTION

The present invention relates to metering systems for dispensing materials and, in particular, to loss-in-weight feeder systems. The present invention particularly regards a controller which improves the accuracy and reliability of such dispensing devices.

BACKGROUND OF THE INVENTION

Loss-in-weight feeder systems dispense materials from a hopper on a metered basis, employing feedback control based upon decreases of the weight of the material in the hopper as material is dispensed. In general, loss-in-weight feeder systems are known. Examples of such systems are described in the following U.S. Pat. Nos. 4,580,698, issued on Apr. 8, 1986, based on application Ser. No. 498,082; 4,579,252, issued on Apr. 1, 1986, based on application Ser. No. 491,708; 4,552,235, issued on Nov. 12, 1985, based on application 487,011; 4,524,886, issued on June 25, 1985, based on application Ser. No. 343,143; 4,301,510, issued on Nov. 17, 1981, based on application Ser. No. 141,343; 4,210,963, issued on July 1, 1980, based on application Ser. No. 913,203; 4,111,336, issued on Sept. 5, 1978, based on application Ser. No. 787,688; 4,111,272, issued on Sept. 5, 1978, based on application Ser. No. 748,397; 4,100,984, issued on July 18, 1978, based on application Ser. No. 702,354; 4,054,784, issued on Oct. 18, 1977, based on application Ser. No. 678,391; 3,985,266, issued on Oct. 12, 1976, based on application Ser. No. 604,506; 3,889,848, issued on June 17, 1975, based on application Ser. No. 274,844; 3,855,458, issued on Dec. 17, 1974, based on application Ser. No. 390,201; No. Re. 32,102 is a reissue of 4,320,855 issued on Mar. 23, 1982, based on application Ser. No. 125,370; No. Re. 32,101, also a reissue of 4,320,855; and No. Re. 30,967, a reissue of 3,967,758, issued on July 6, 1976, based on application Ser. No. 550,639.

SUMMARY OF THE INVENTION

The present invention provides a particularly advantageous approach to determining the rate of discharge of a flowable substance from a feeder and for controlling the speed of the feeder. A loss-in-weight feeder, in accordance with one aspect of the present invention, suitably includes a feeder borne upon a scale having a weight-to-electrical transducer, which transducer produces a series of signals representative of the weight of material in the feeder. The weight signals are then digitized by a successive approximation D/A converter, the output of which is supplied as the input signal to a digital computer. The computer utilizes the weight signals to determine the rate at which the feeder is operating, compares the actual rate with a target rate established as an operator input to the system, and adjusts the speed of the feeder accordingly to produce a highly accurate and reliable, metered flow of material from the feeder.

In a highly preferred embodiment of the present invention, the rate determination function develops a correction signal to be supplied to the feeder to adjust the rate based on a proportionated deviation signal determined as a time-weighted variable, which is a function of deviation detected between the actual rate and the target rate. Once the correction signal has been generated, it is mixed with a value representative of the present speed of the feeder to produce a close approximation of the desired rate.

BRIEF DESCRIPTION OF THE DRAWINGS

A preferred exemplary embodiment of the present invention will hereinafter be described with reference to the appended drawings, wherein like reference numerals denote like elements, and:

FIG. 1 is a block diagram of a loss-in-weight feeder system in accordance with the present invention;

FIGS. 3A–3H are address tables showing the variables used by the system of FIG. 1;

DETAILED DESCRIPTION OF A PREFERRED EXEMPLARY EMBODIMENT

Figure 1A:
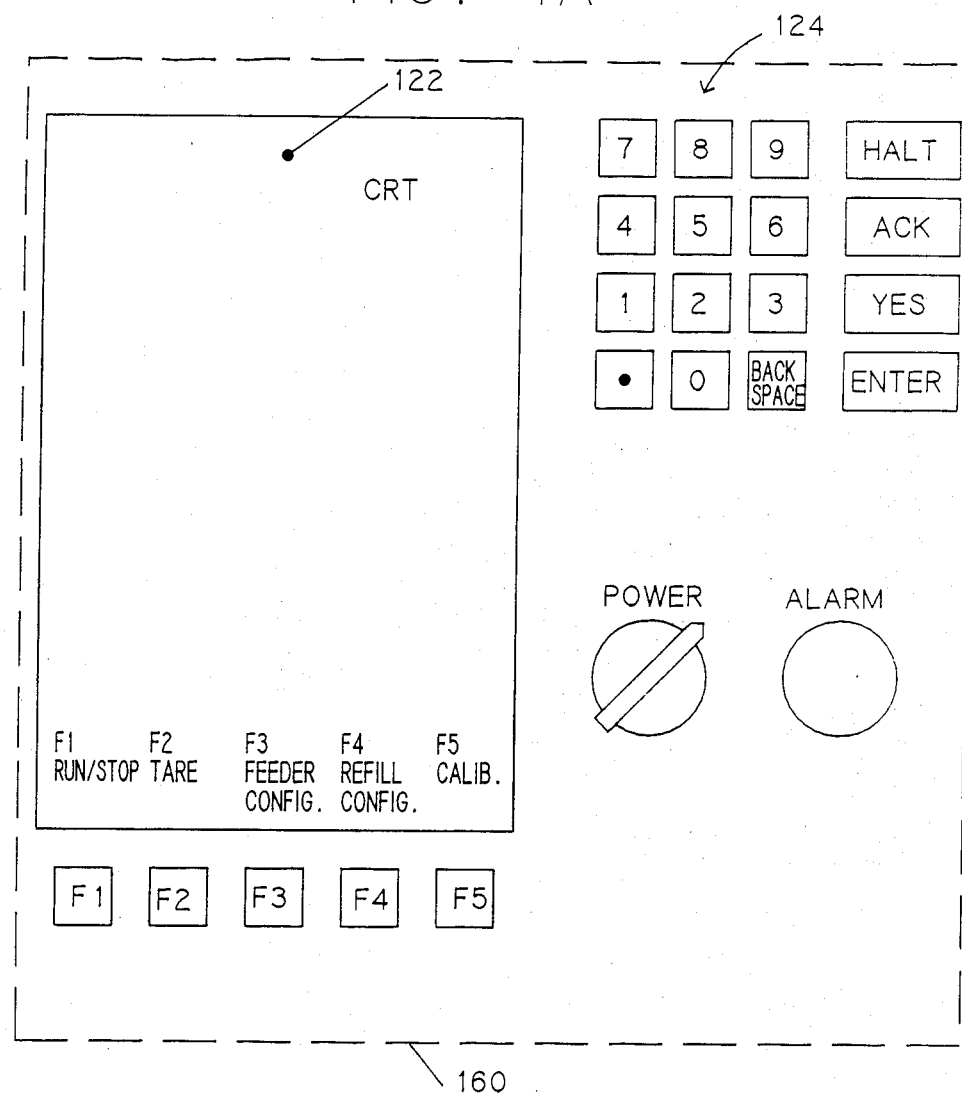
FIG. 1A is a front view of a suitable control panel.

Referring now to FIG. 1, a loss-in-weight feeder system, in accordance with the present invention, designated generally as 100, is shown to be comprised of a conventional feeder 106, a conventional counterbalanced load cell type scale 108, and a controller 110. Feeder 106 is disposed to receive material from a suitable source such as bin 101 through an electrically actuable discharge gate 102, and is positioned upon scale 108 so that scale 108 registers the weight of feeder 106 and, particularly, the weight of material in the hopper of feeder 106. As will be explained, controller 110 receives indicia of the weight of material in the hopper of feeder 106 and provides suitable control signals to feeder 106 and discharge gate 102.

Feeder 106 is preferably of the type including a flexible vinyl hopper communicating with a helical motor-driven metering screw or auger. Material is received by the hopper through gate 102 and is fed to the metering screw which, in turn, transports the material to a discharge port or shute, providing a relatively uniform discharge of material therefrom.

To facilitate a continuous and uniform flow of material from the hopper into the metering screw, an agitation mechanism is typically included in feeder 106. For example, in feeders employing flexible vinyl hoppers, motor-driven massaging paddles are disposed to undulate against the sides of the hopper, vibrating the material within it. These vibrations tend to condition the material into a uniform bulk density above the metering screw, and tend to prevent bridging of the material over it. Examples of suitable commercially available feeders are the AccuRate® models 100, 300, 600, and 1200 Dry Material Feeders marketed by the assignee of the present invention.

The feeder auger and agitation device are driven by respective DC motors. Respective electrically actuable switches, e.g., solenoids or relays, are provided to selectively enable or inhibit actuation of the motors. As will hereinafter be explained, controller 110 provides the appropriate control signals (134, 138) to those switches. In addition, controller 110 provides a DC drive signal 145 to the metering screw motor, the level of the drive signal controlling the revolutions per minute (rpm) of the motor and, thus, the metering screw.

Scale 108 is desirably a mechanically counterbalanced flexure type scale, such as, for example, a commercially available AccuRate® Scale. An excitation signal for scale 108 is provided by a 10 volt power supply 112. In effect, scale 108 comprises a weight-to-electrical transducer (e.g., load cell) having a linear conversion characteristic (e.g., a copper beryllium flexure strain gauge).

The weight of the feeder without material in its hopper, i.e., the weight on the scale at the point just prior to when the hopper is refilled, is referred to as the tare weight of feeder 108. Scale 108 is mechanically counterbalanced to offset at least a portion of the weight of feeder 106, so that the scale output signal is more directly representative of the weight of the material in feeder 106. Specifically, counterweights are disposed on an arm to lift feeder 108 with respect to the load cell flexure point. Ideally, output 109 of scale 108 is thus zeroed to the tare weight of feeder 108; the magnitude of the output ranging up to 20 millivolts in a preferred embodiment. Control is effected in accordance with differences in the weight, rather than absolute weight, and non-zero signals indicative of the tare weights may thus be accommodated. Mechanically counterbalancing scale 108 to minimize the tare weight signal is particularly advantageous, as compared to merely employing computational accommodations; mechanically counterbalancing to tare the scale permits operation over the complete operational range of the load cell, thus providing superior resolution.

Scale 108 suitably includes a dash pot to dampen vibrations. However, dash pots also tend to lower the response time of scale 108 to changes in weight. Accordingly, the amount of vibration damping that can be employed in scale 108 without increasing the response time to an unacceptable level is limited. Thus, scale 108 tends to be susceptible, at least to some extent, to spurious vibrations due to, for example, agitation, impacts, and vibrations from other machinery. Vibrations from these sources are reflected as spurious components and variations in analog weight signal 109. Unwanted contribution to the weight signal due to such extraneous sources are removed in the controller, as described hereinbelow.

Controller 110 most preferably comprises: a memory-supplemented, conventional, single-board industrial computer 118; a CRT display 122, with associated interfacing circuitry 120; a keypad 124 with associated interfacing circuitry 126; a conventional, successive-approximation type digitizer 116 (also sometimes referred to herein as analog-to-digital (A/D) converter 116); a conventional digital-to-analog (D/A) converter 144; and suitable single point (individual line) input/output interfacing circuitry 128. If desired, conventional communications circuitry 146, e.g., standard RS232, RS422 transceiver circuitry, or both, may be included. The respective elements of controller 110 are suitably interconnected by a standard communications bus, e.g., an STD Bus. In general, controller 110 receives a signal indicative of the analog weight signal 109 from scale 108; successive approximation digitizer 116 generates a digital word representative of the weight, which is communicated to computer 118; subsequently, computer 118 generates appropriate control signals to feeder 106 and discharge gate 102, to ensure that the weight of substance discharged by feeder 106 is maintained in accordance with operator-input parameters specifying the desired feed rate/quantity.

As will hereinafter be more fully described, system 100 is adapted to cooperate with one or more "slave units" 148, substantially identical loss-in-weight feeders to system 100, but configured by software to operate in accordance with supervisory commands from system 100. Communication between system 100, operating as a "master unit," and the various slave units 148 is suitably effected through a standard RS422 communication link, operating as a common two-wire bus, included in communication circuitry when such an option is desired for implementation.

In accordance with one aspect of the present invention, an active low pass filter 114 is interposed between controller 110 and scale 108 to filter out spurious components of analog weight signal 109, and to amplify and level-translate the signal into a form compatible with successive approximation digitizer 116. Active filter 114 preferably manifests a cutoff frequency sufficiently low to filter out signal components due to the effects of low frequency vibrations in scale 108, caused by, for example, vehicle traffic, other machinery, or other disturbances commonly associated with industrial environments, i.e., a cutoff frequency of less than 10 Hertz, and preferably less than 1 Hertz, e.g., 0.75 Hertz. In the preferred embodiment, frequency components of input signals above (approximately) 0.75 Hz are attenuated at a rate of 40 dB/dec and input voltage levels are amplified to a range suitable for the successive approximation analog-to-digital converter 116.

Figure 4:
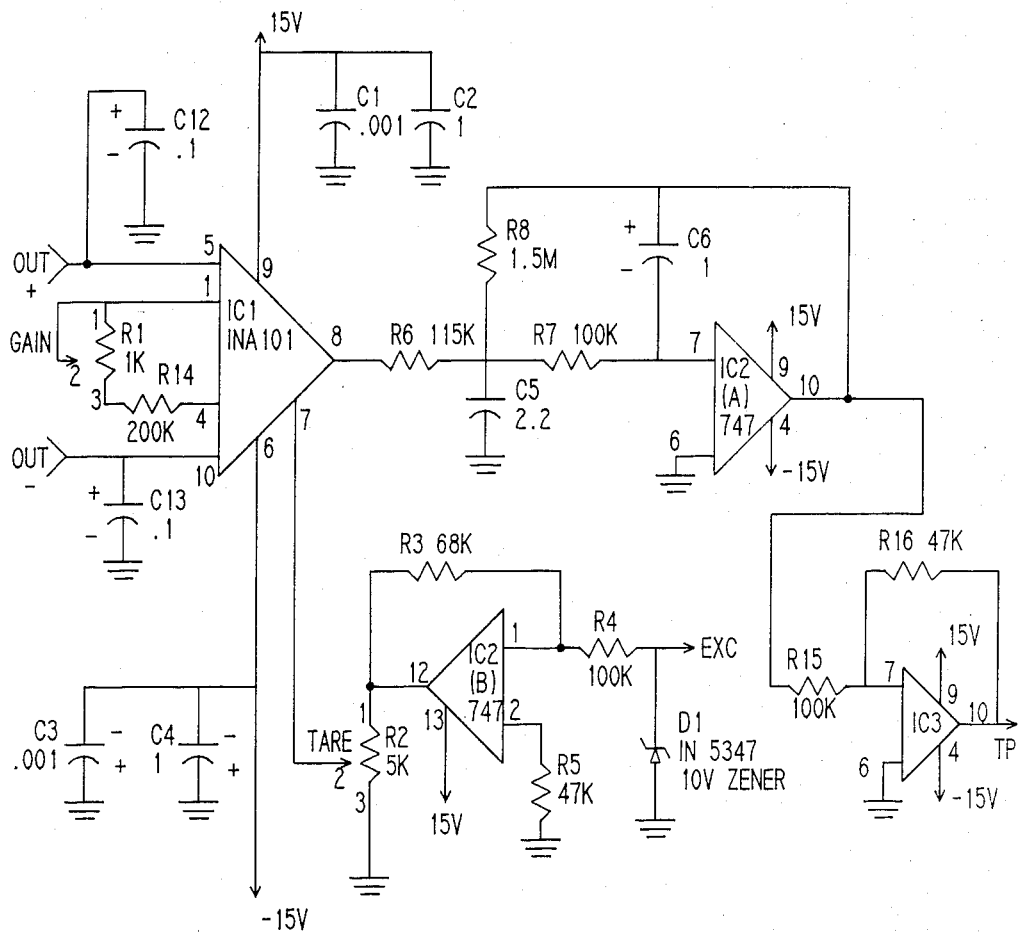
FIG. 4 is a schematic illustration of the circuitry associated with a suitable active low pass filter used to condition weight signals in carrying out a preferred process of the instant invention.

A suitable active filter 114 is shown in greater detail in FIG. 4. With reference to FIG. 4, the output signals from the scale 108 (FIG. 1), generally indicated as OUT+ and OUT−, are applied to respective input terminals of an instrumentation amplifier IC1 (such as a Burr-Brown INA101). A potentiometer R1 is provided to facilitate adjustment of the amplifier gain. Gains for this amplifier may be set between 30 and 46 dB by such an adjustment, determined by the respective resistances of potentiometer R1 and a resistor R14. Capacitors C12, C13 and C1 through C4 are used as decoupling capacitors and do not alter the frequency response of the filter. Amplifier IC1 also allows for an output voltage offset through a voltage input at its pin 7.

The appropriate offset is provided at pin 7 of IC1 by applying the output voltage of a potentiometer (R2). The actual voltage to pin 7 may be varied between 0 and (approximately) −6.8 volts through adjustment of potentiometer R2 in the illustrated embodiment.

The voltage supplied as an input to potentiometer R2 is provided by the output (pin 12) of an operational amplifier (OP AMP) IC2(B). OP AMP IC2(B) suitably comprises one-half of a dual operational amplifier integrated circuit (for example, a Texas Instruments LM747). OP AMP IC2(B) is used as an inverting amplifier with gain of (approximately) −3.3 dB. The gain of IC2(B) is determined by the ratio of a resistor R3 to a resistor R4. IC2(B) is driven by a constant 10 V DC voltage derived from a Zener diode (for example, a Motorola IN5347); the Zener, in turn, is driven by the supplied excitation voltage of (approximately) 15 V DC. A resistor R5 is used to minimize offset errors associated with operational amplifier IC2(B).

The output of amplifier IC1 (pin 8) is frequency shaped by a second order low pass filter provided by IC2(A) and its associated components (R6, R7, R8, C5 and C6). OP AMP IC2(A), like OP AMP IC2(B), suitably comprises one-half of dual operational amplifier integrated circuit (for example, a Texas Instruments LM747). The filter is inverting and has a DC gain (as determined by the ratio of R8 to R6) of (approximately) 22 dB. The corner frequency (3 dB point) is (approximately) 0.75 Hz. The 3 dB point is determined by the interaction of R6, R7, R8, C5 and C6.

A final gain stage is provided by an OP AMP IC3 and its associated resistors R15 and R16. OP AMP IC3 also suitably comprises one-half of a dual operational amplifier integrated circuit (for example, a Texas Instruments LM747) and is used as an inverting amplifier with gain of (approximately) −6.5 dB. The gain is determined by the ratio of R16 to R15.

It is desirable that the characteristics of active filter 114 be particularly stable. Accordingly, to prevent drift, active filter 114 is preferably maintained in a temperature controlled enclosure (oven) maintained at a constant temperature, such as, e.g., 150 degrees Fahrenheit. Additionally, precision 1% metal-film resistors and tantalum capacitors are suitably employed to enhance the stability of active low pass filter 114. Thus, the output signal from active filter 114 is a stable DC voltage between (approximately) −5 and 5 volts, indicative of the contemporaneous weight of material in feeder 106.

Referring again to FIG. 1, the filtered analog weight signal from filter 114 is applied to digitizer 116 in controller 110. Digitizer 116 generates a 16 bit digital word indicative of the weight of material in feeder 106. Successive approximation digitizer 116 suitably manifests an A/D conversion time of on the order of 20 microseconds and throughput rate of on the order of 30 kilohertz. The resultant 16 bit word characteristic of weight is maintained in a 16 bit buffer for selective communication to computer 118 through a standard bus. An example of a suitable commercially available digitizer 116 is a Data Translation, Inc. DT2742 Analog Input Board.

As will hereinafter be explained, computer 118 receives, through the system bus, both the 16-bit digital weight signal from digitizer 116 and operator input parameters from keypad interface 126. Computer 118 next generates a 12 bit digital signal indicative of a desired feeder screw rate calculated to maintain material output from feeder 106 in accordance with the operator input parameters. The 12 bit digital rate signal is supplied over the system bus to digital-to-analog converter 144, which generates an analog drive signal 145 ranging, e.g., from 0 to 7 volts for application to the DC motor driving the feeder helix. The RPM of the metering screw thus varies in accordance with the voltage level of the output signal of D/A converter 144.

Computer 118 also provides, through I/O interface board 128, respective control or drive signals to the mechanical apparatus and remote indicators: a feeder running signal 134, an agitation control signal 138, a discharge control signal 136, a system running indicator signal 130, and a remote alarm indicator signal 132. In addition, remotely-initiated user signals are provided to computer 118 through I/O interface 128. Specifically, a user alarm mechanism 140 and remote start mechanism 142 communicate with computer 118 through I/O board 128.

I/O board 128 suitably comprises an addressable register of latches, communicating with computer 118 through the standard system bus and respective opto-isolators, associated with each of the latches. The individual opto-isolators are selectively actuated in accordance with the content of the corresponding latch and, in effect, complete a circuit between an AC source, suitably 110 VAC, and the respective remote device. Conversely, the latches associated with remote inputs, e.g., user alarm 140 and remote start switch 142, assume a state in accordance with the state of the remote device.

Feeder running signal 134 is provided to the electrically-actuable switch associated with the DC drive motor for the metering screw of feeder 106. When the feeder running bit (latch) is active, a 110 VAC signal is applied to a solenoid switch to enable the metering screw motor; the motor will turn the metering screw at a rate in accordance with signal 145 from D/A converter 144. When the feeder running bit (latch) is inactive, the excitation is removed from the solenoid switch and the metering screw motor is inhibited, irrespective of the level of drive signal 145.

System running indicator 130 and remote alarm indicator 132 are suitably indicator lights, beepers, or similar devices. The system running indicator bit (latch) is rendered active, causing a signal to actuate the system running indicator whenever the feeder 106 or the feeder associated with any of the slave units communicating with system 100 is enabled.

The bit (latch) associated with remote alarm indicator 132 is rendered active to actuate indicator 132 in the event that an alarm condition is sensed either in connection with system 100 or any of the slave units 148 communicating with system 100. The alarm typically will remain activated until acknowledged by the operator (e.g., by depressing an acknowledge key ("ACK") on keypad 124).

Discharge signal 136 is selectively generated when controller 110 determines the need to initiate a discharge cycle, e.g., when the weight in feeder 106 approaches the tare weight. Agitation signal 138 is generated on a selective basis during the operational cycle of system 100 to ensure continuous and uniform flow of material to the metering screw while at the same time minimizing unacceptable levels of signal noise due to the impact of the associated vibrations and the effect they have on system accuracy.

Remote start device 142 may be a continuous contact switch, such as a foot pedal, disposed at the convenience of the user to momentarily start the system. Actuation of remote start switch 142 is initially equivalent to actuating a designated start/stop function key on keypad 124. However, in the exemplified embodiment, when remote start switch 142 is released, the system is stopped, and can be restarted only from keypad 124.

User alarm switch 140, when actuated, generates a visual or audio alarm, and causes information pertaining to the alarm generated to be displayed on CRT 122.

User interface with computer 118 is effected primarily through CRT display 122 and keypad 124. CRT 122, such as a Panasonic 9000 Series 9-inch CRT, communicates with computer 118 through CRT interface board 120, which may be a commercially available CRTC-1 Monochrome Video Driver Module, cooperating with computer 118 through the standard system bus. CRT 122 is suitably incorporated as an integral part of keypad 124. More specifically, referring briefly to FIG. 1A, a suitable control panel 160, for controller 110, includes a membrane switch keypad 124 disposed about CRT 122. Actuation of the respective keys generates a signal indicative of the position of the key in the array. Keypad interface circuit 126 translates the key position actuation signal into a desired code, e.g., ASCII, assigned code, and stores the code in a suitable buffer register for communication to computer 118 through the standard system bus. The key position actuation signal to code signal translation may then be effected using an EPROM lookup table, in a manner well known in the art. As will be explained, the contents of keypad interface buffer 126 is polled by computer 118 on a periodic basis.

Specifically, five "soft" program definable function keys (F1–F5) are disposed in predetermined relation to one edge of CRT 122 in this preferred embodiment. The respective functions of keys F1–F5 are defined by software, i.e., computer 118, and the instantaneous function associated with the key displayed proximate to the key along the edge of CRT 122. Keyboard 124 further includes a 4×4 matrix of keys including numeric keys 0–9, a decimal point key, and respective BACKSPACE, HALT, acknowledge (ACK), YES and ENTER keys. If the system is running, the HALT key, when depressed, will turn off all system I/O points and inhibit the generation of I/O points until the HALT key is again depressed. The acknowledge key (ACK) is used primarily to acknowledge alarms; various alarms are generated and continue to sound or be displayed until acknowledged by the operator pressing the acknowledge key (ACK)in this preferred implementation. The YES key is employed as a failsafe response in connection with the menu driven operation of the system. The ENTER key is used primarily in inputting and acknowledging information, and for moving between respective menu screens employed by the system. The BACKSPACE key provides for cursor movement to correct errors in entered data.

Computer 118 may comprise a conventional single-board computer cooperating with supplemental memory. An example of a suitable computer 118 is a G W 3, Inc., SBC95/1 STD Bus Single-Board Computer, cooperating with a Matrix Corporation RP64 RAM/PROM Card, providing approximately 64K of extended memory. The SBC95/1 single-board computer includes a conventional STD bus interface, a CPU (microcomputer), e.g., a Texas Instruments TMS9995 16-Bit Microcomputer, and associated memory, two serial communications ports, each adapted for alternative configuration as an RS232 or RS422 communications port, an 8-bit TTL input port, a 5-bit TTL output port, and an RS422 clocked serial output port. While communications circuitry 146 is shown separately from computer 118, in practice, one of the serial communication ports, and/or the RS422 clocked serial output port, is/are employed as communications circuitry 146.

Computer 118 advantageously may include provisions for generating interrupt signals to the microcomputer on a periodic basis, preferably at a rate of 269 interrupts per half second. The periodic interrupts can be generated in any suitable manner, such as, for example, dividing down from a system clock associated with the microcomputer, i.e., applying the system clock to a counter/divider and generating an interrupt signal after a predetermined number, e.g., 36, of system clock pulses. The interrupt rate is preferably chosen to provide a predetermined number of interrupts each half second, thus providing a one-half second time frame for clocking other operations in the computer, as will be seen below relating to correction signal computation. In practice, one of the serial communications ports, which includes a TMS 9902A Universal Asynchronous Receiver/Transmitter (UART), is configured in a manner well known in the art to generate the 269 per-half second interrupts. Various bus communications functions are handled in response to the interrupt.

Controller 110 operates in accordance with a program of instructions maintained in read-only memory associated with computer 118. The program is suitably divided into a plurality of "tasks" performed in an interrelated manner in accordance with conventional multi-tasking techniques. The tasks are effectively arranged in operational sequence by a startup routine; addresses corresponding to the respective tasks are established in a "circular" queue. A pointer designates the head of the queue. Computer 118 executes a designated portion of a first task in the sequence, beginning with the address in the multi-task queue and continuing until encountering a predetermined marker ("pause") in the sequence of instructions comprising the task. Upon encountering "pause," the system stores the location of the next instruction of the present task in the queue location corresponding to the task, and increments the pointer. A sequence of instructions is then executed for the task corresponding to the newly designated location in the queue, commencing with the instruction contained in the address of the queue and continuing until another "pause" is encountered. At that point, the queue location is updated with the address of the next instruction in the task and the queue pointer is incremented. In this manner, the system executes, in turn, designated portions of each successive task in the sequence, ultimately returning to the first task to execute the next successive designated portion of that task, and so forth. The multi-task execution sequence, however, is periodically "interrupted." In response to interrupt signals, the system stores the address of the next instruction to be handled in its normal sequence, and switches context to an interrupt handler routine; the interrupt handler routine is executed periodically independently of the multi-tasking sequence. After completing the interrupt handling routine, the system resumes, in normal sequence, execution of the tasks.

Figure 5:
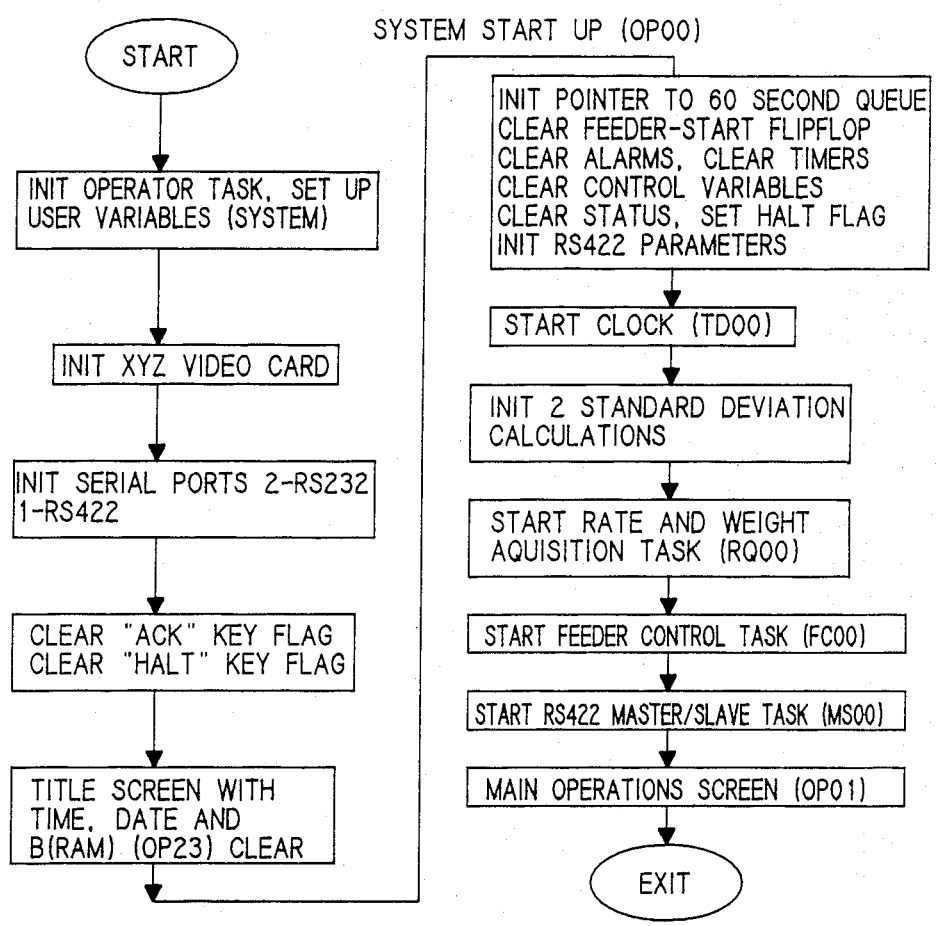
FIGS. 5 through 70 are suitable flow diagrams illustrative of the operation of the system of FIG. 1.
Figure 6:
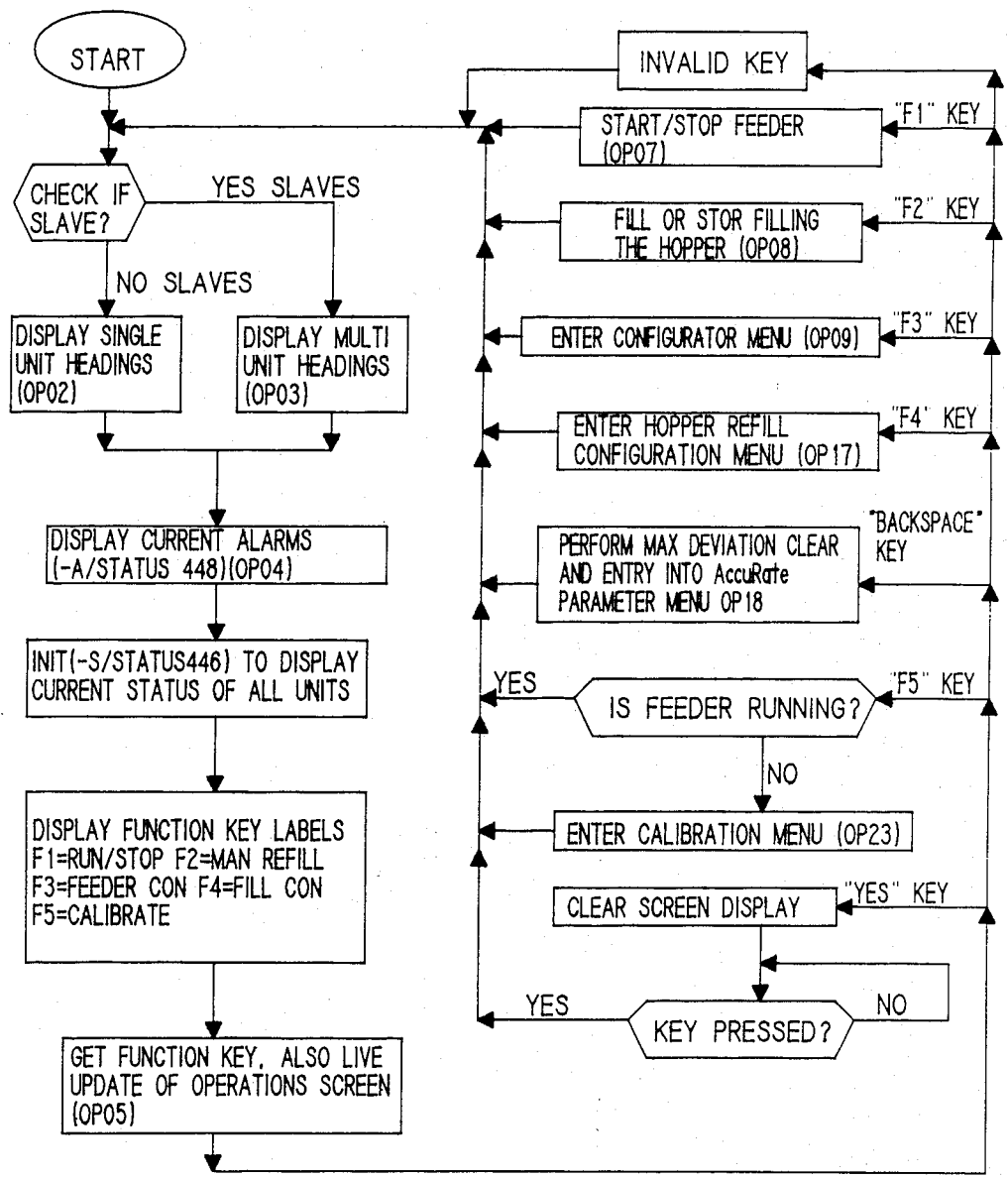
Figure 7:
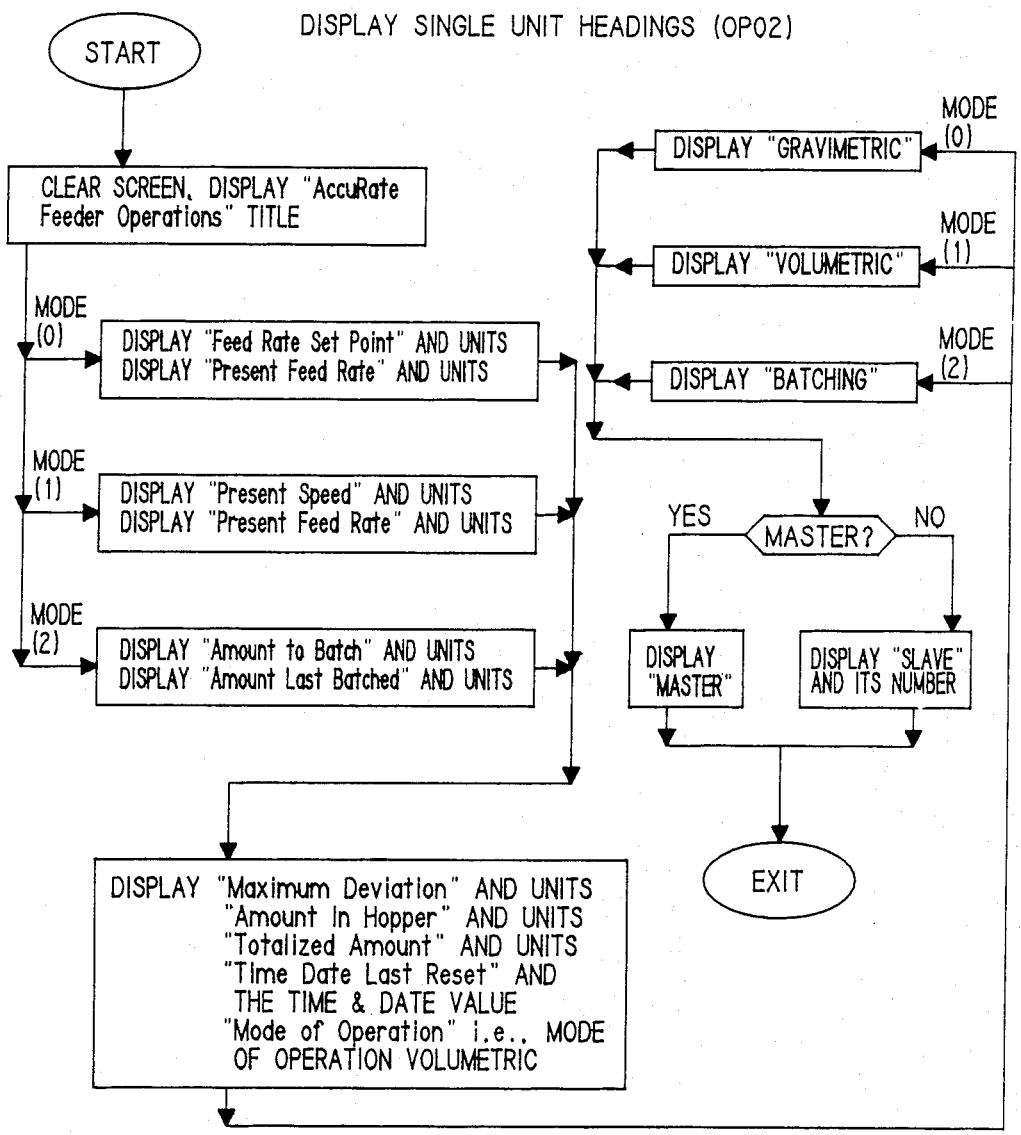
Figure 8:
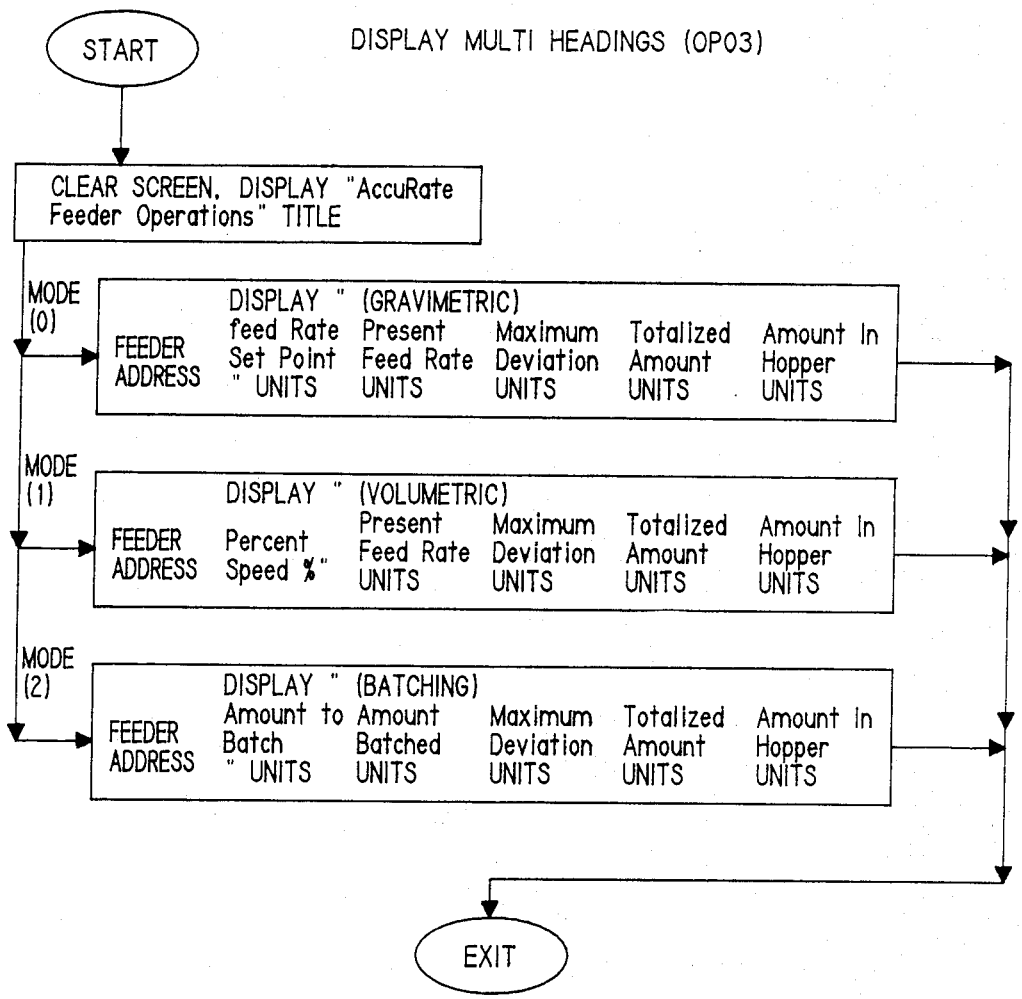
Figure 9:
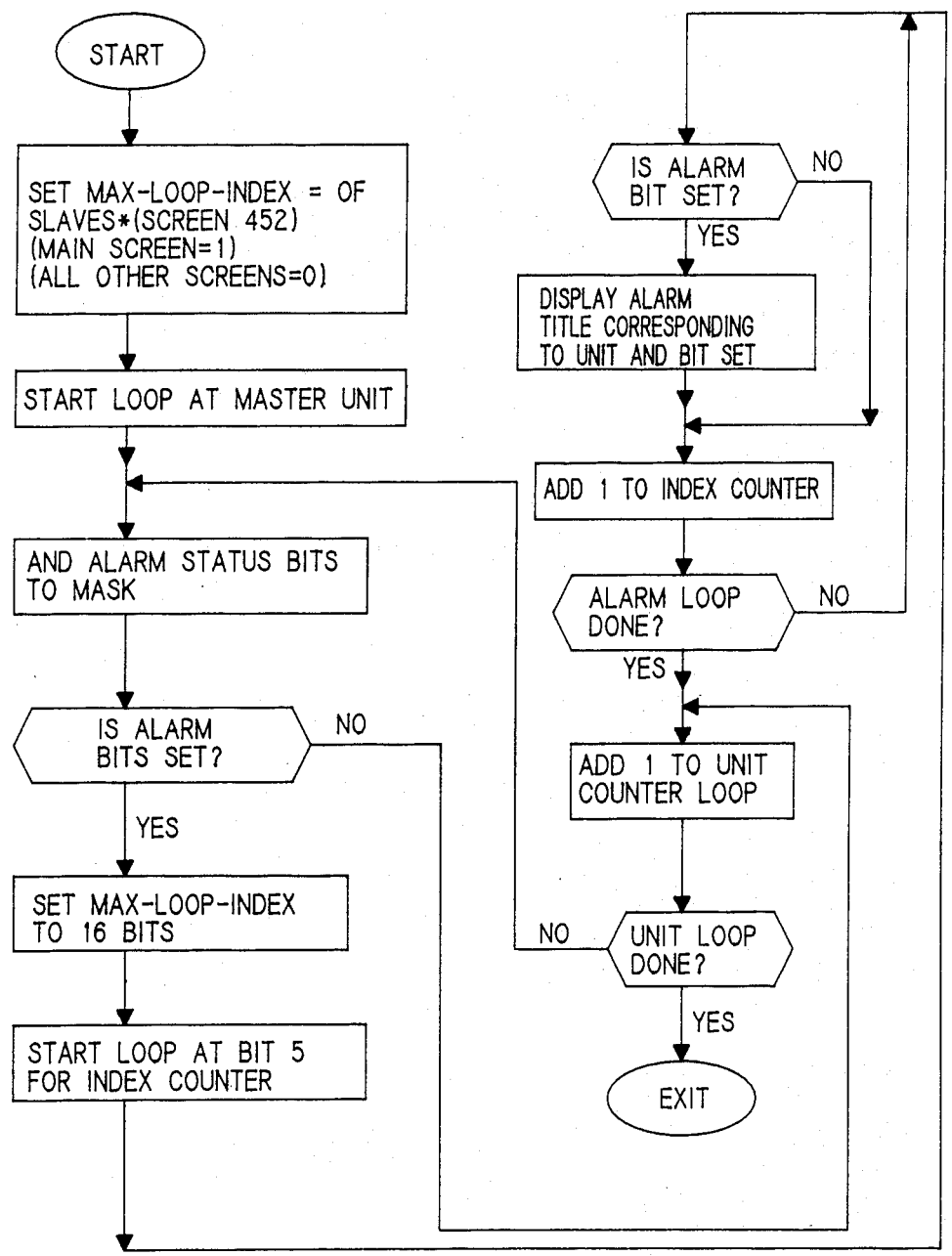
Figure 10:
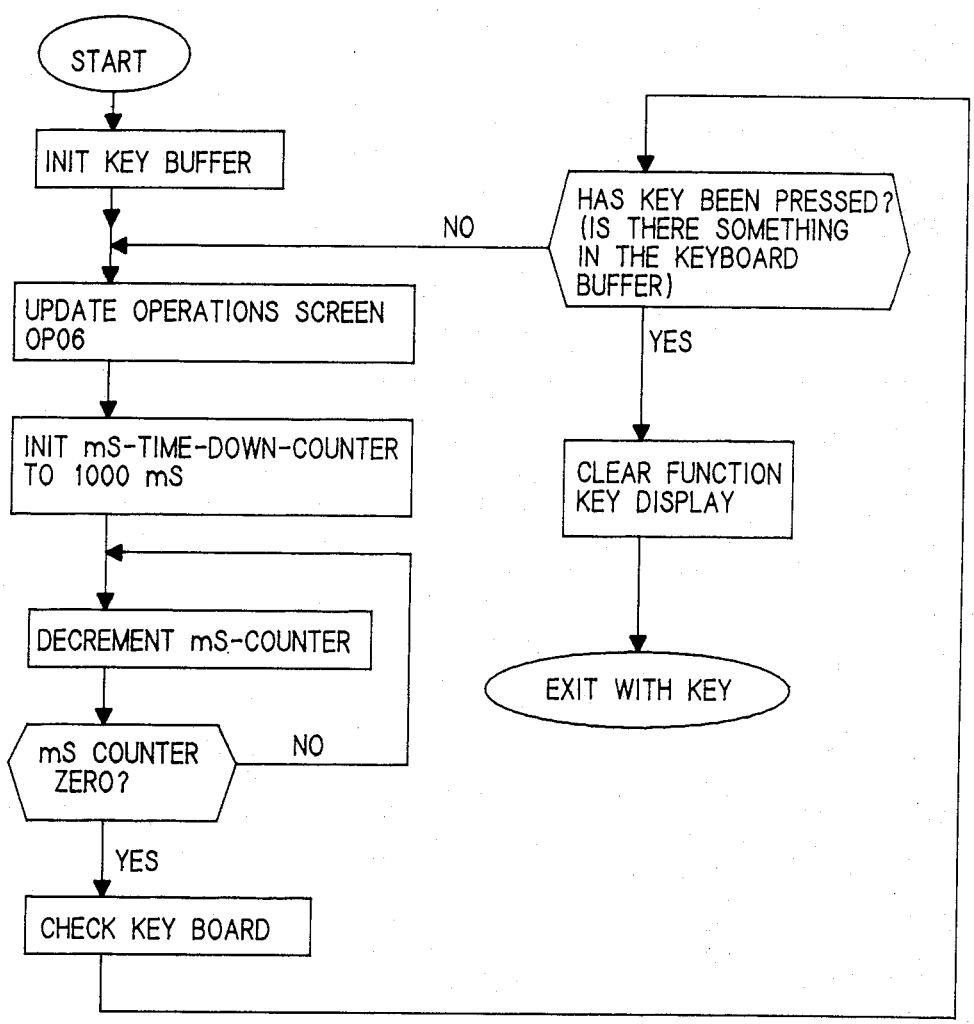
Figure 11:
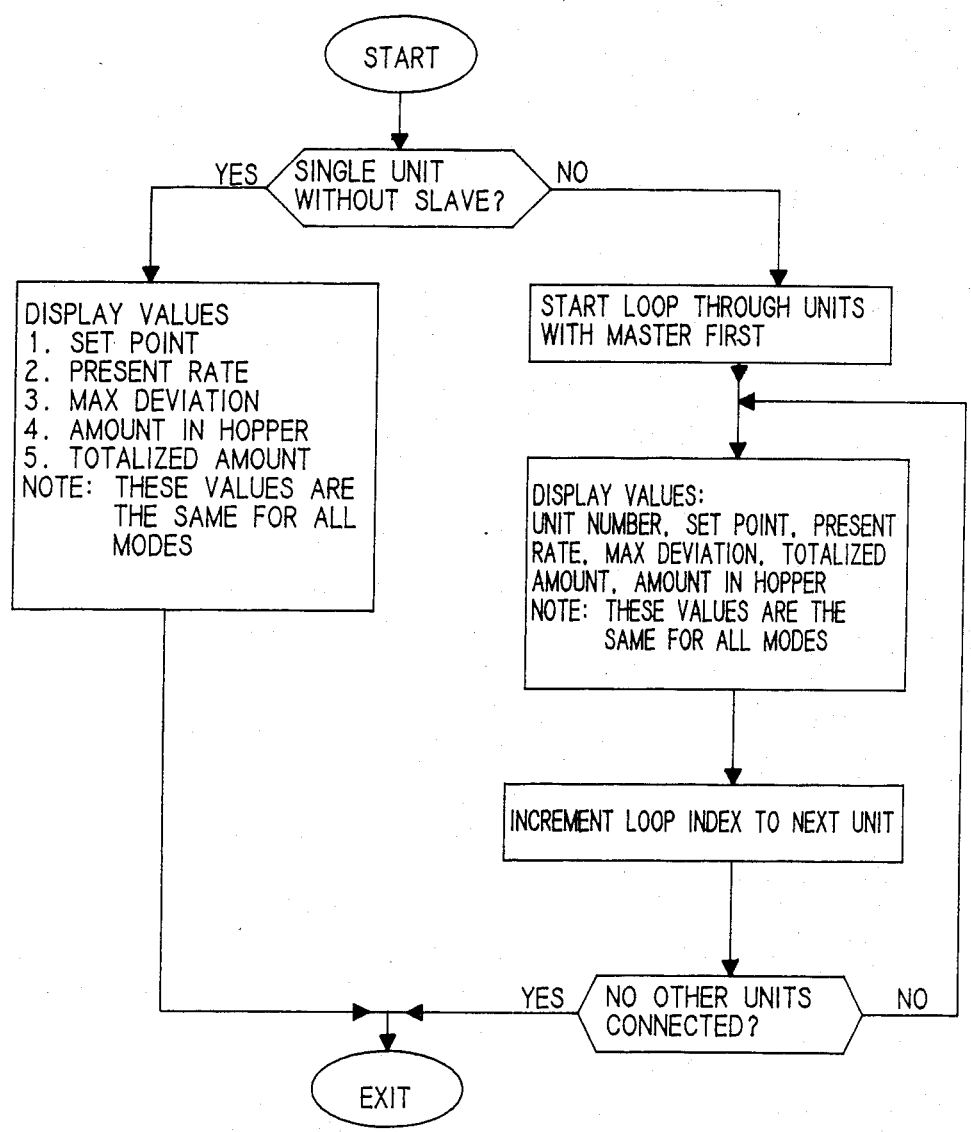
Figure 12:
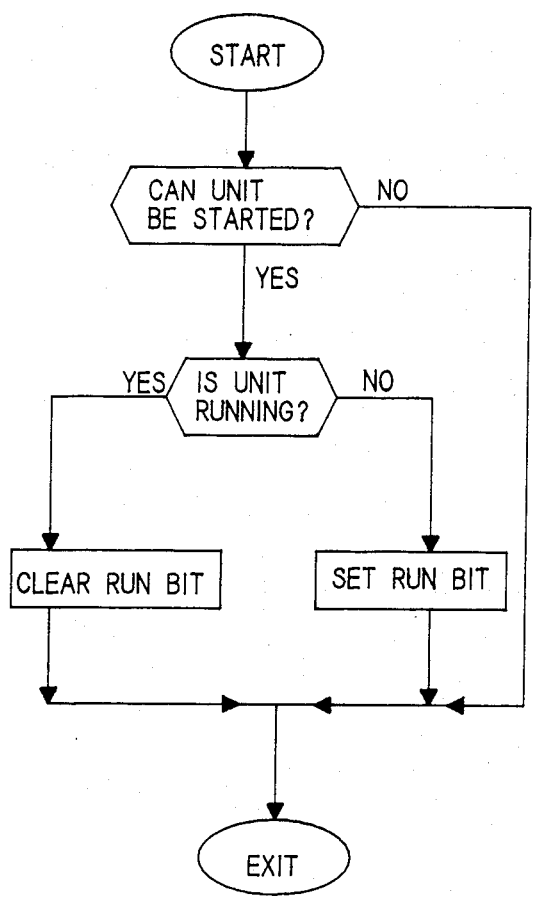
Figure 13:
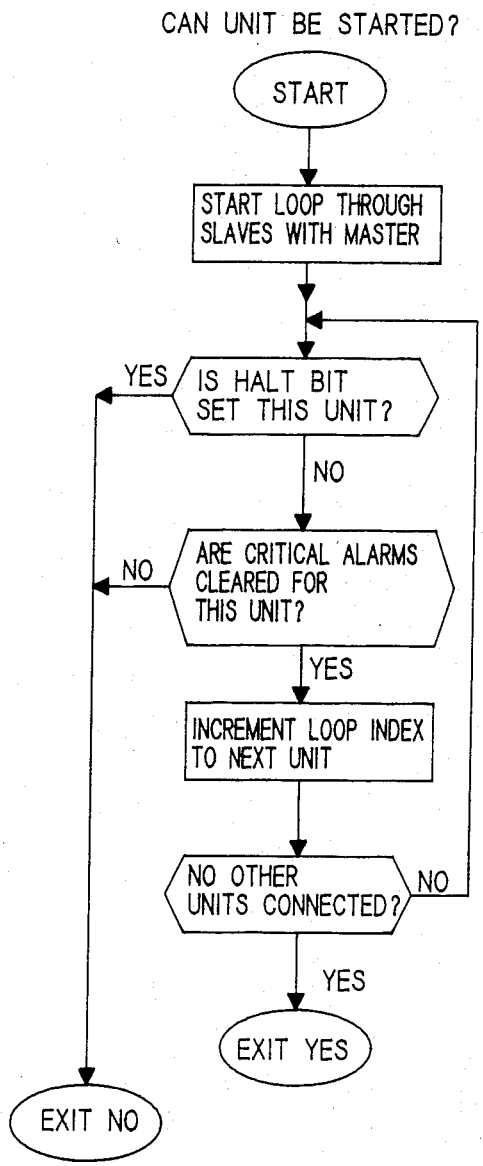
Figure 14:
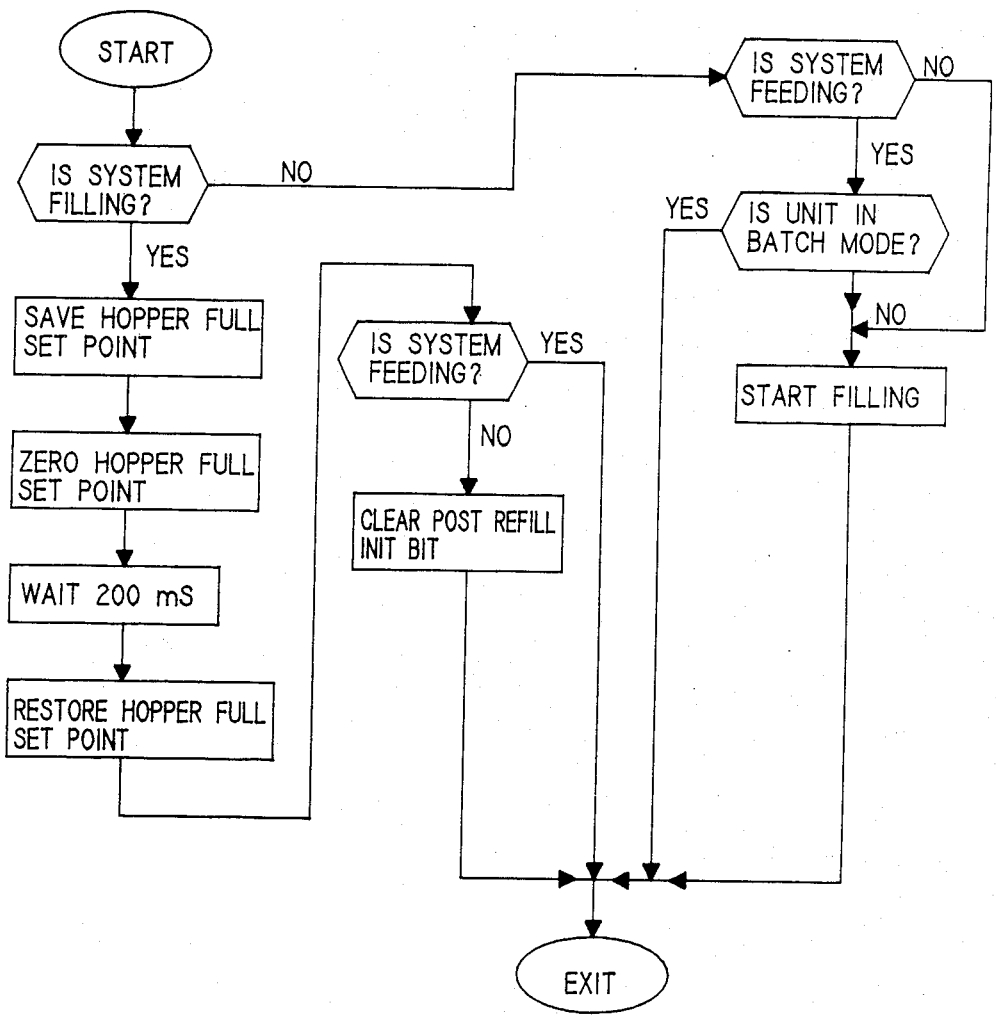
Figure 15:
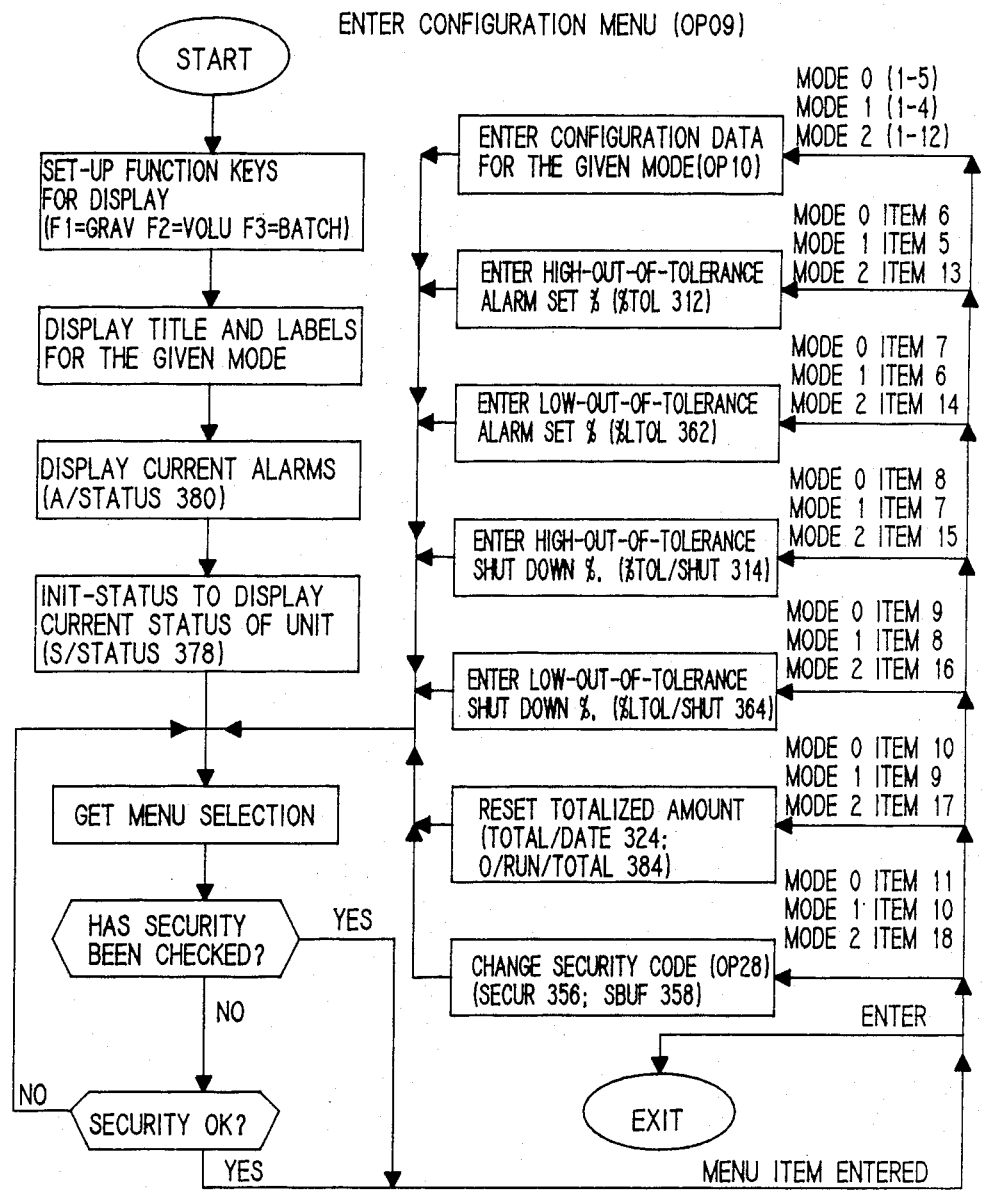
Figure 16:
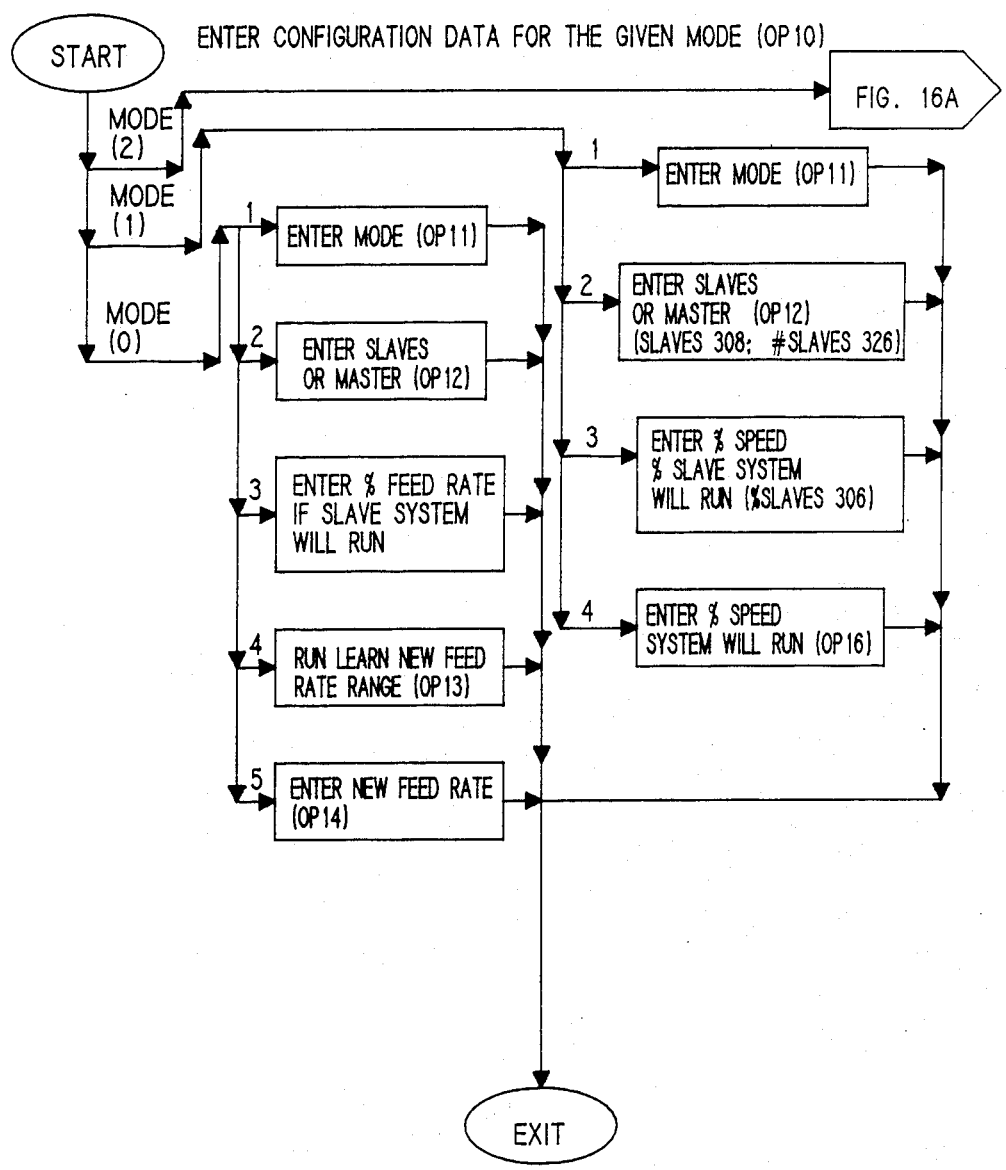
Figure 16A:
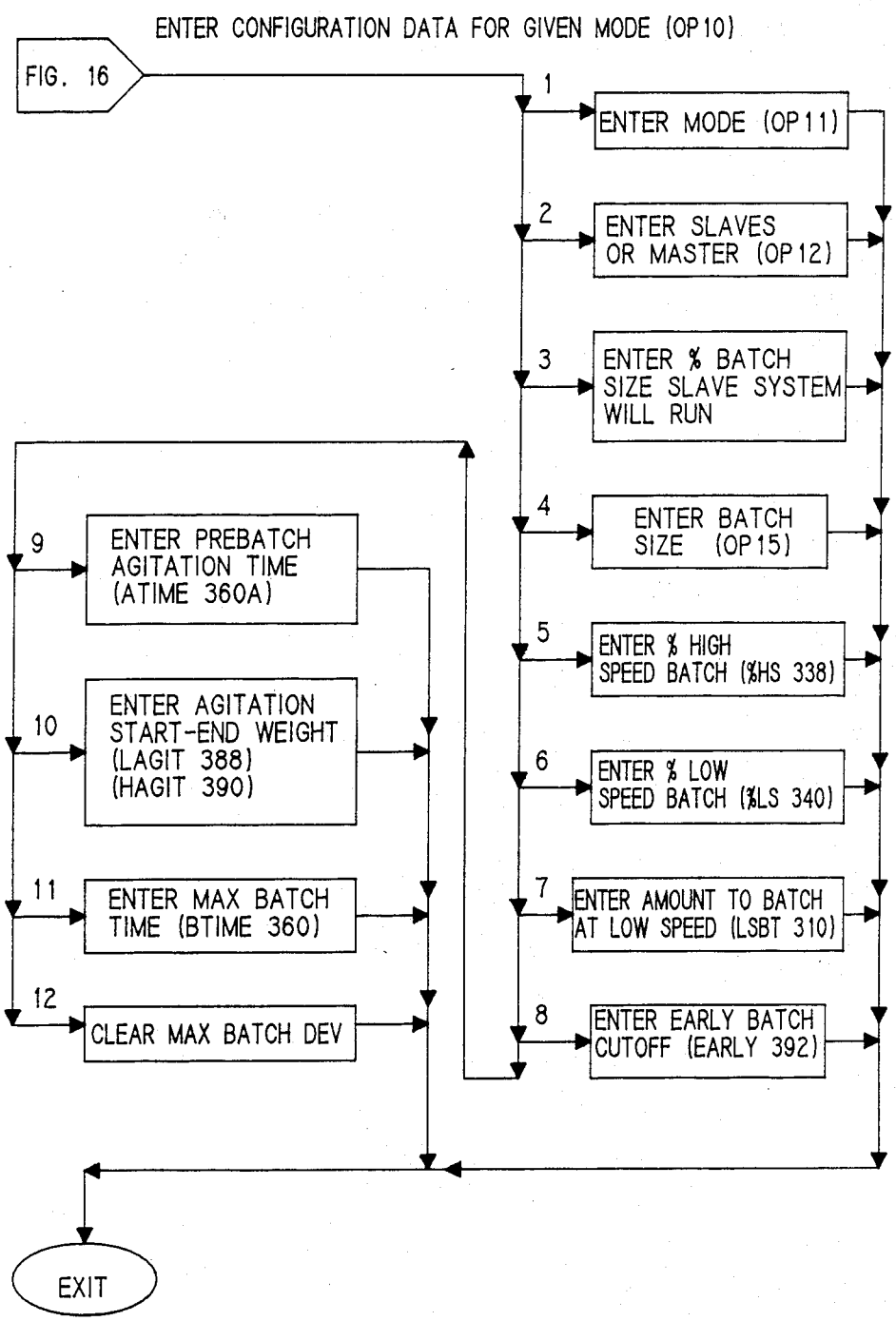
Figure 17:
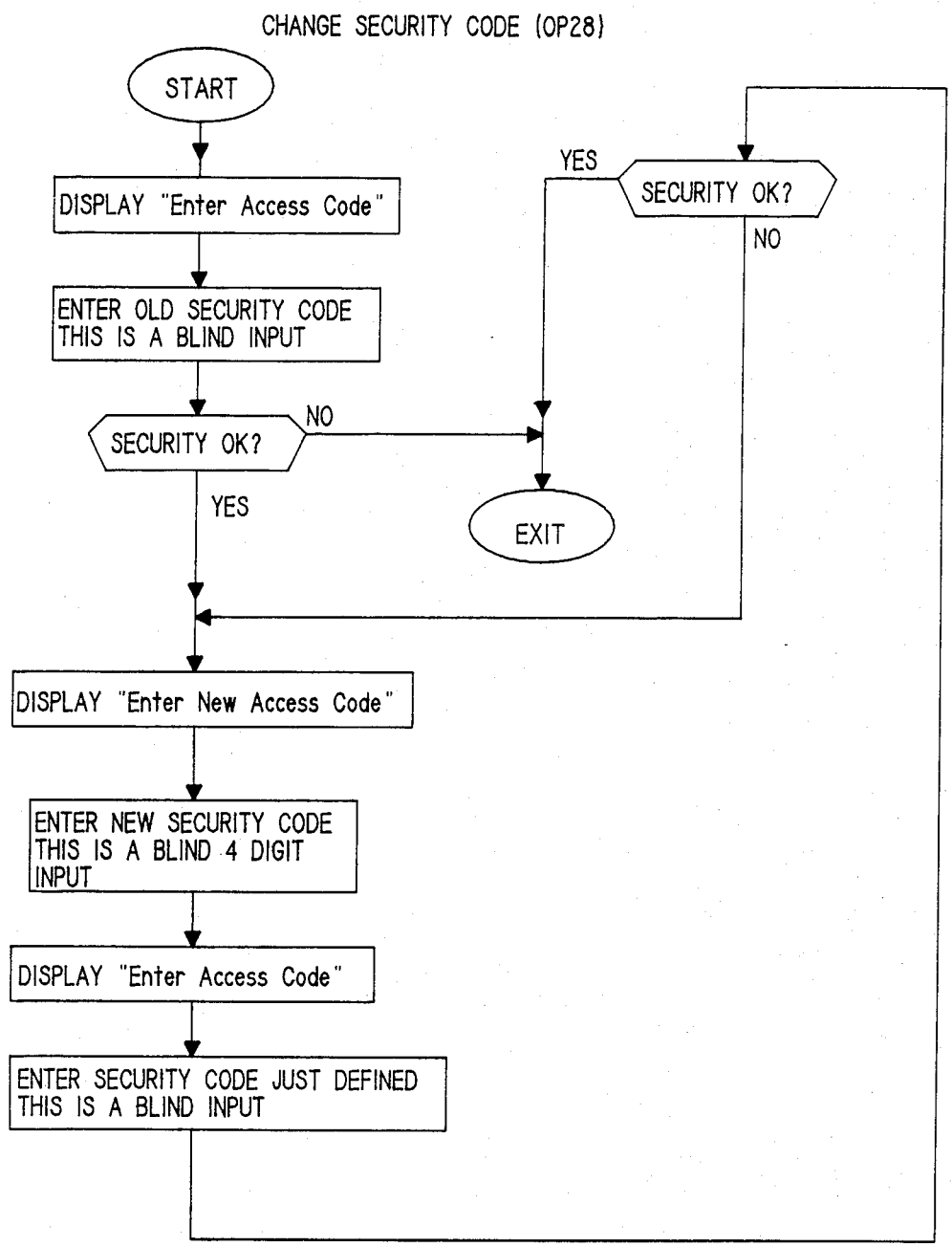
Figure 18:
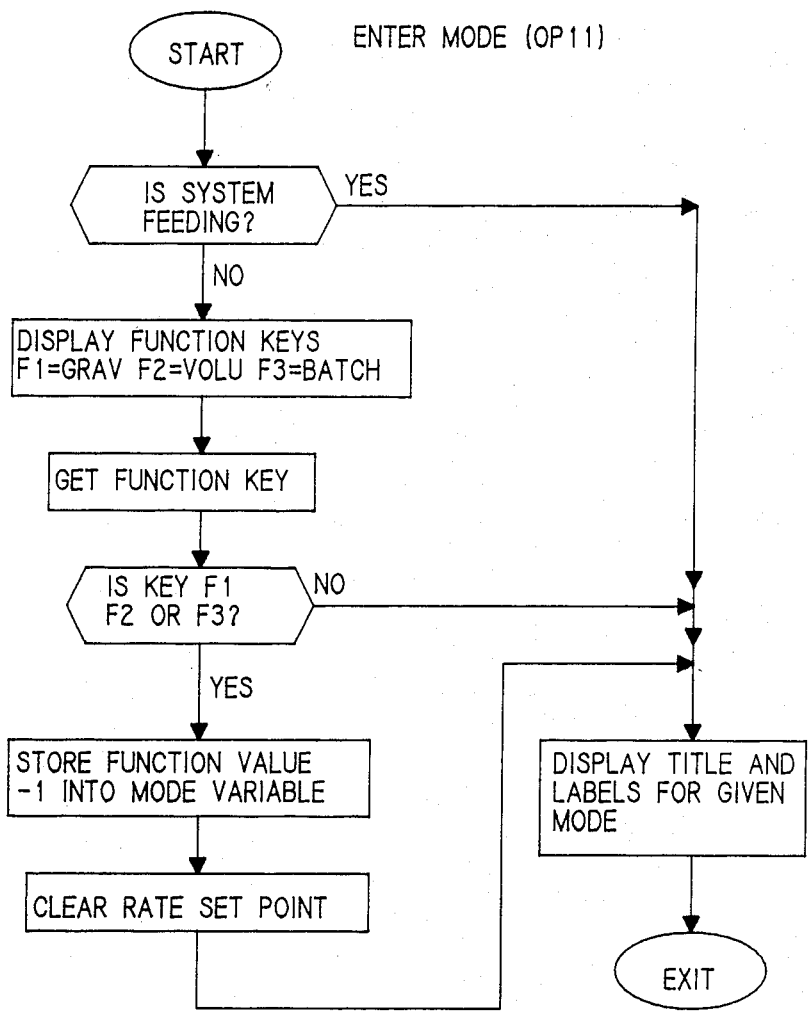
Figure 19:
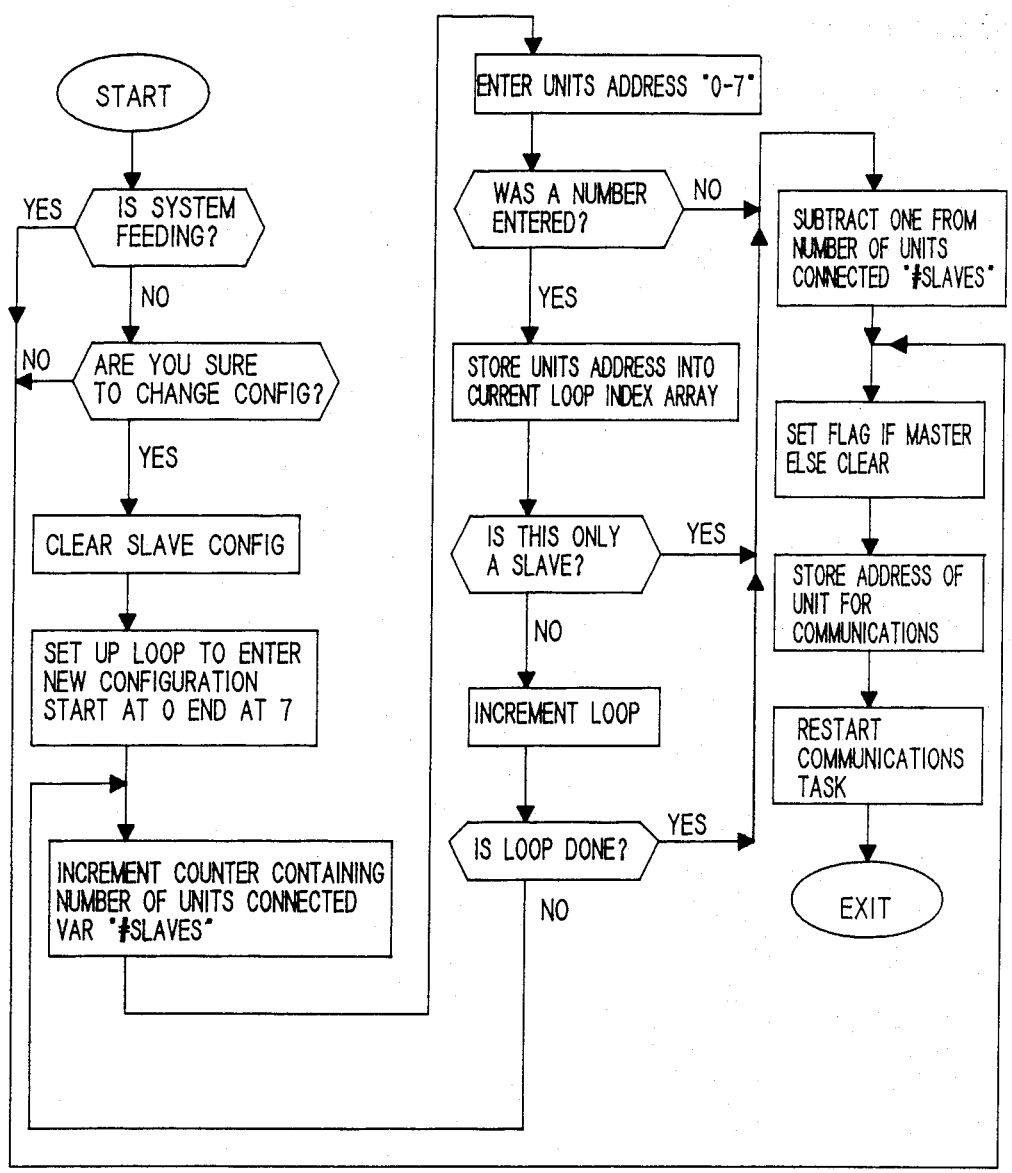
Figure 70:
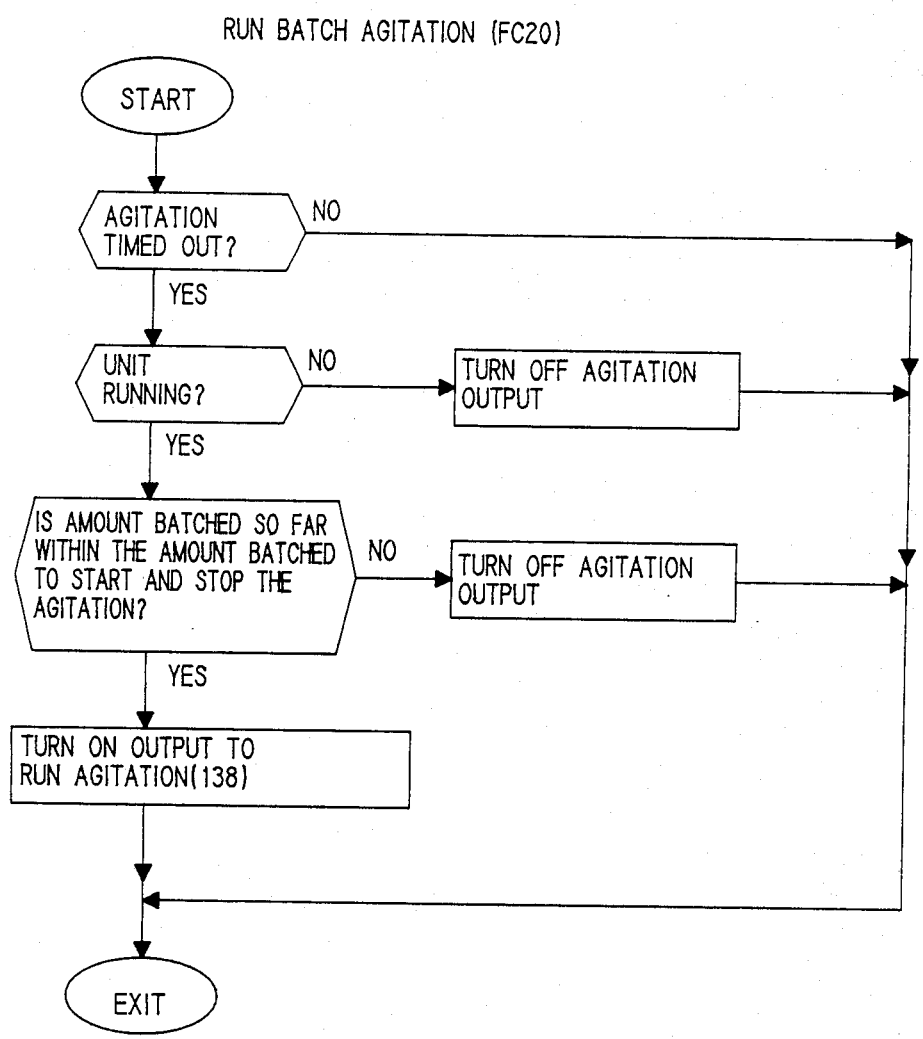

The tasks performed by computer 118, in accordance with the present invention, are illustrated in detail in FIGS. 5–70. FIG. 5 shows an exemplary embodiment of a startup routine. The startup routine is executed upon powering-up of the system to establish the multitask queue, and to initialize the system.

Figure 36:
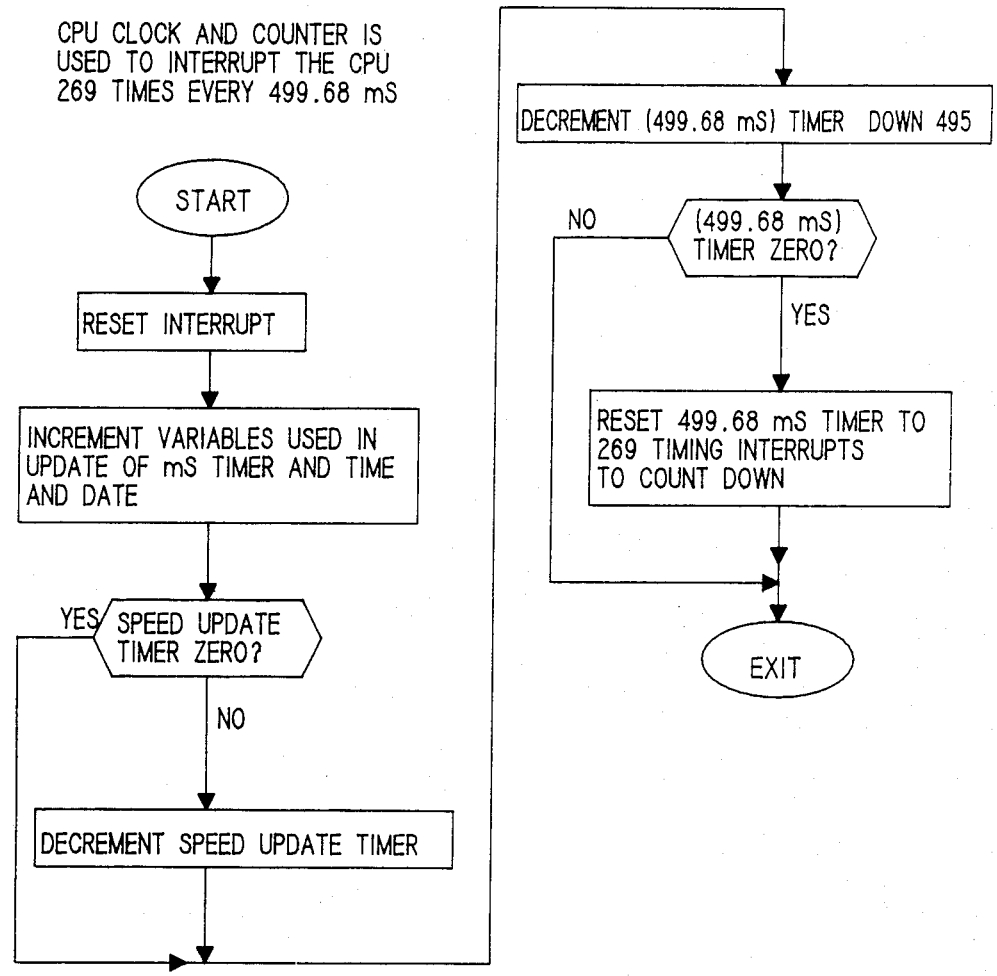
Figure 37:
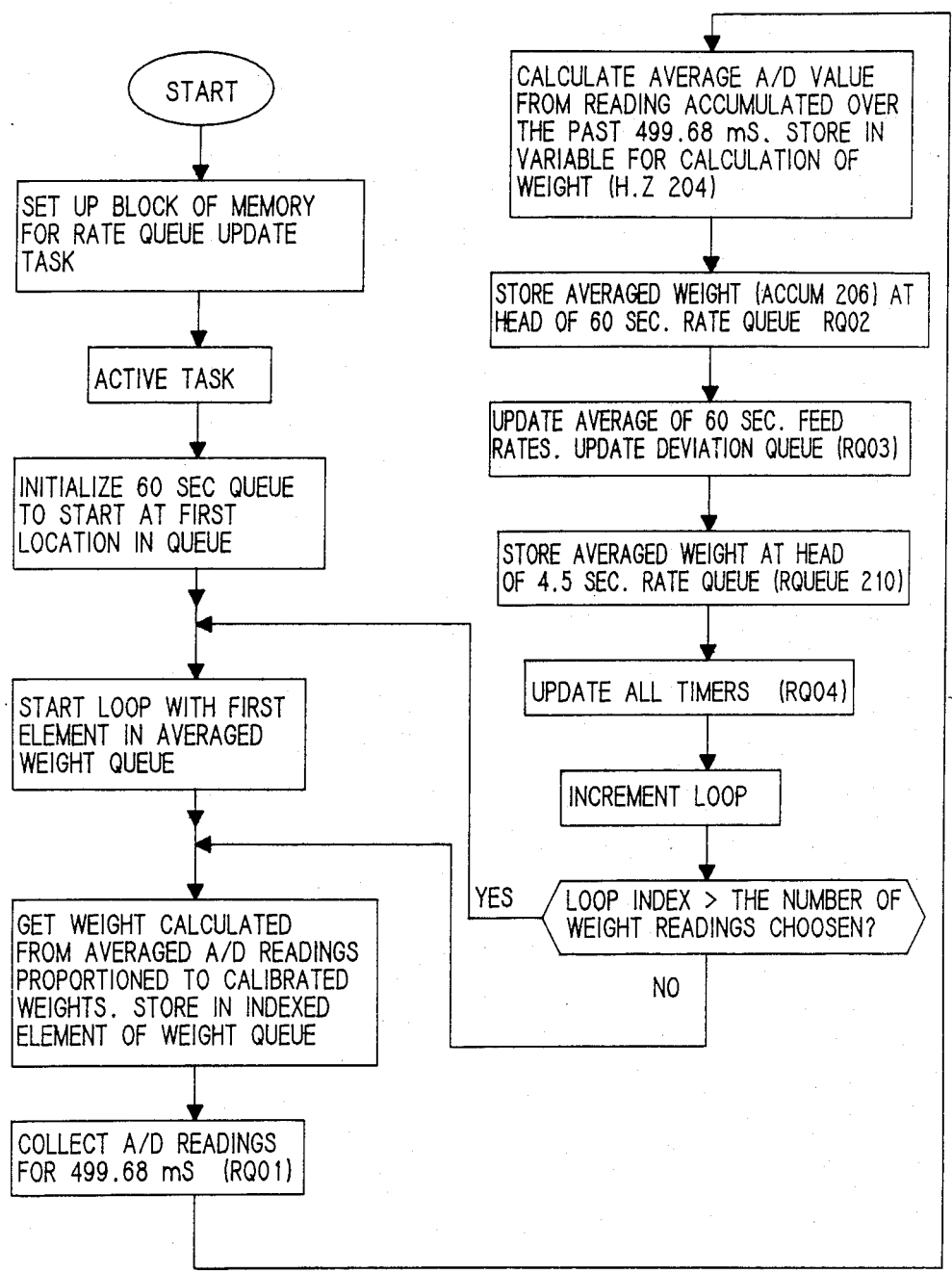
Figure 38:
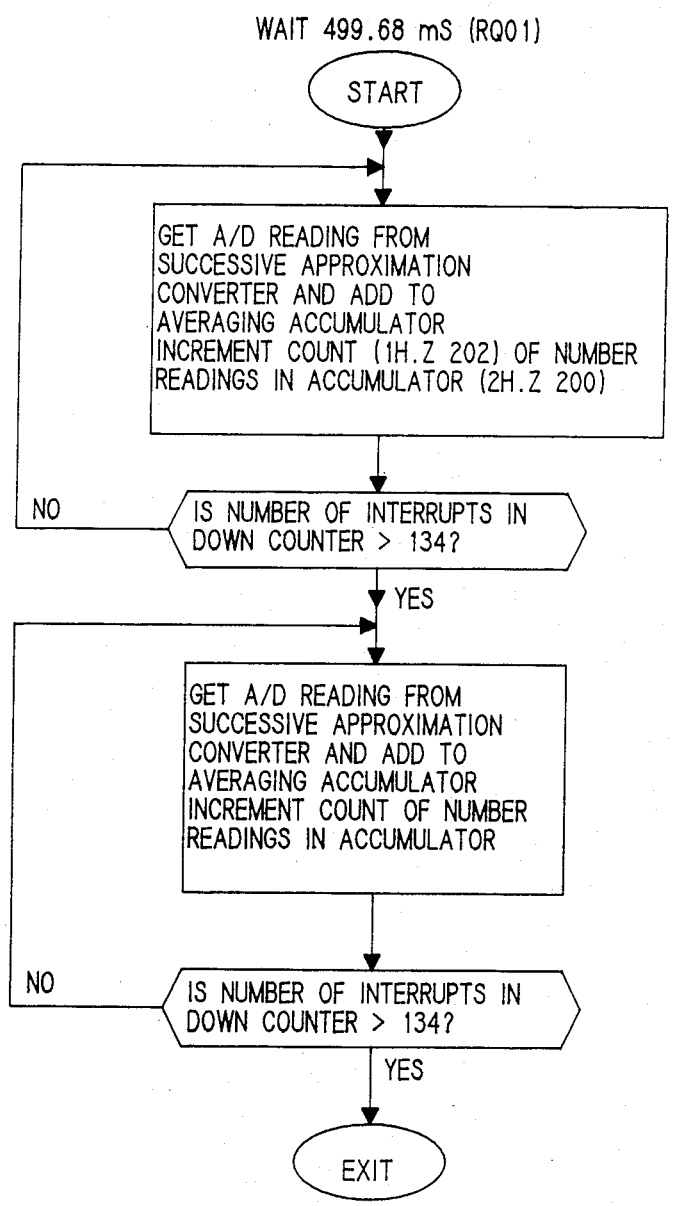
Figure 39:
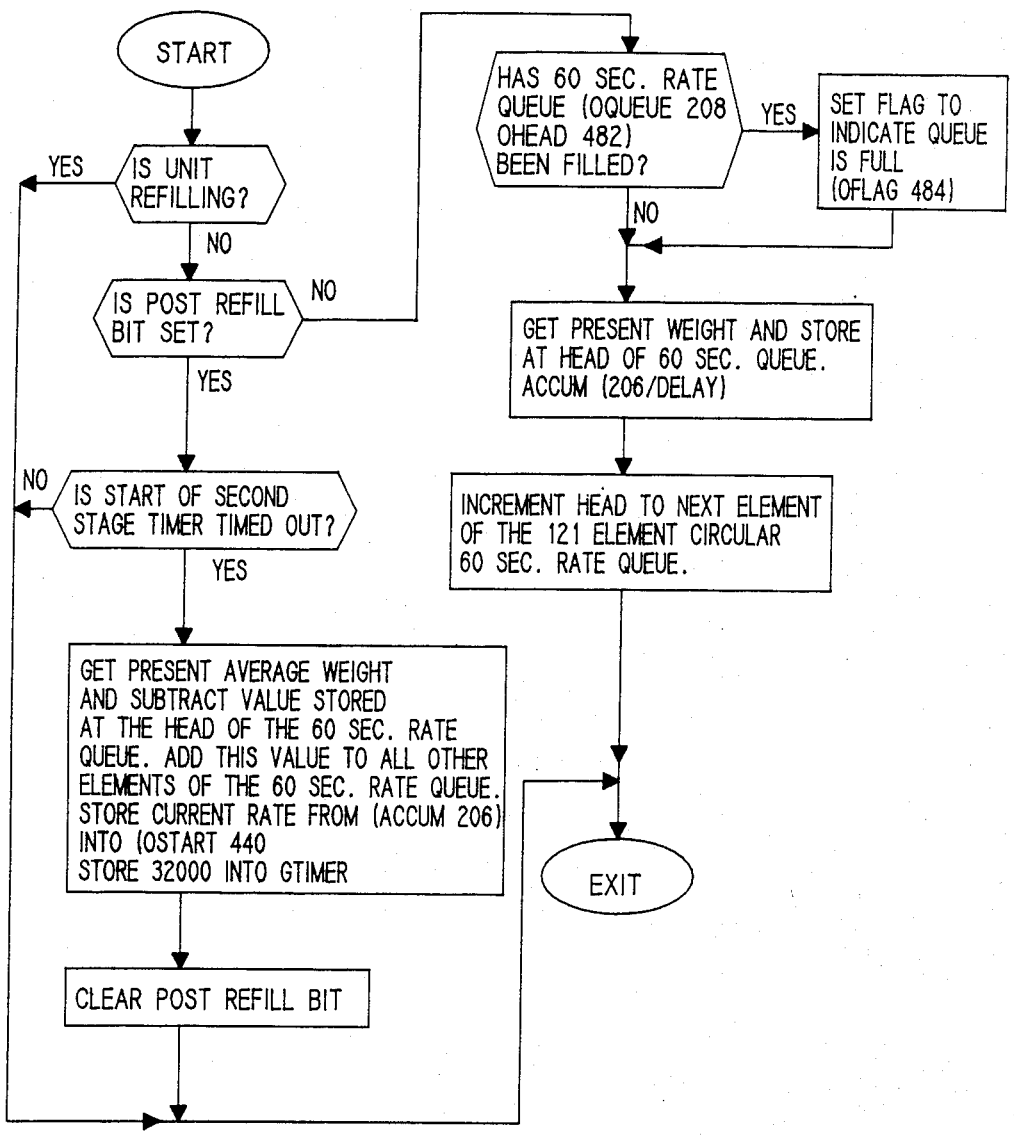
Figure 40:
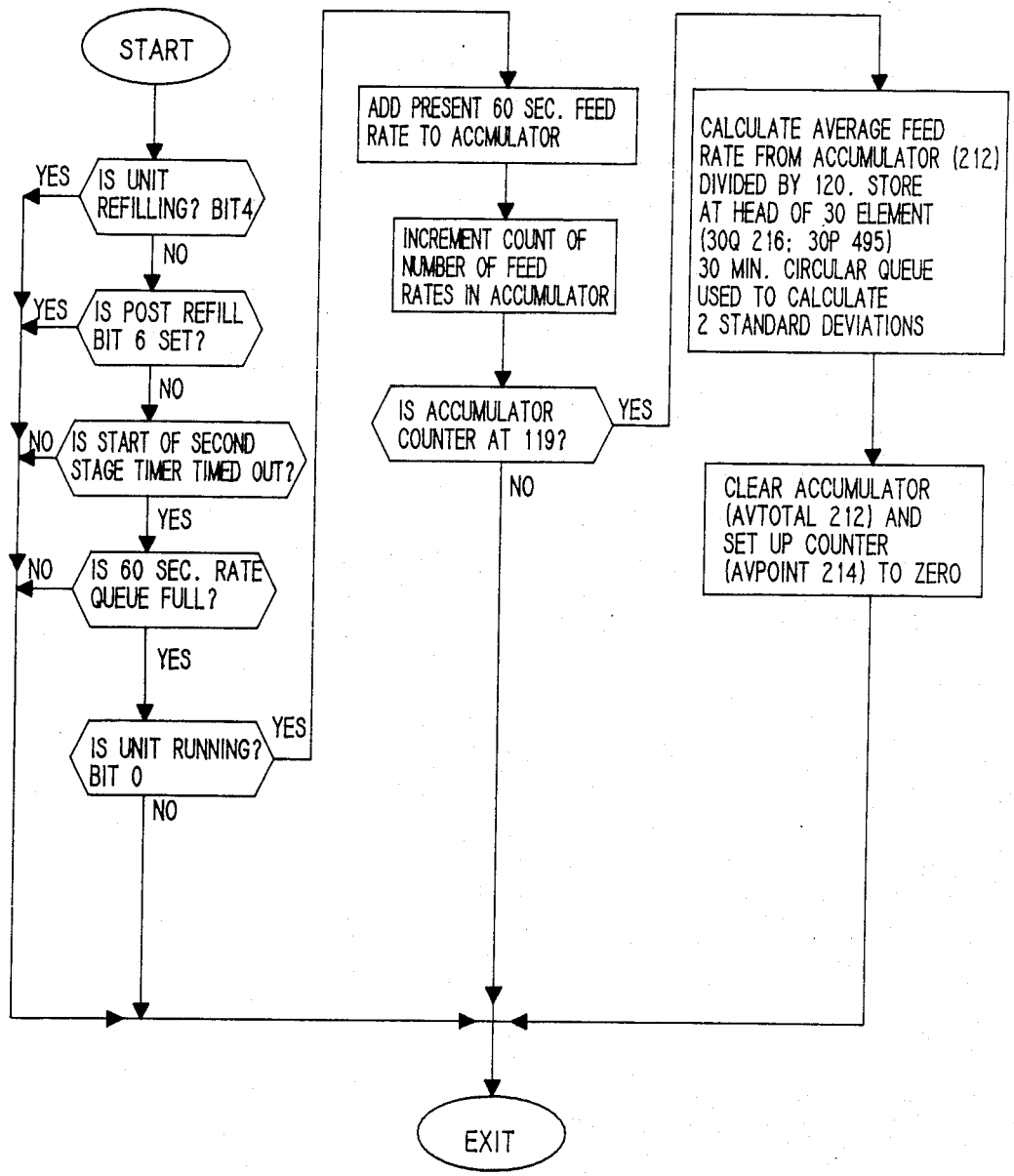
Figure 41:
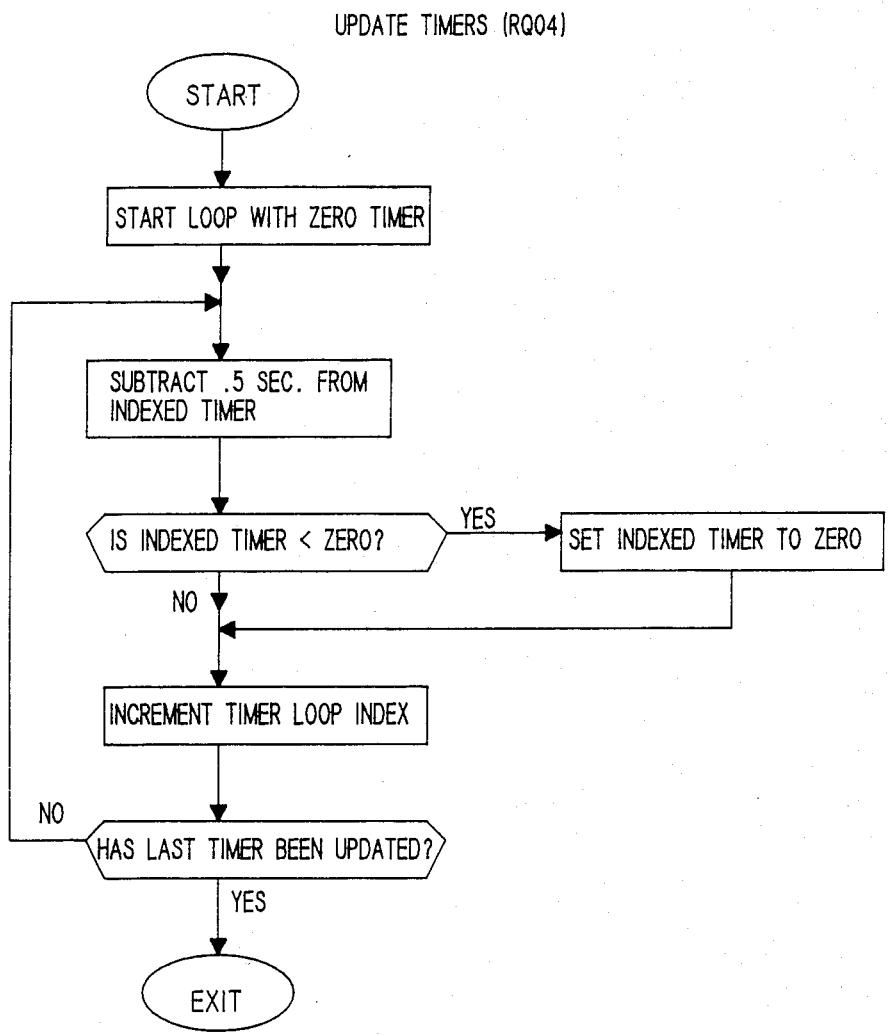

FIGS. 6–35 then illustrate a preferred embodiment of a main operations task. The main operations task provides an operator interface to the system through use of menu prompts, as will hereinbelow be further described. Information entered by the operator in response to these prompts is used to establish the operational environment of the system. FIG. 36 describes a suitable interrupt handler; the interrupt handler routine is executed in response to the occurrence of an interrupt signal which is generated on a periodic basis; e.g., 269 times every 499.68 milliseconds.

FIGS. 37–41 show an exemplary rate queue update task in accordance with one aspect of the present invention. As will further be described hereinbelow, the rate queue update task establishes and updates various queues used during the feed rate correction process.

Figure 42:
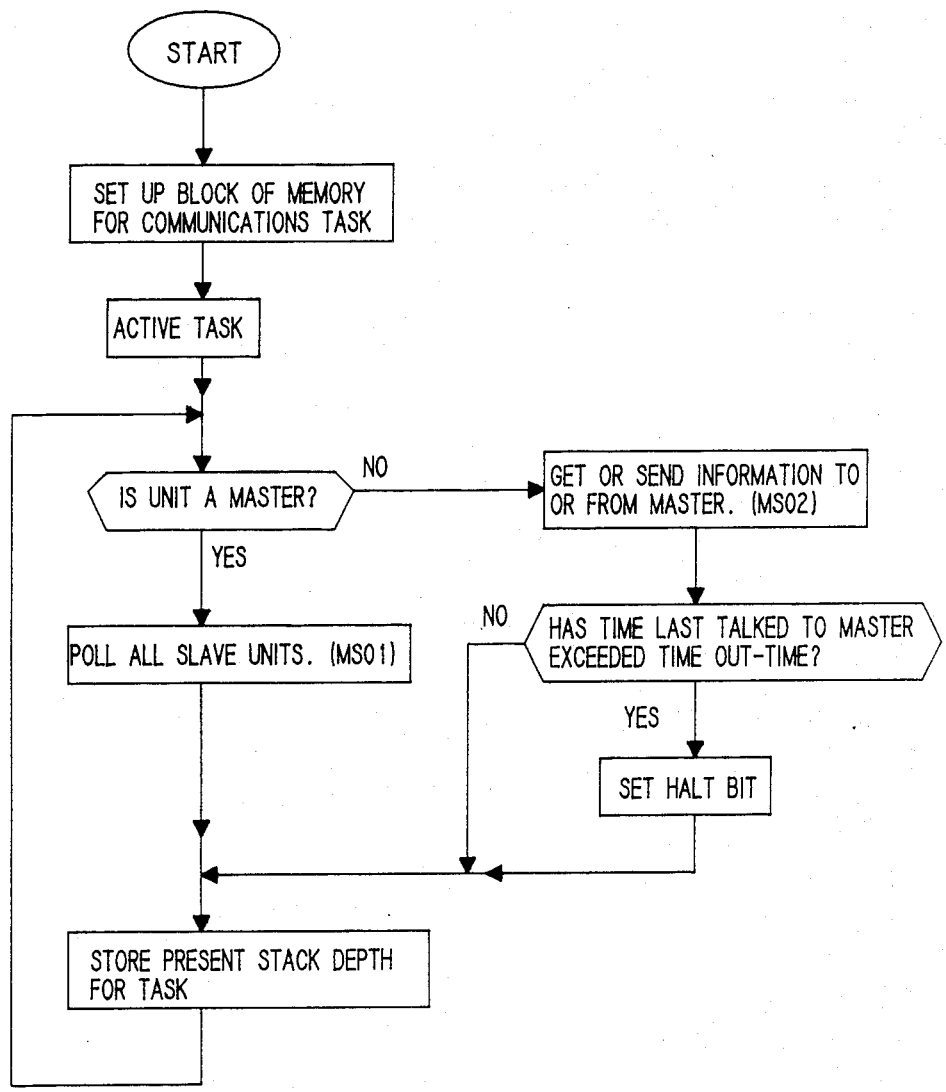
Figure 43:
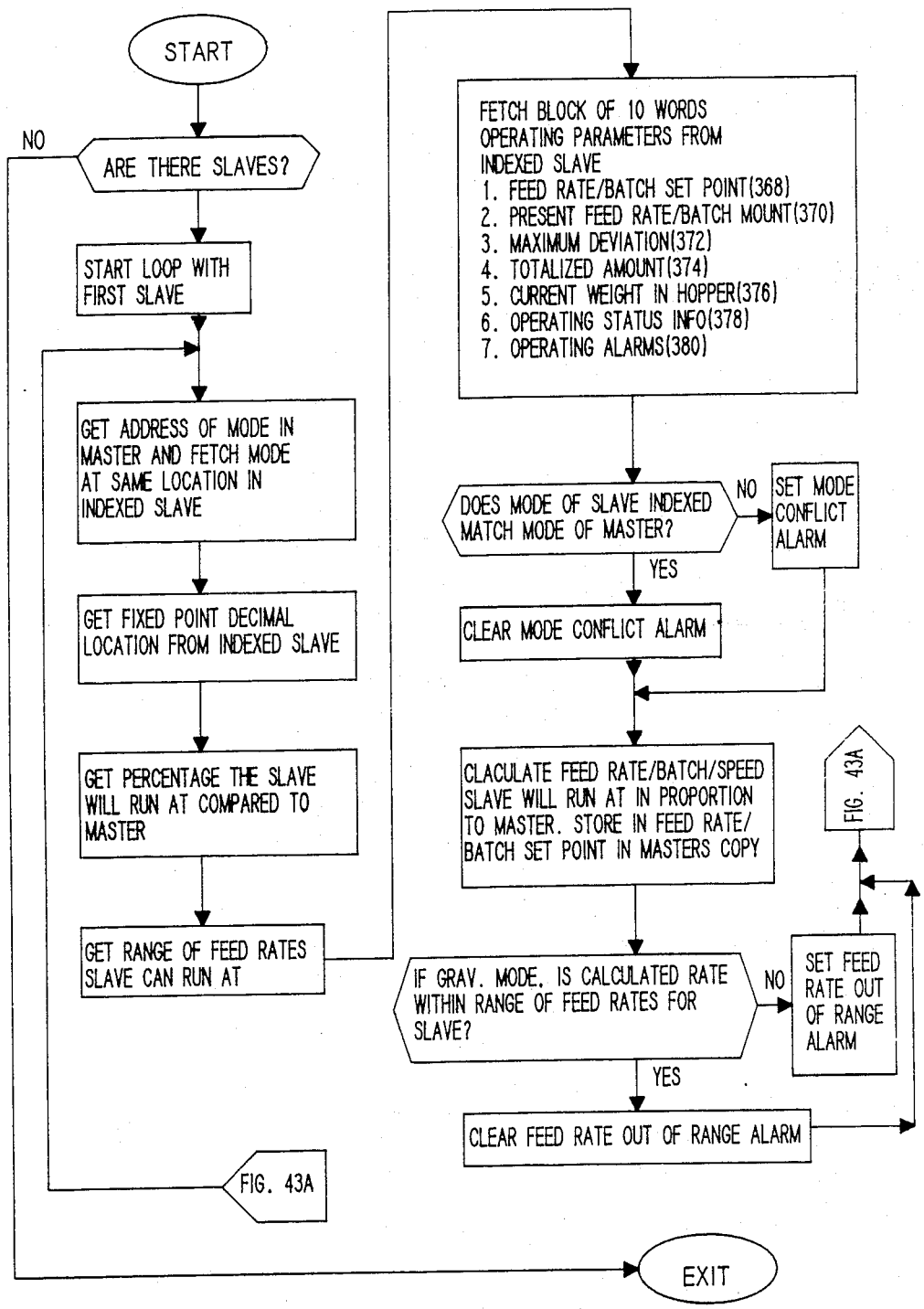
Figure 43A:
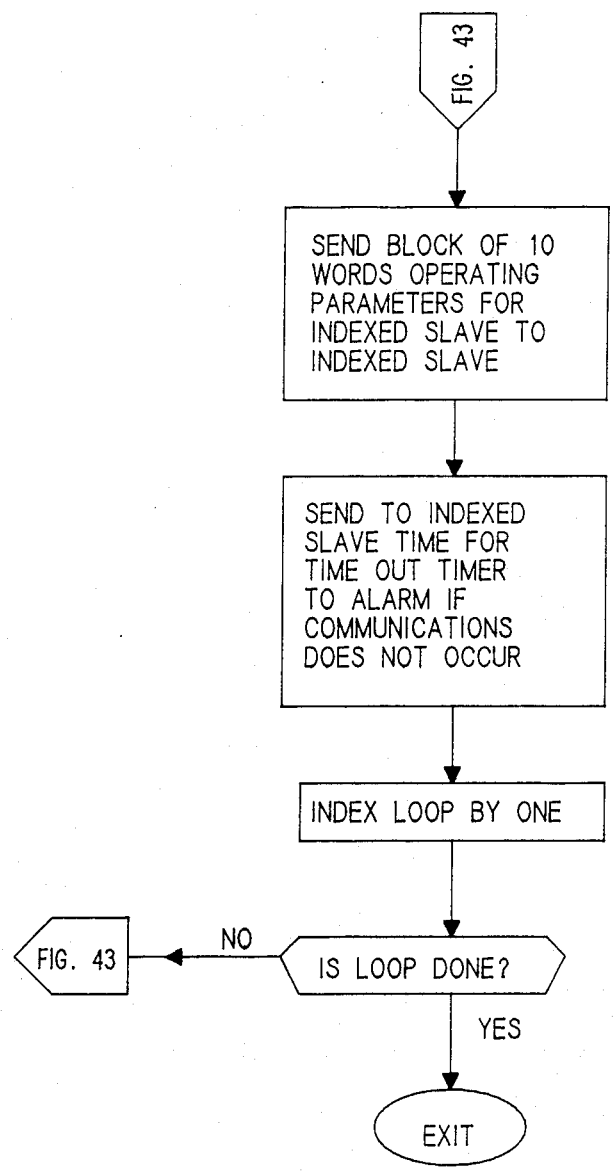
Figure 44:
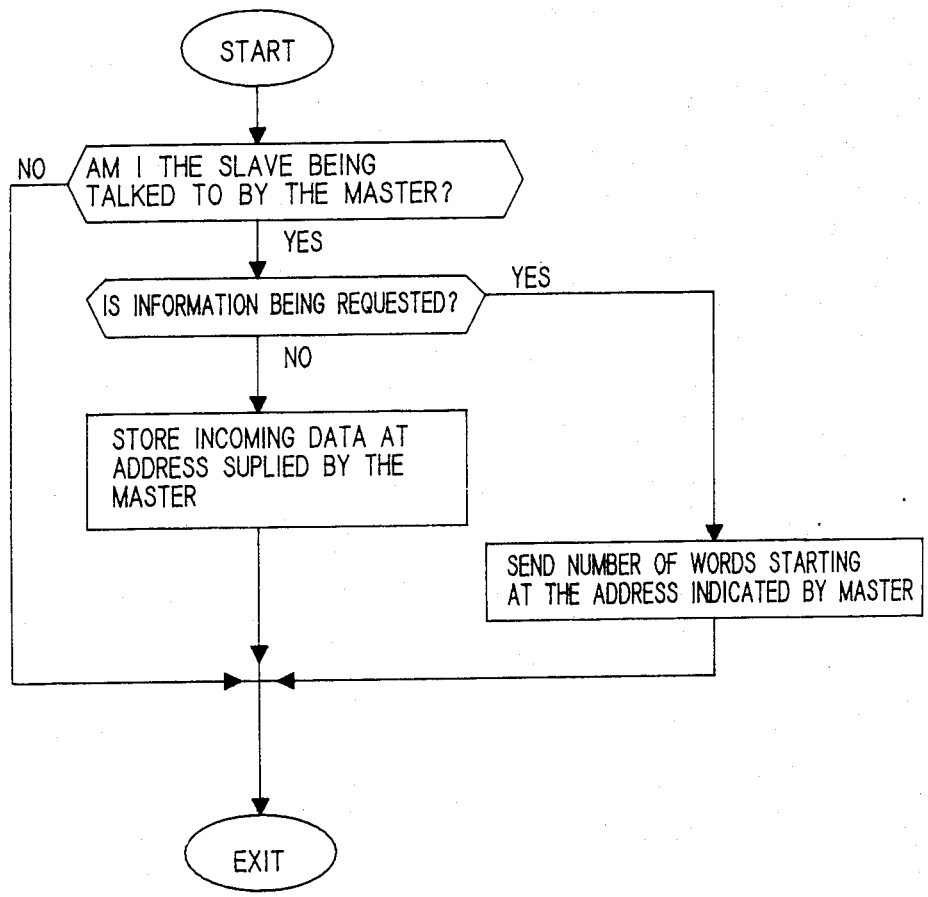
Figure 45:
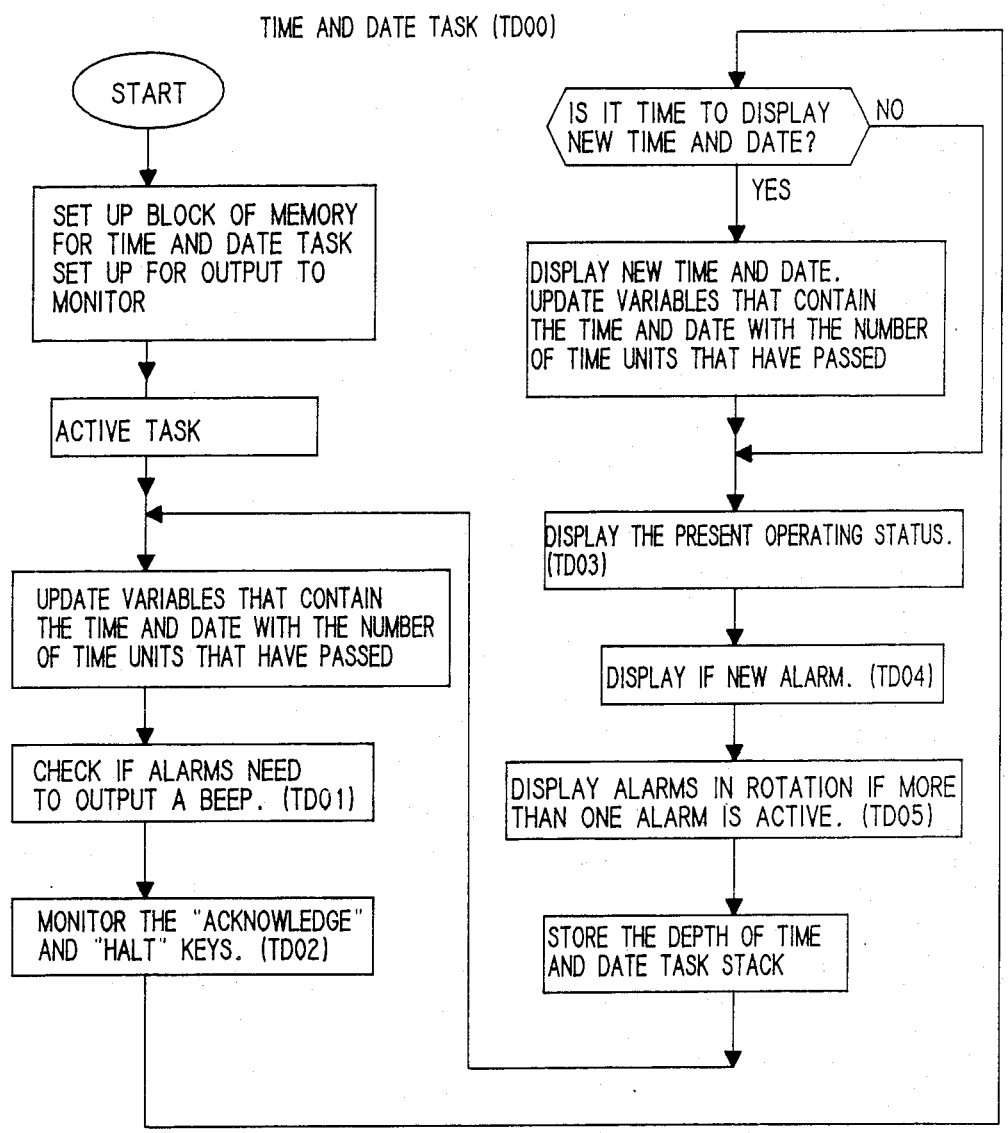
Figure 46:
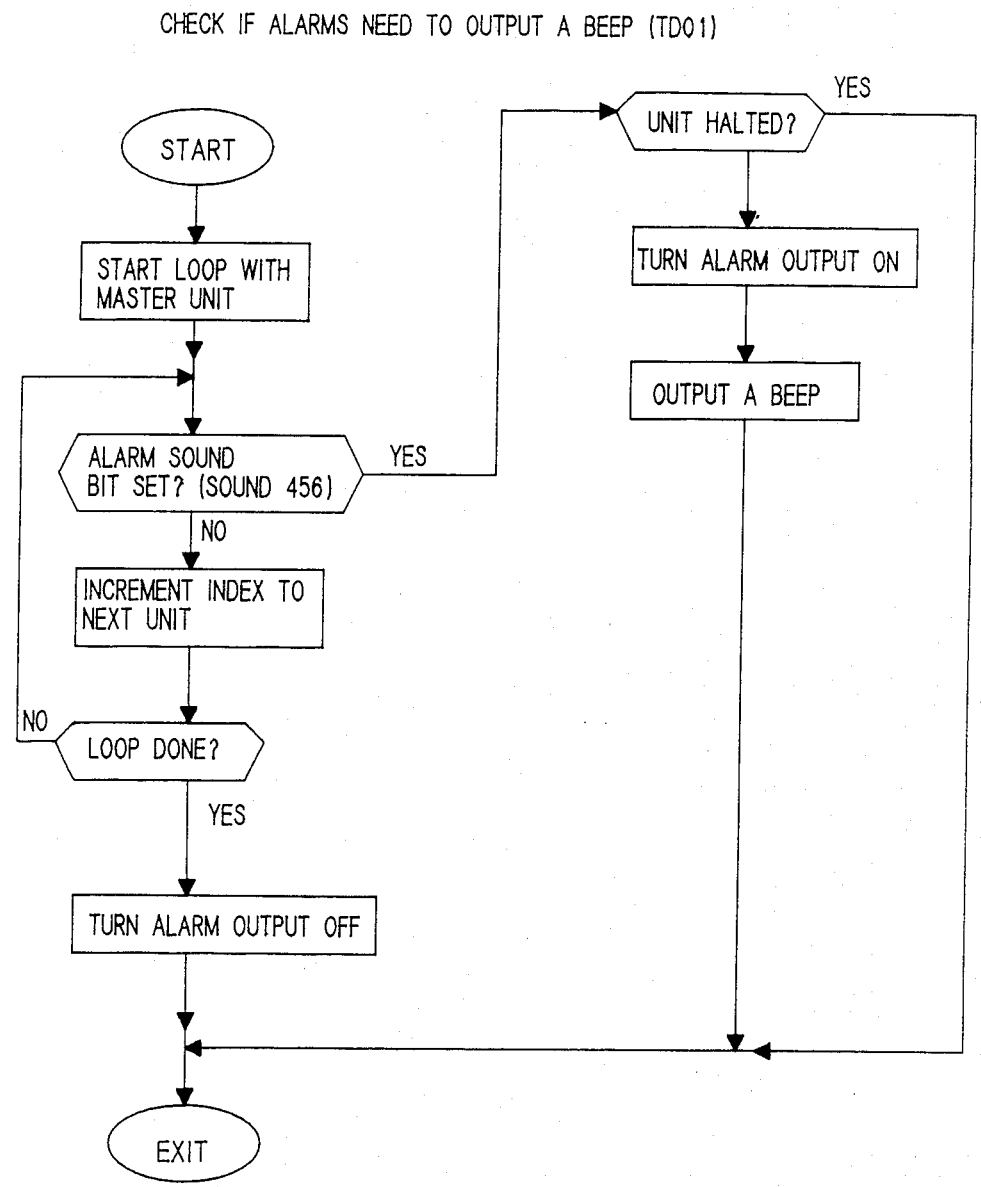
Figure 47:
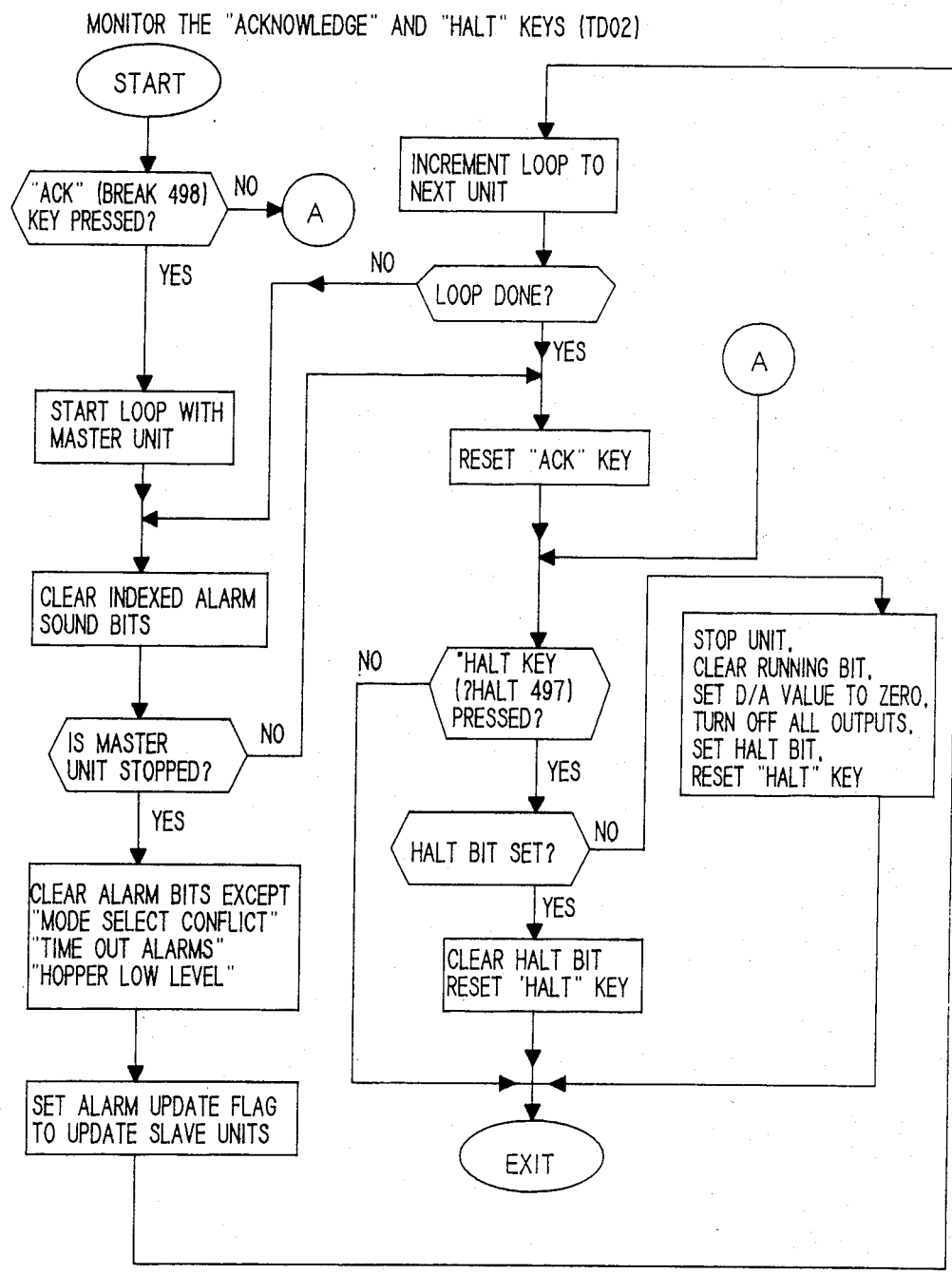
Figure 48:
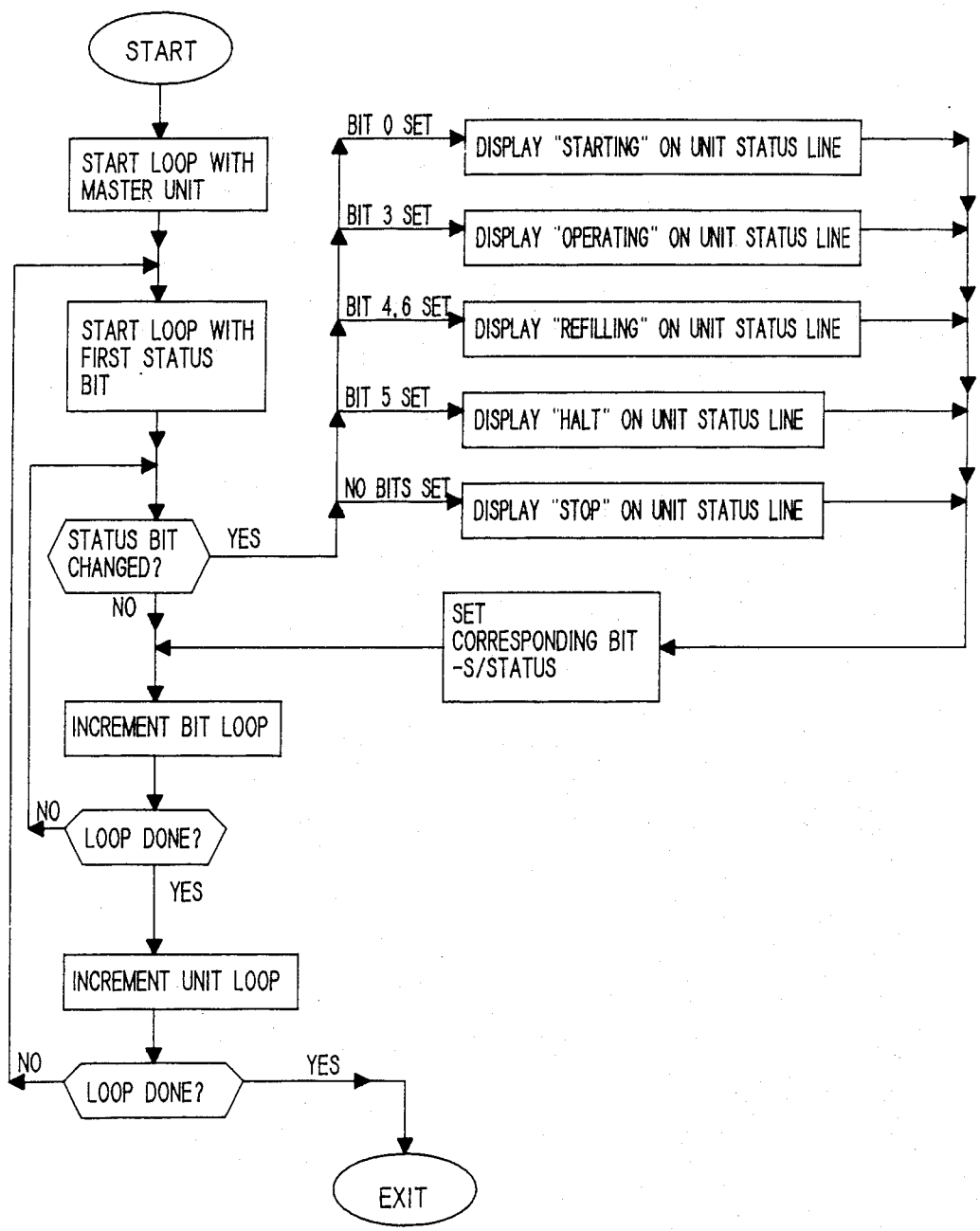
Figure 49:
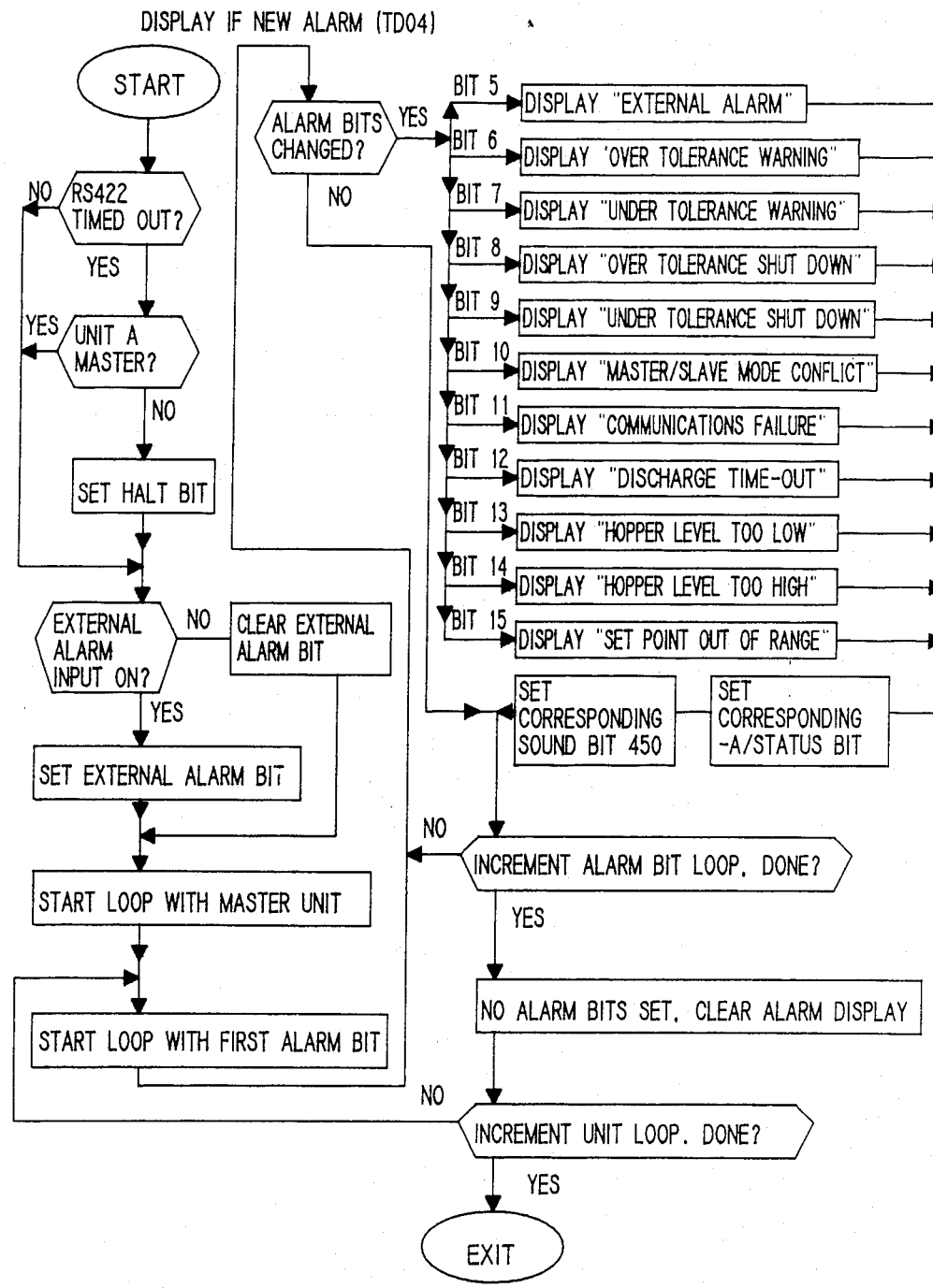
Figure 50:
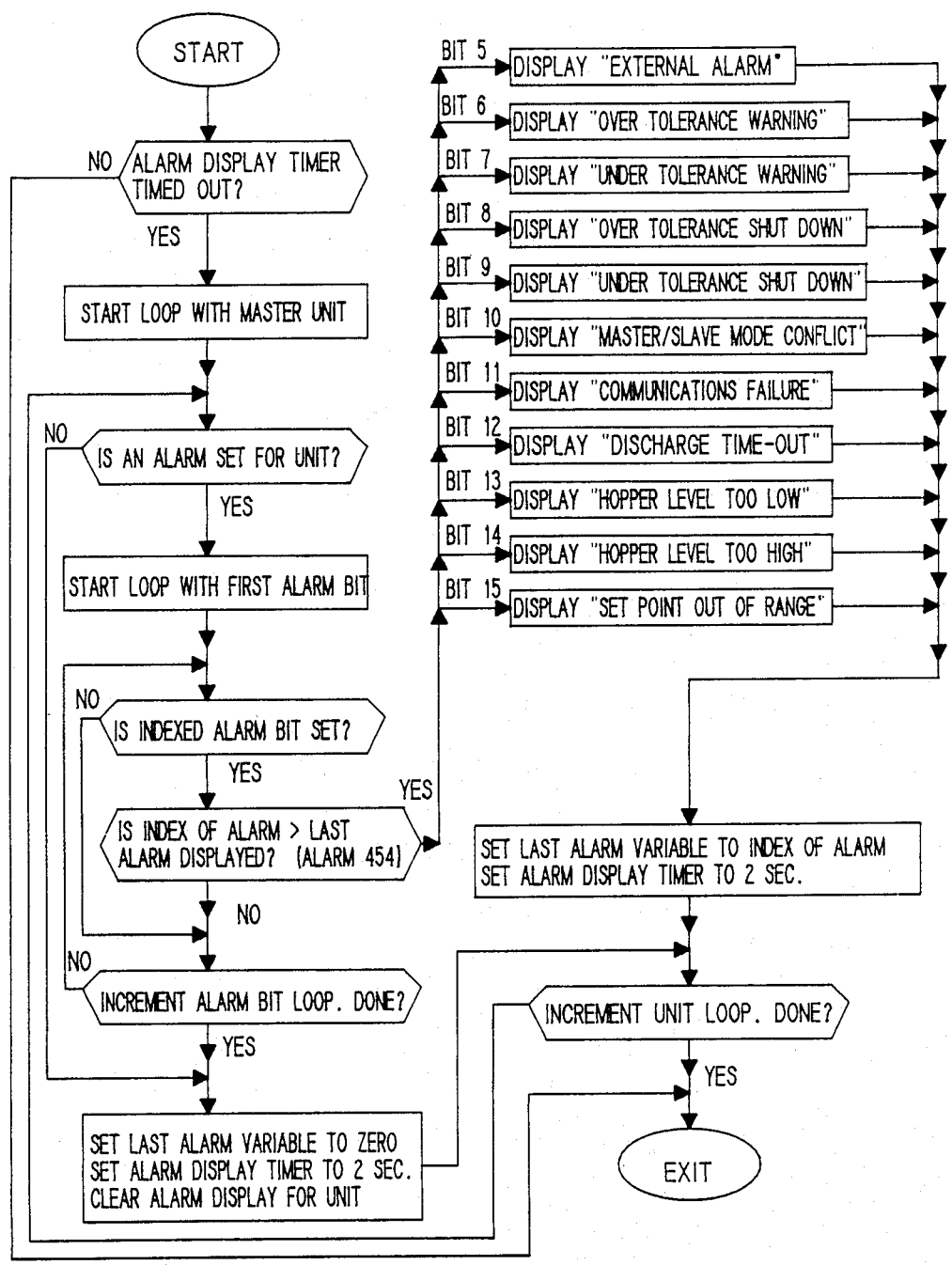
Figure 51:
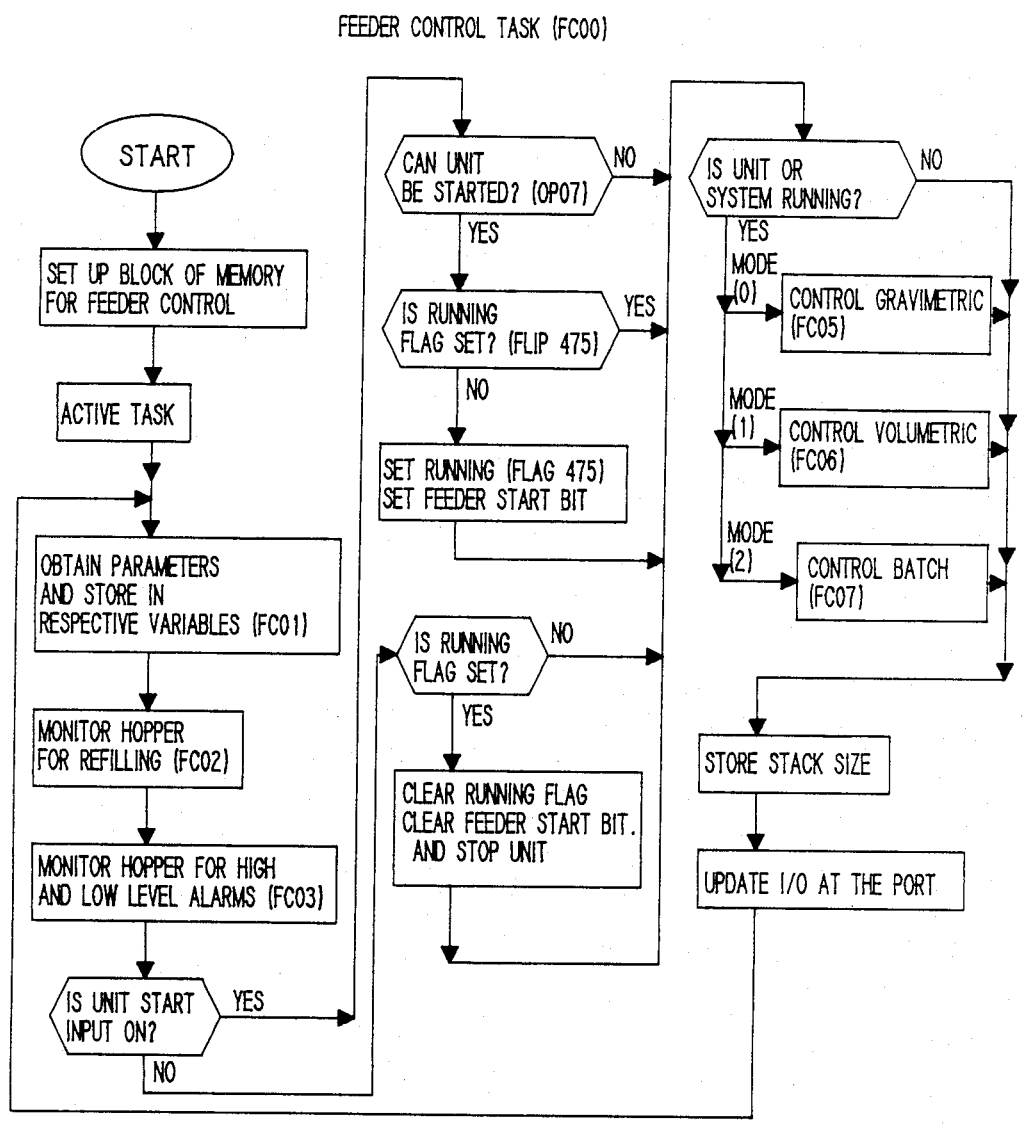
Figure 52:
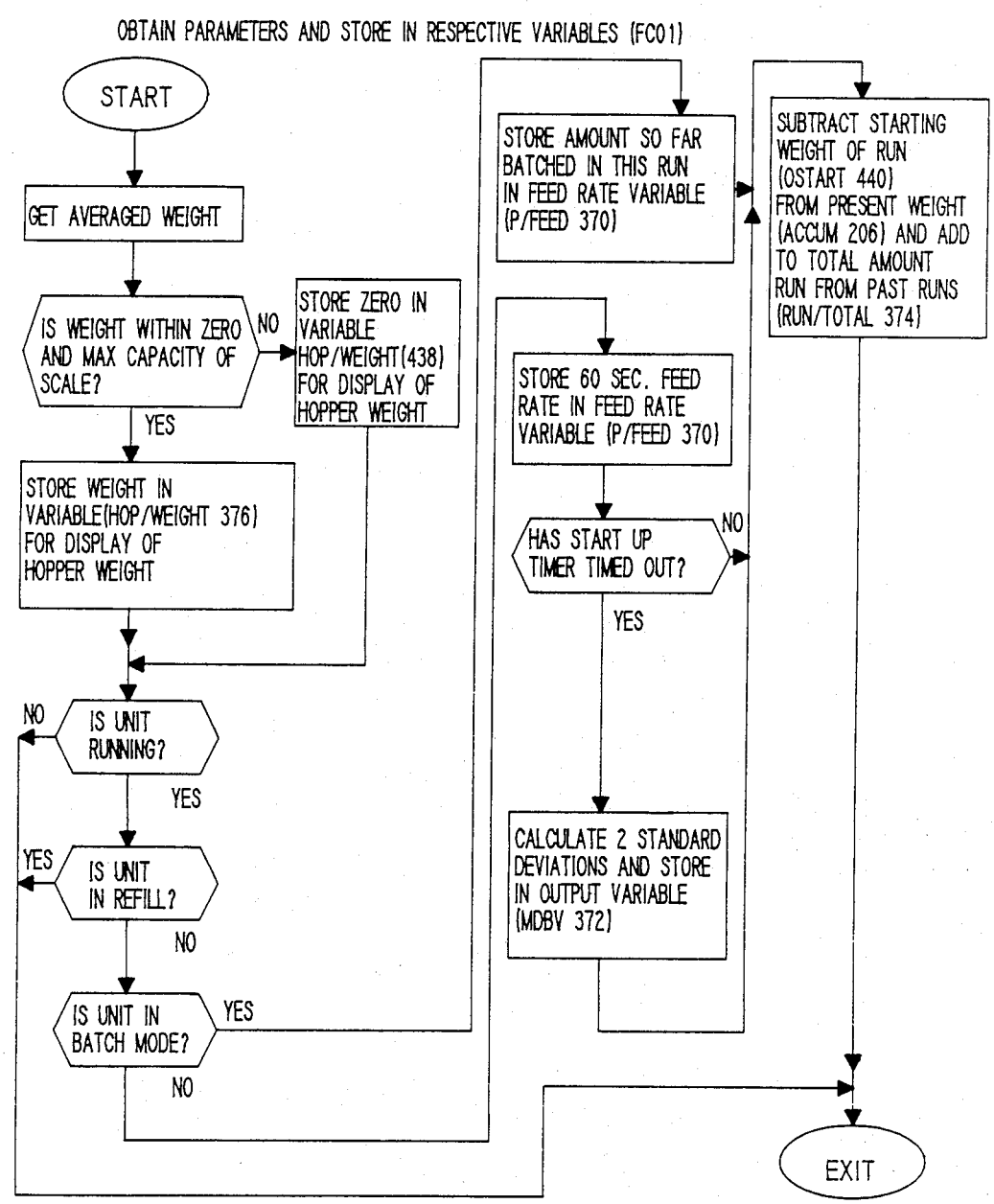
Figure 53:
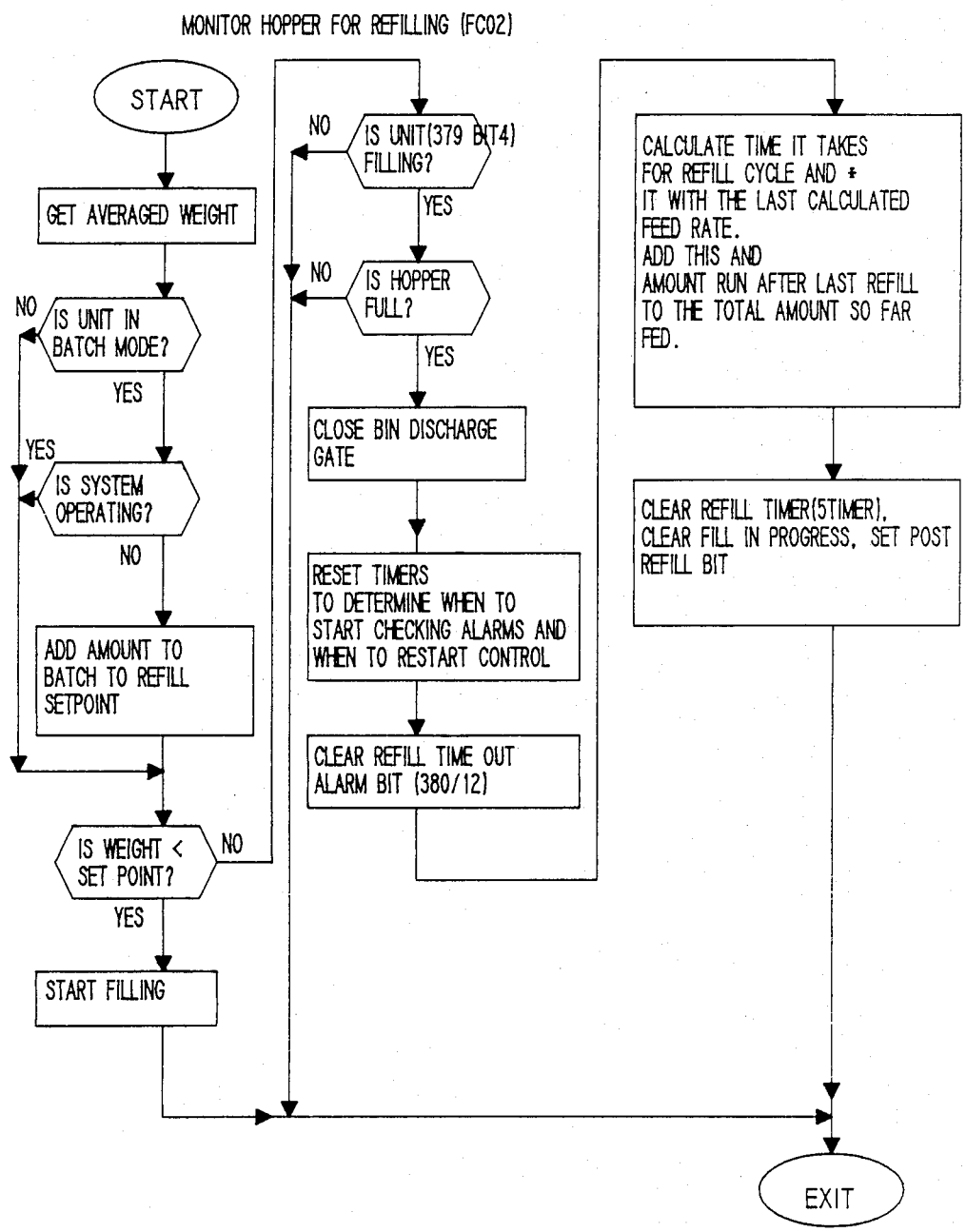
Figure 54:
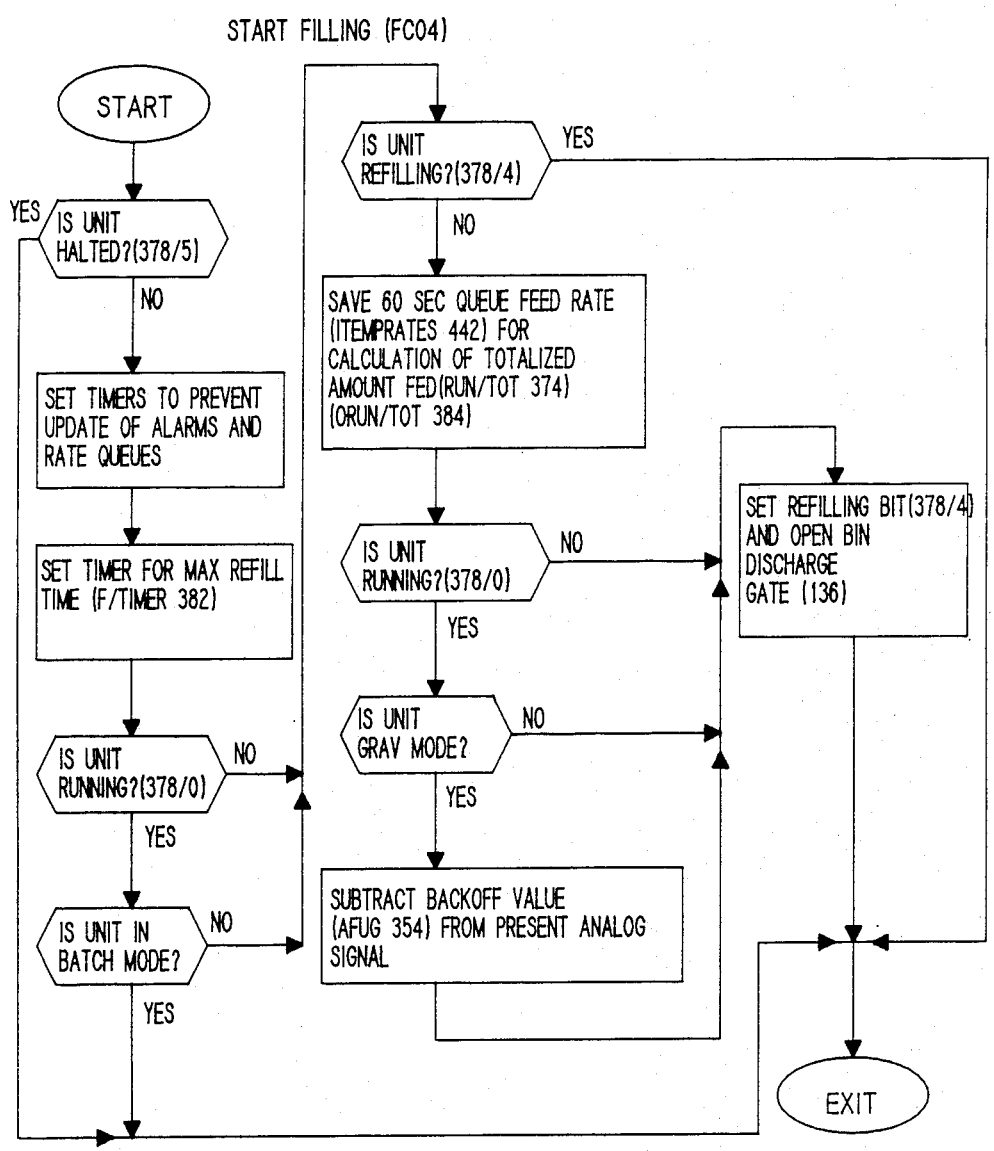
Figure 55:
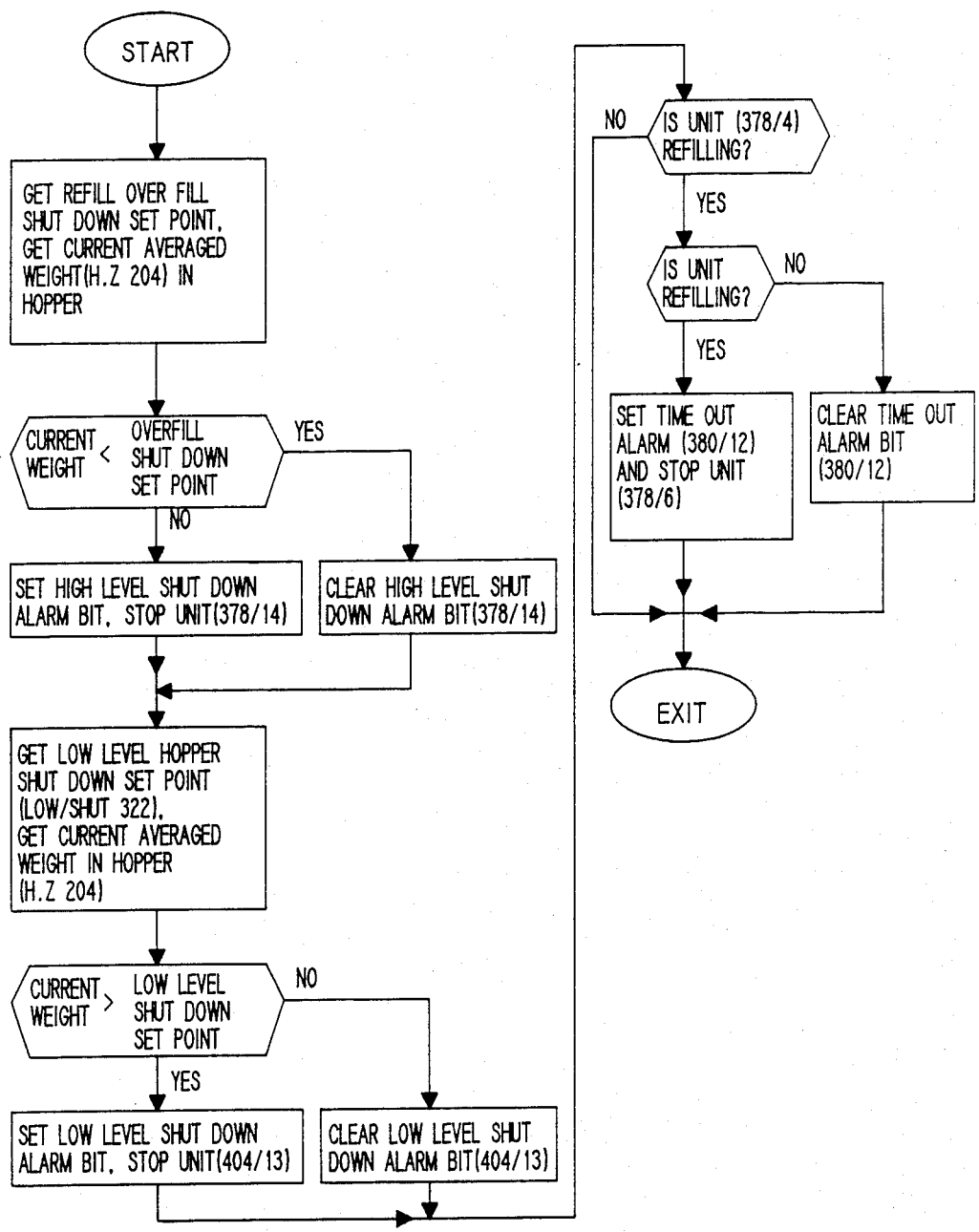
Figure 56:
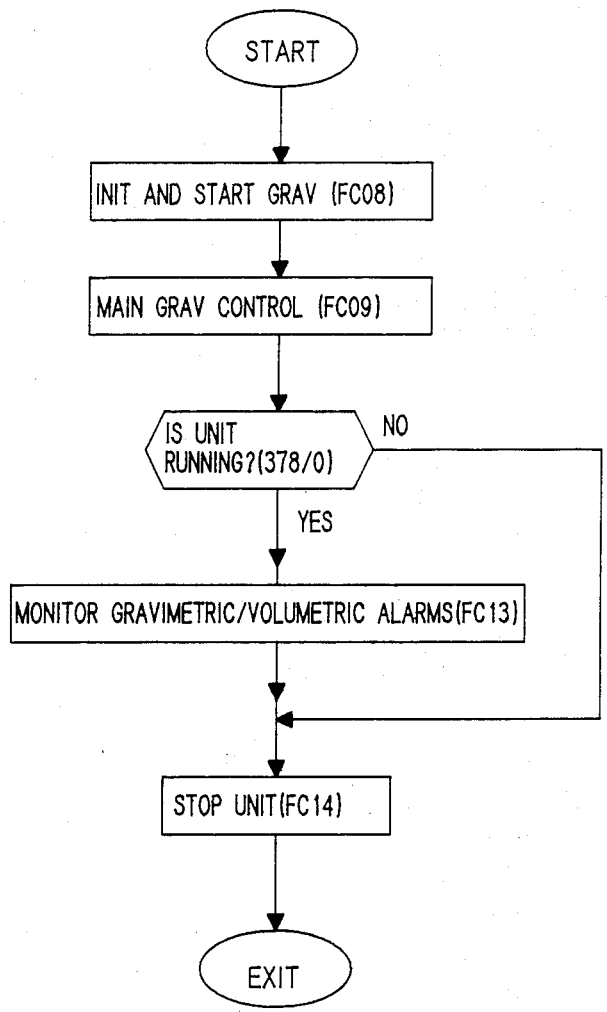
Figure 57:
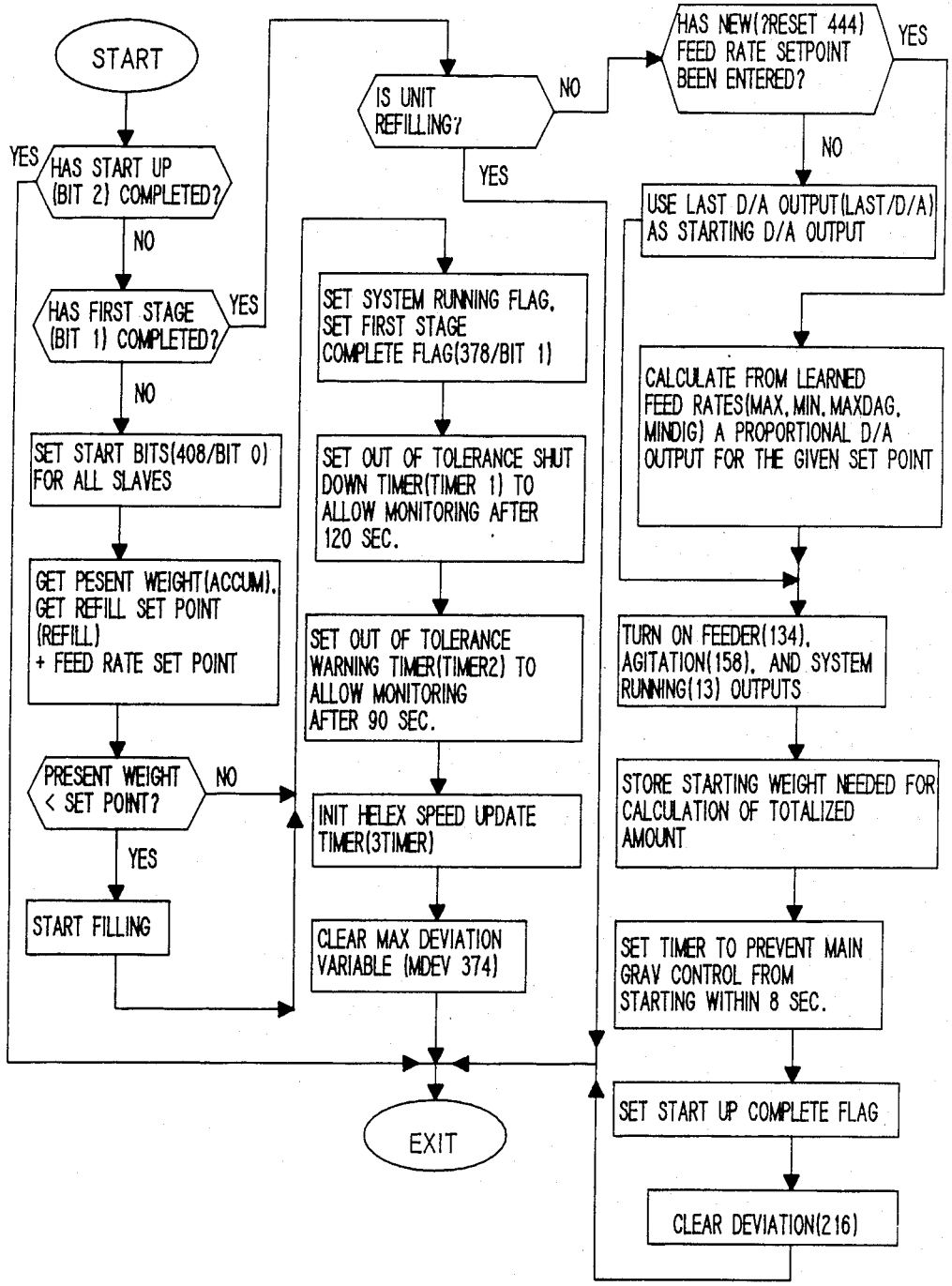
Figure 58:
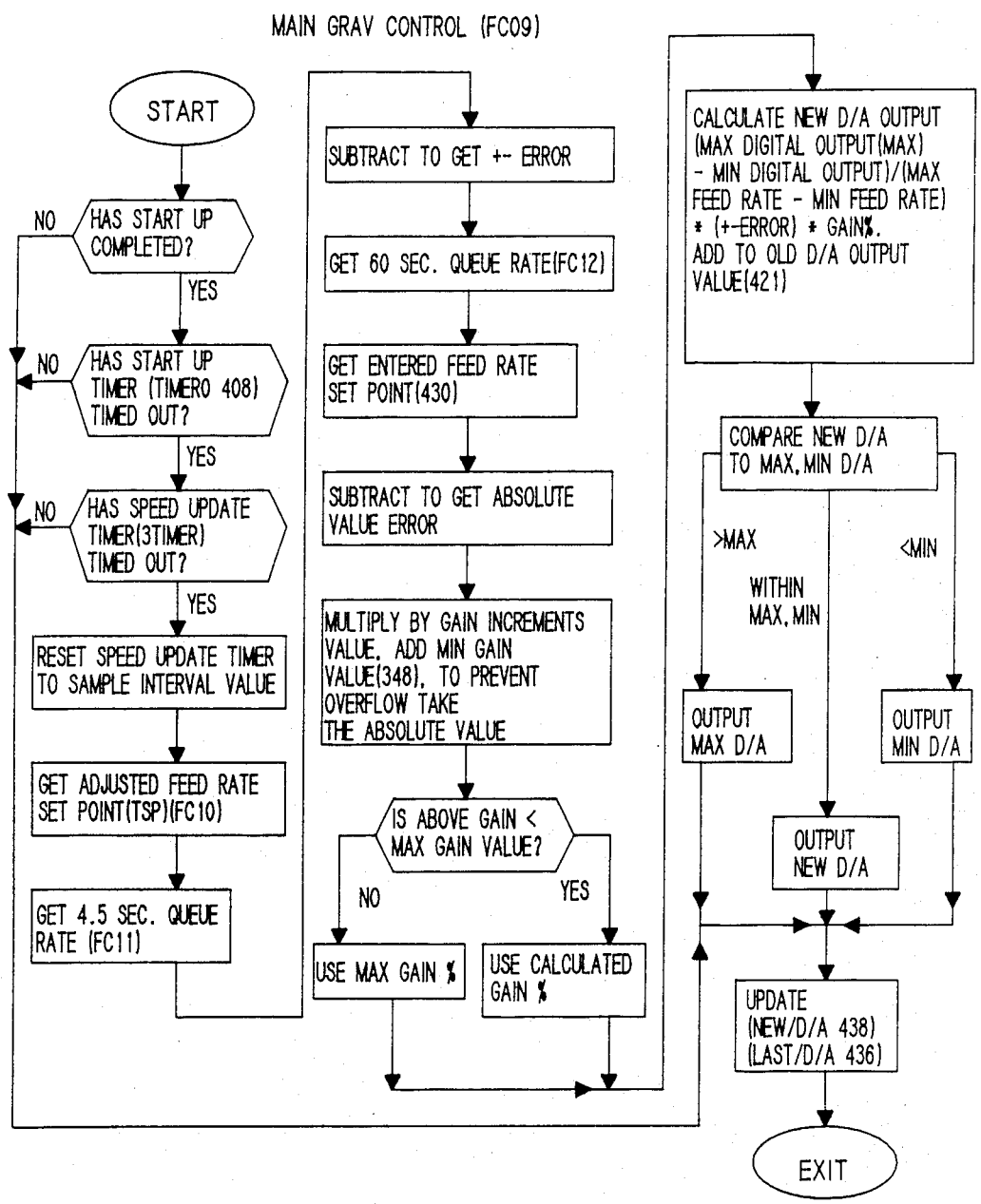
Figure 59:
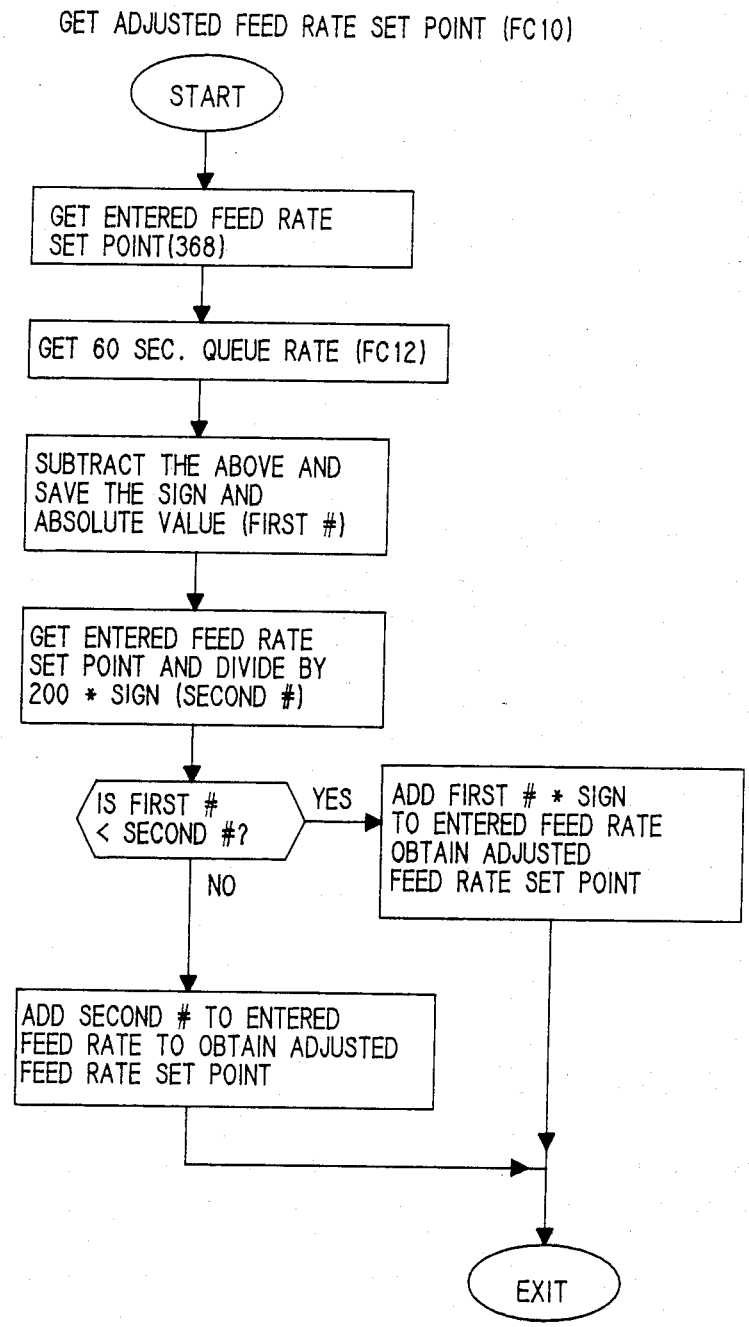
Figure 60:
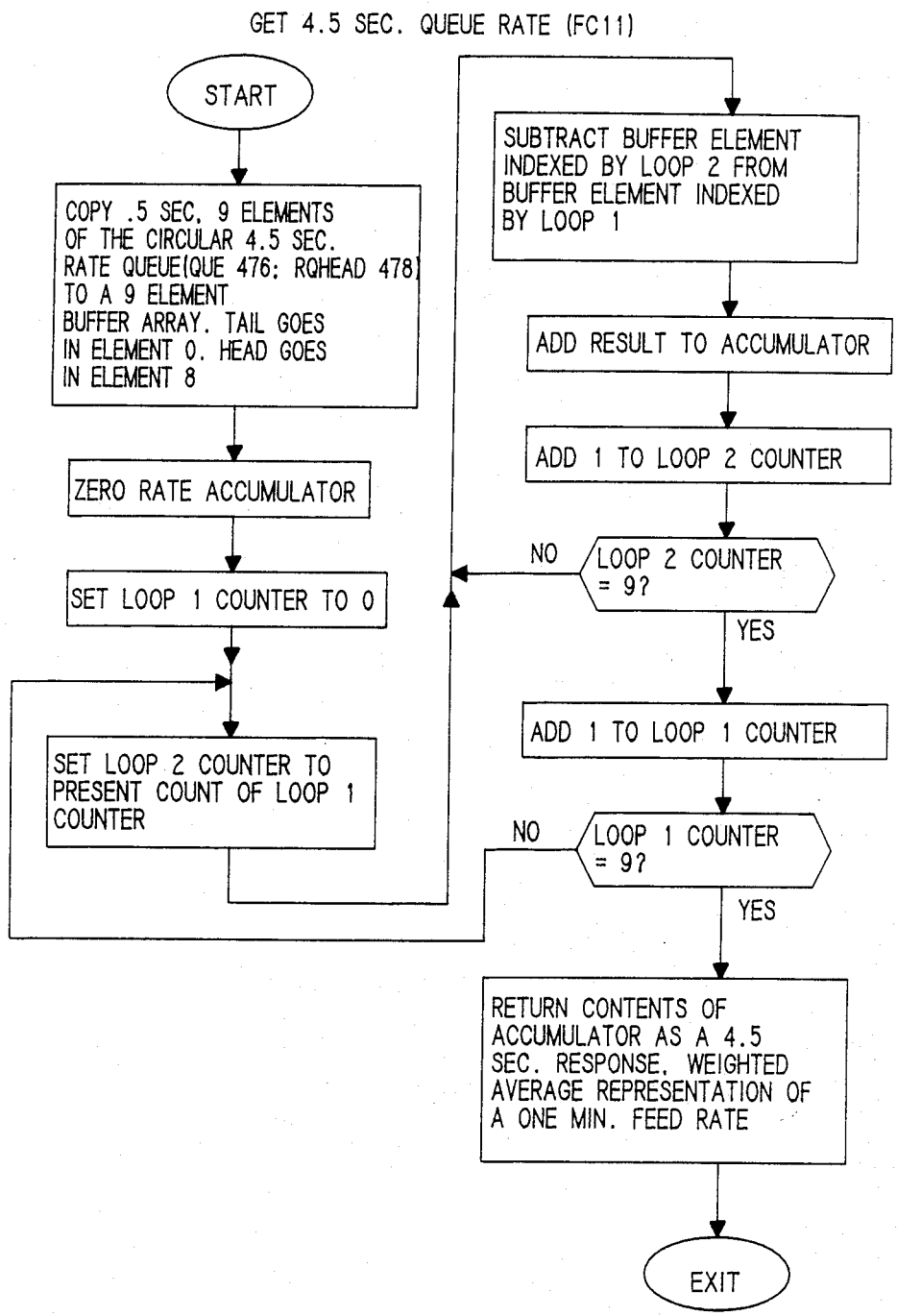
Figure 61:
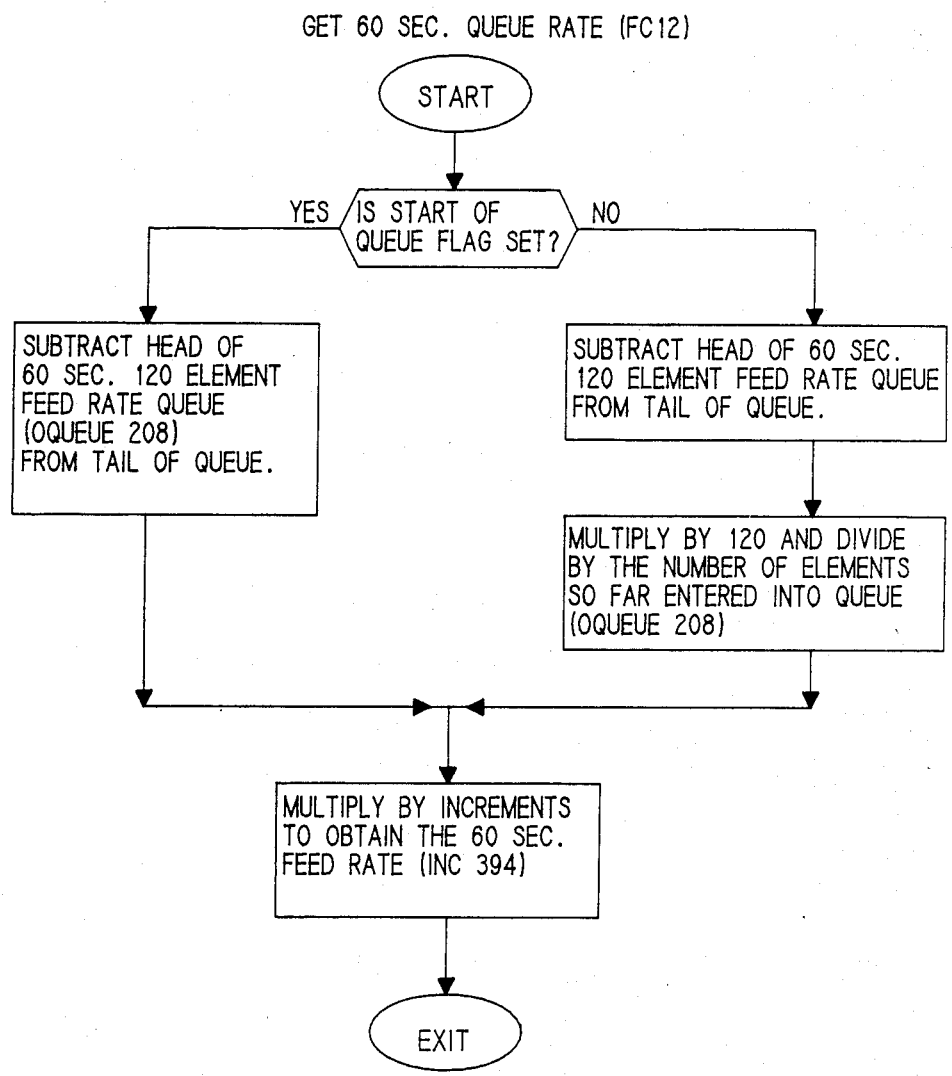
Figure 62:
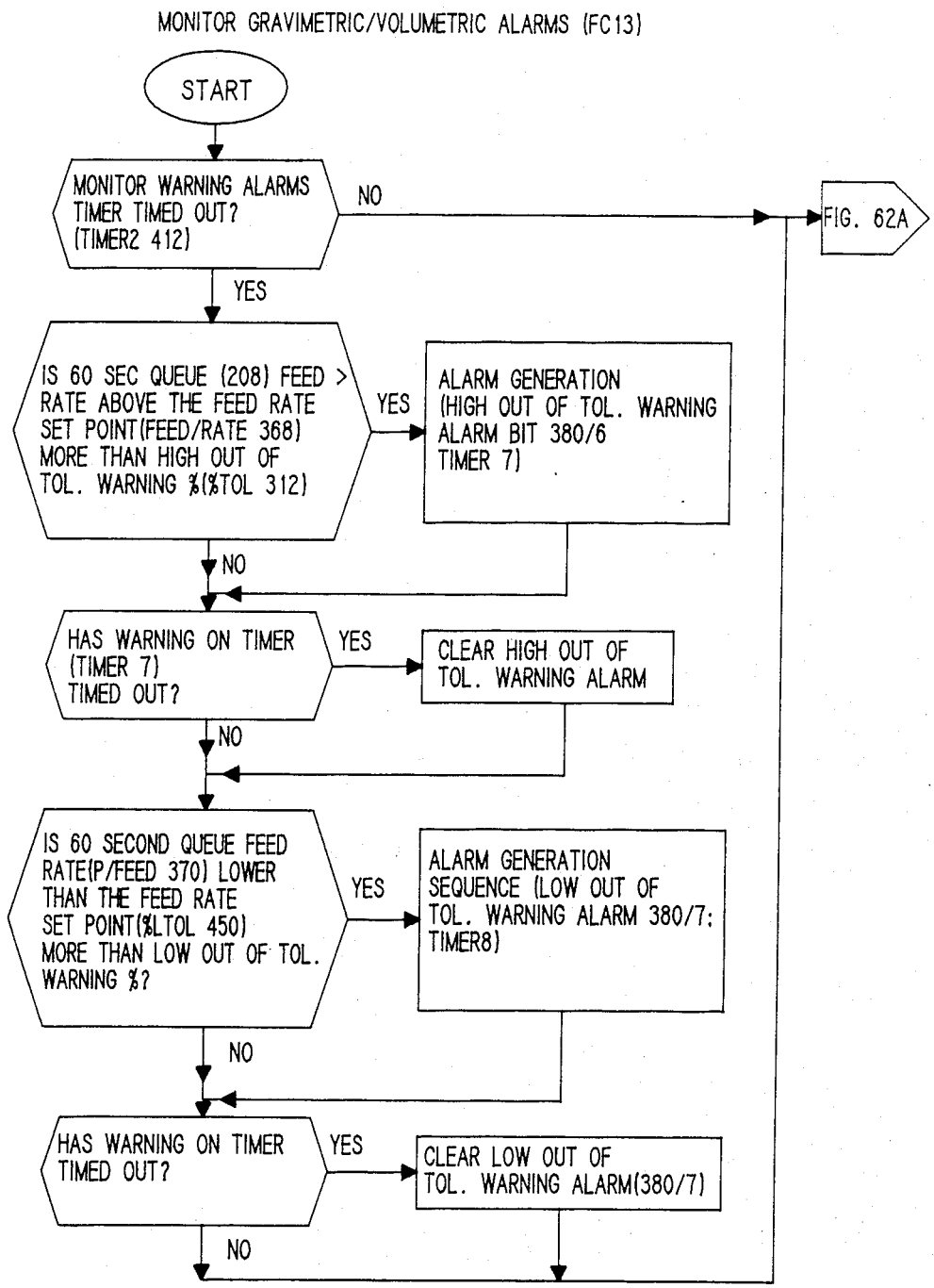
Figure 62A:
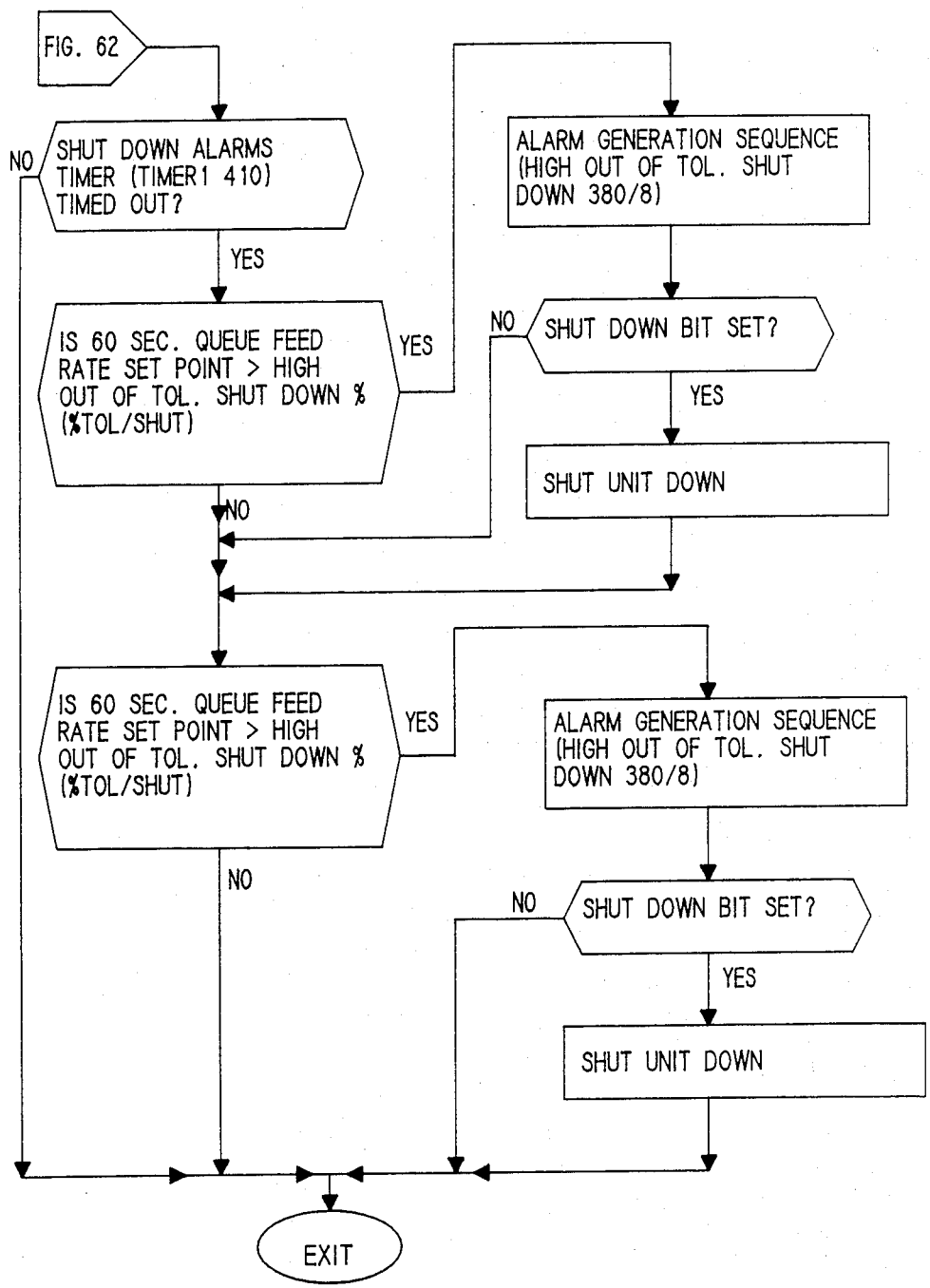
Figure 62B:
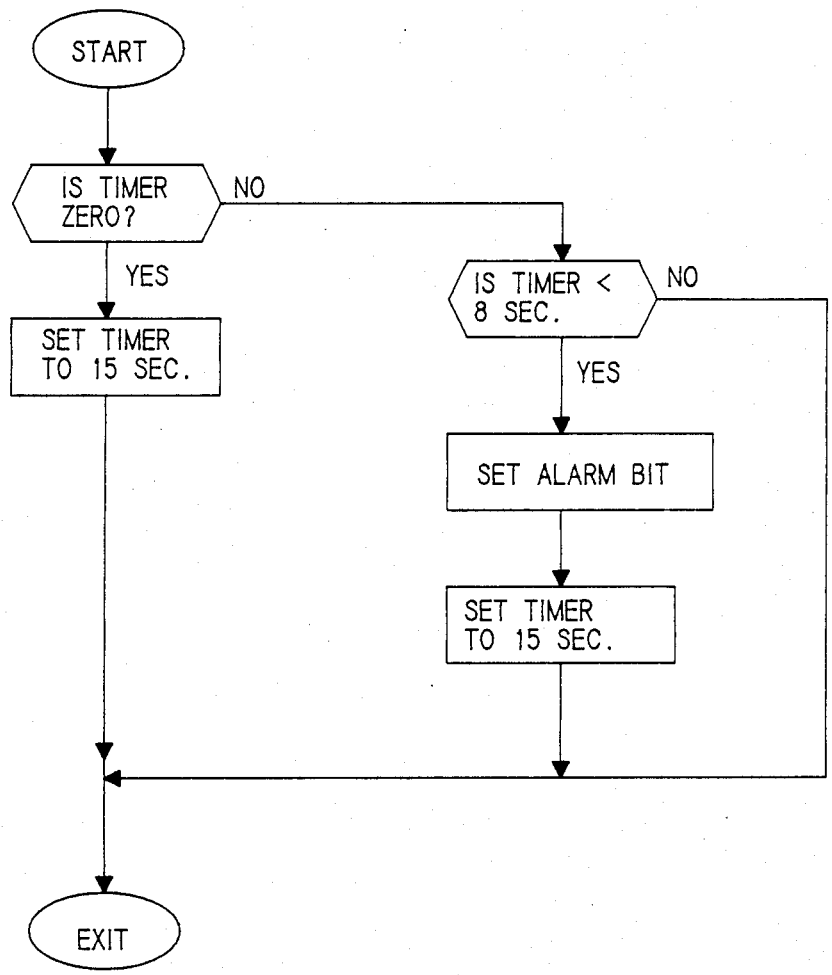
Figure 63:
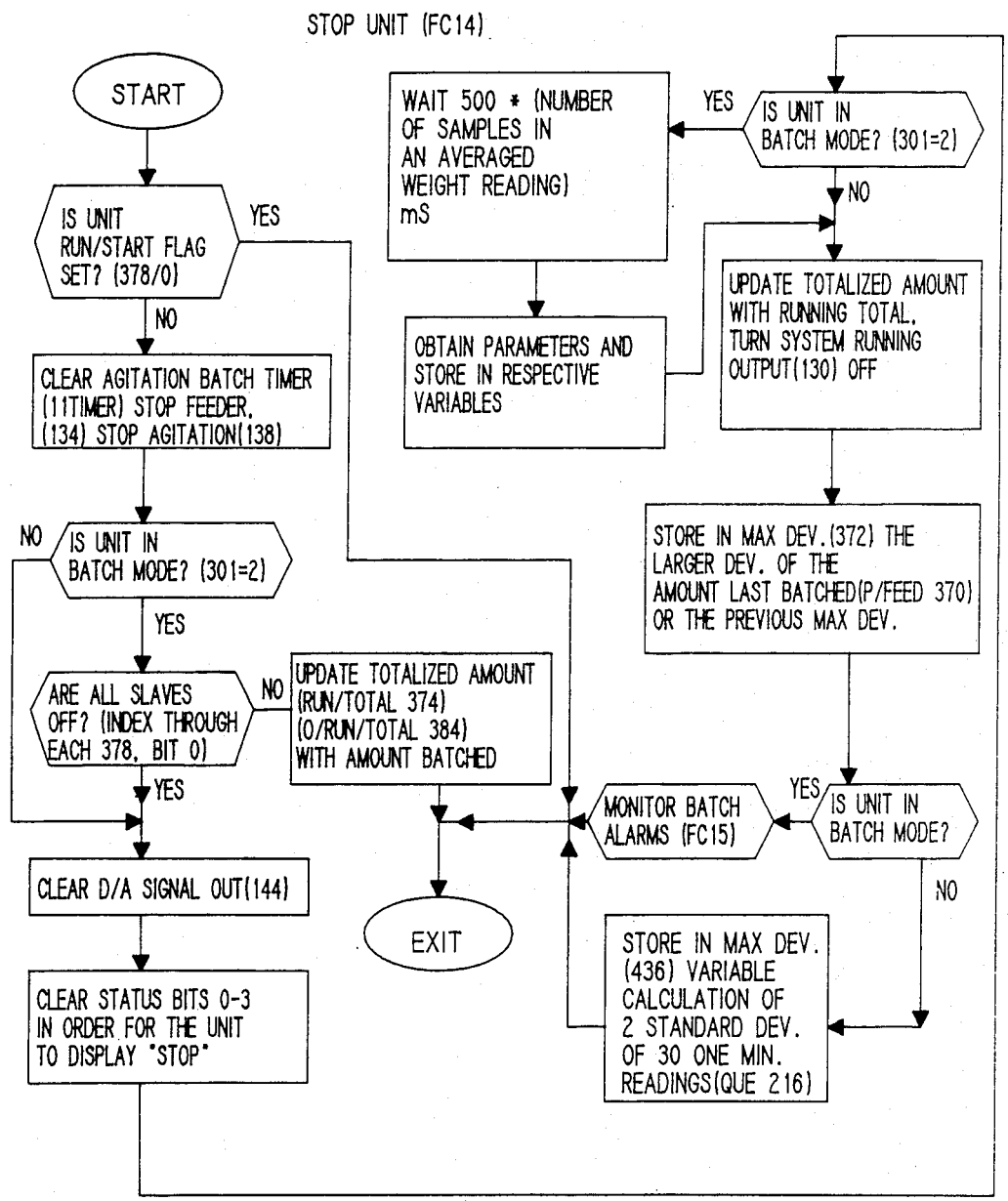
Figure 64:
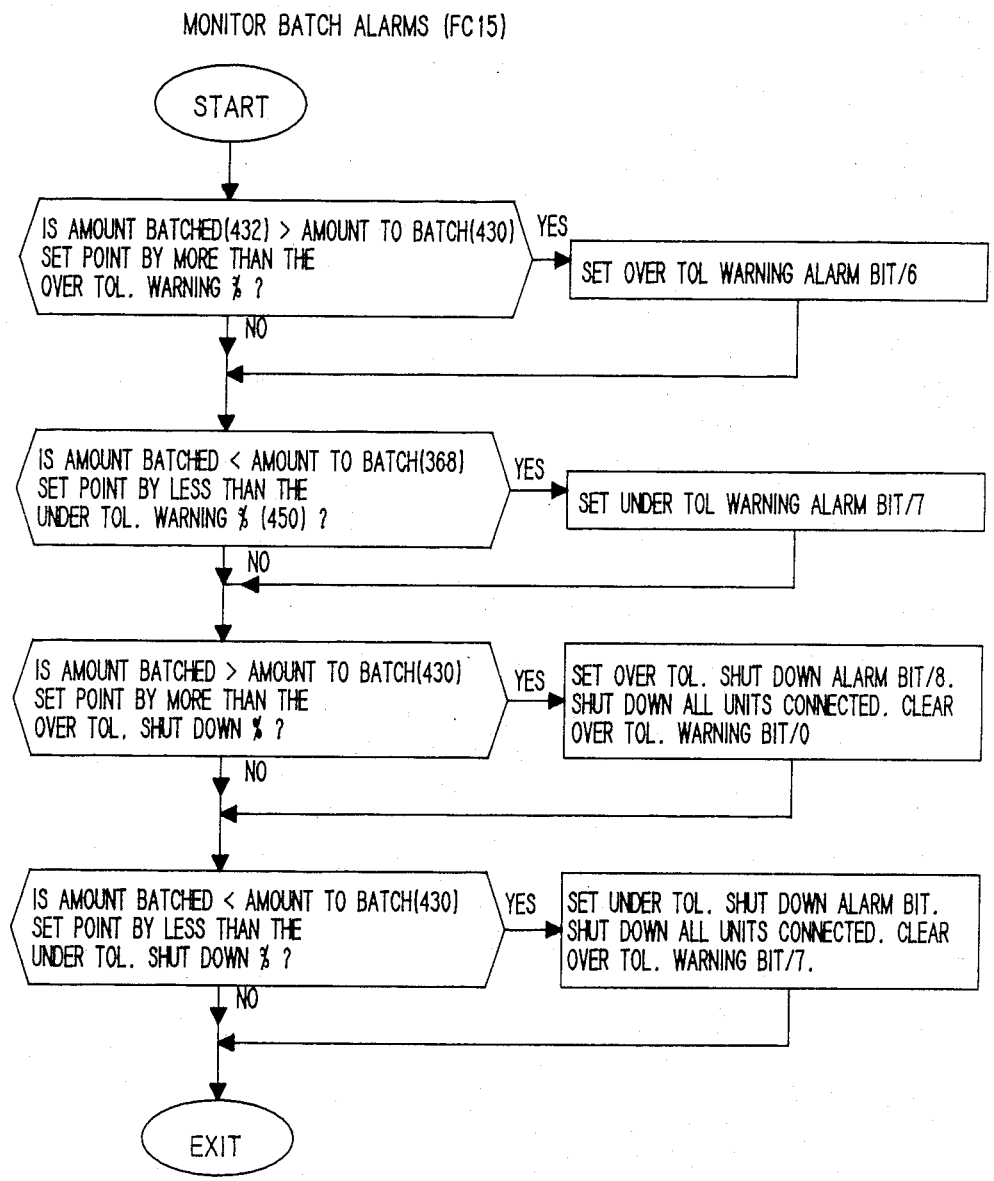
Figure 65:
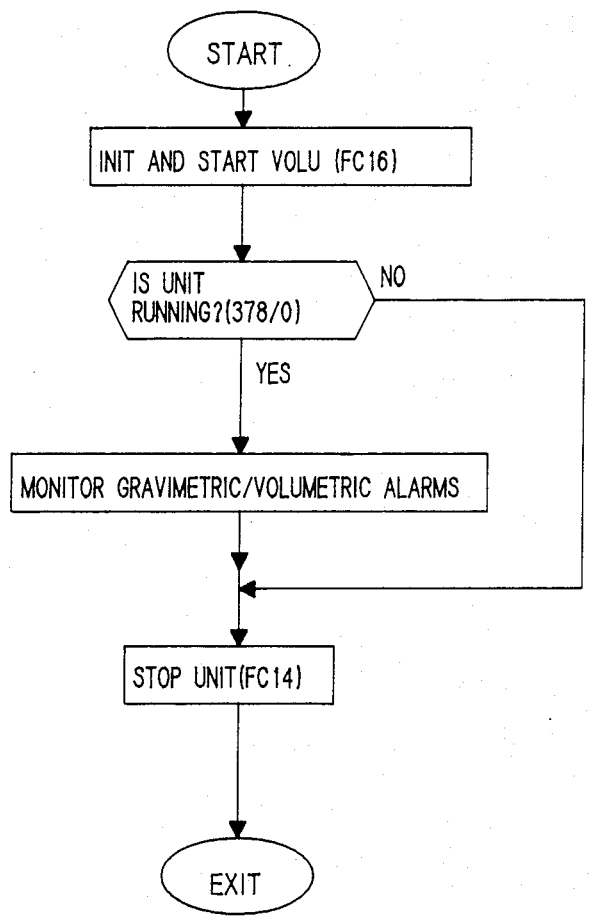
Figure 66:
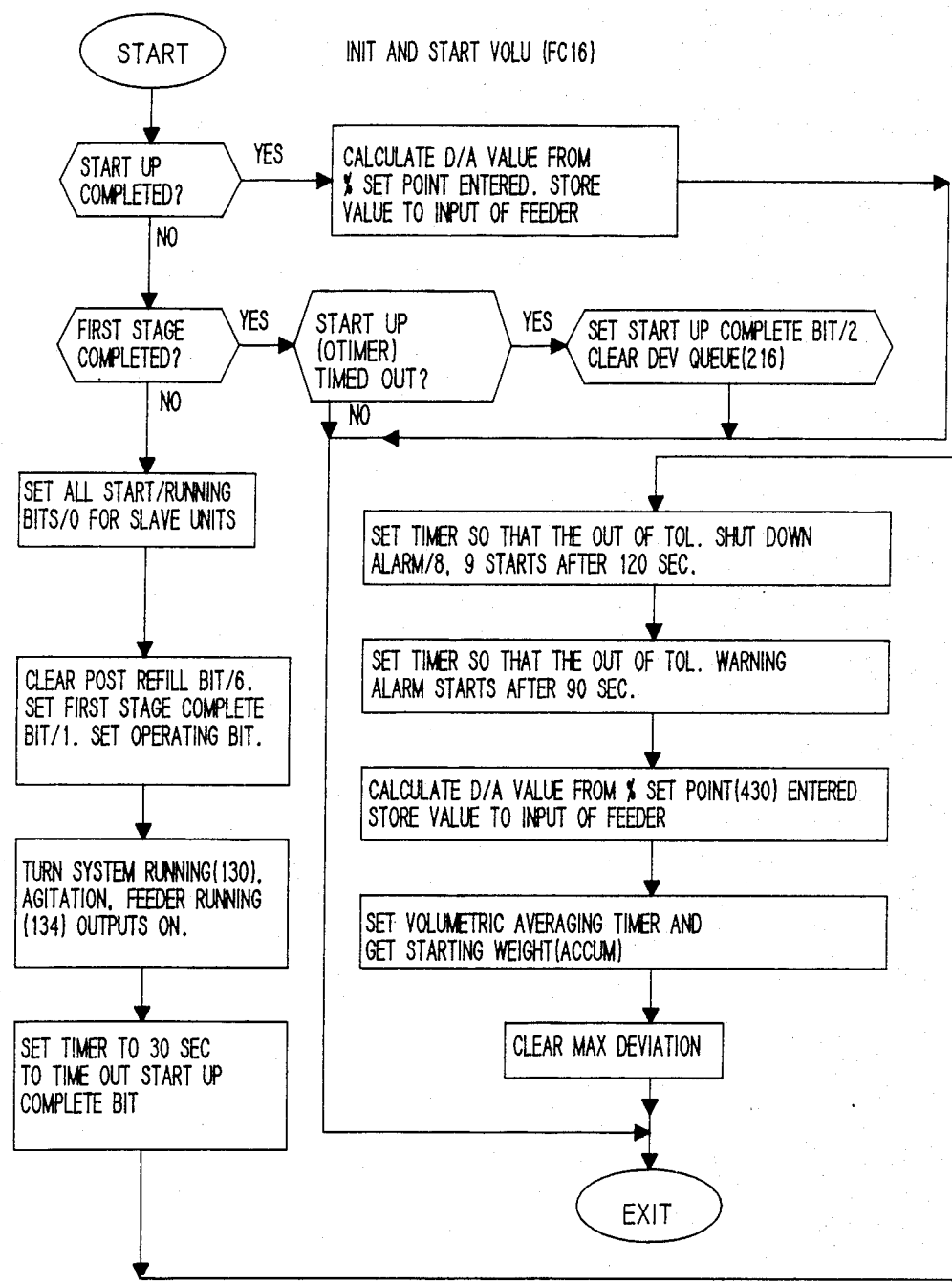
Figure 67:
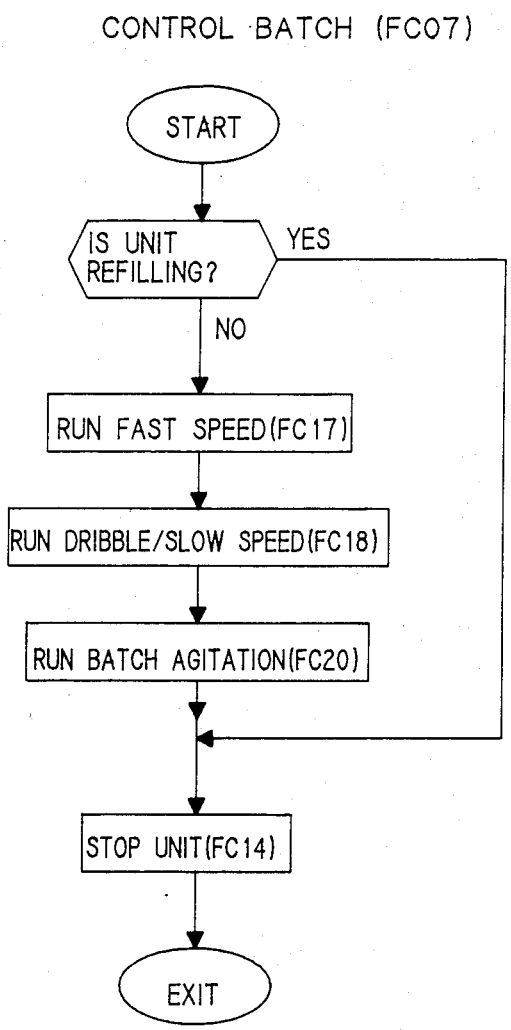
Figure 68:
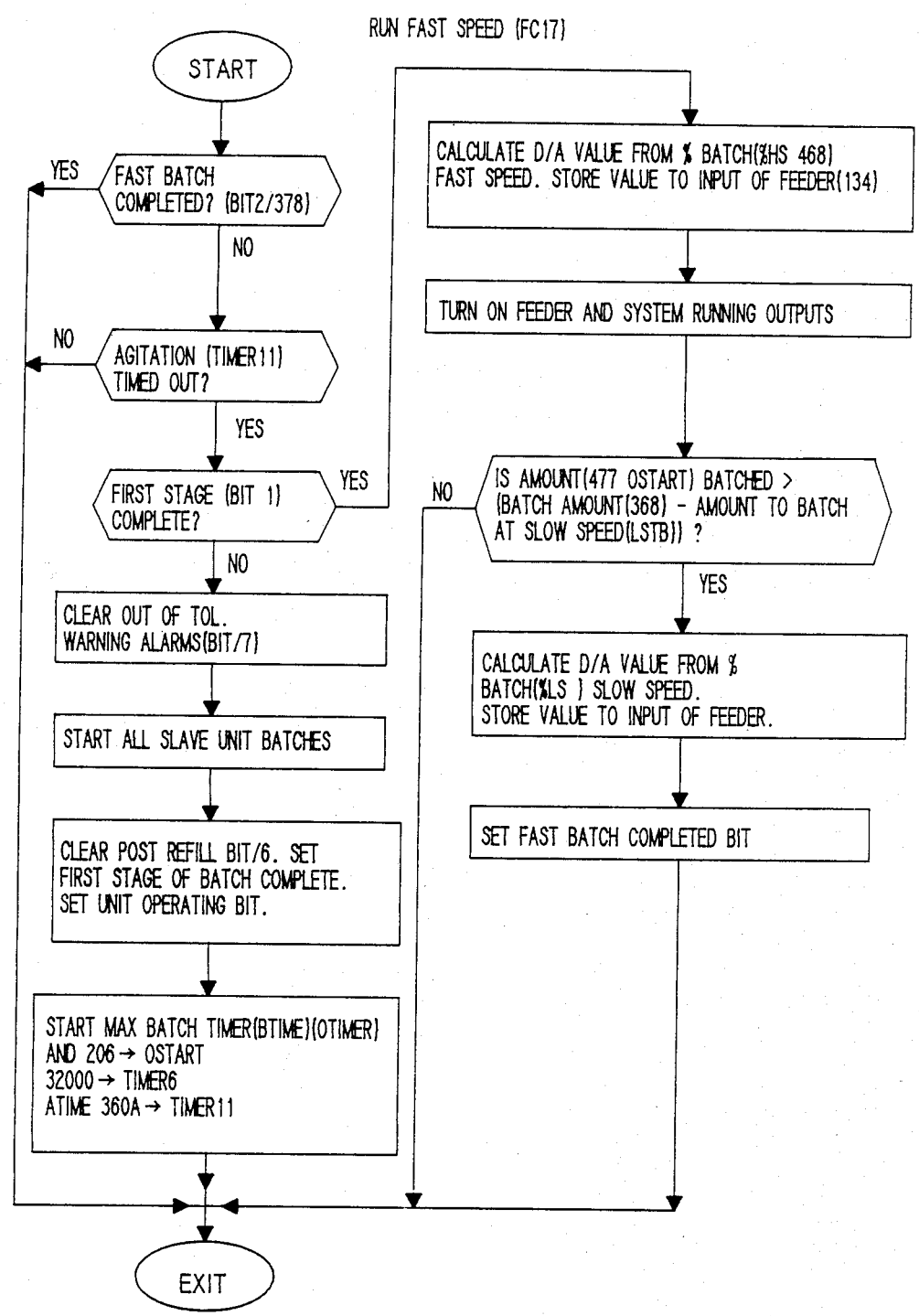
Figure 69:
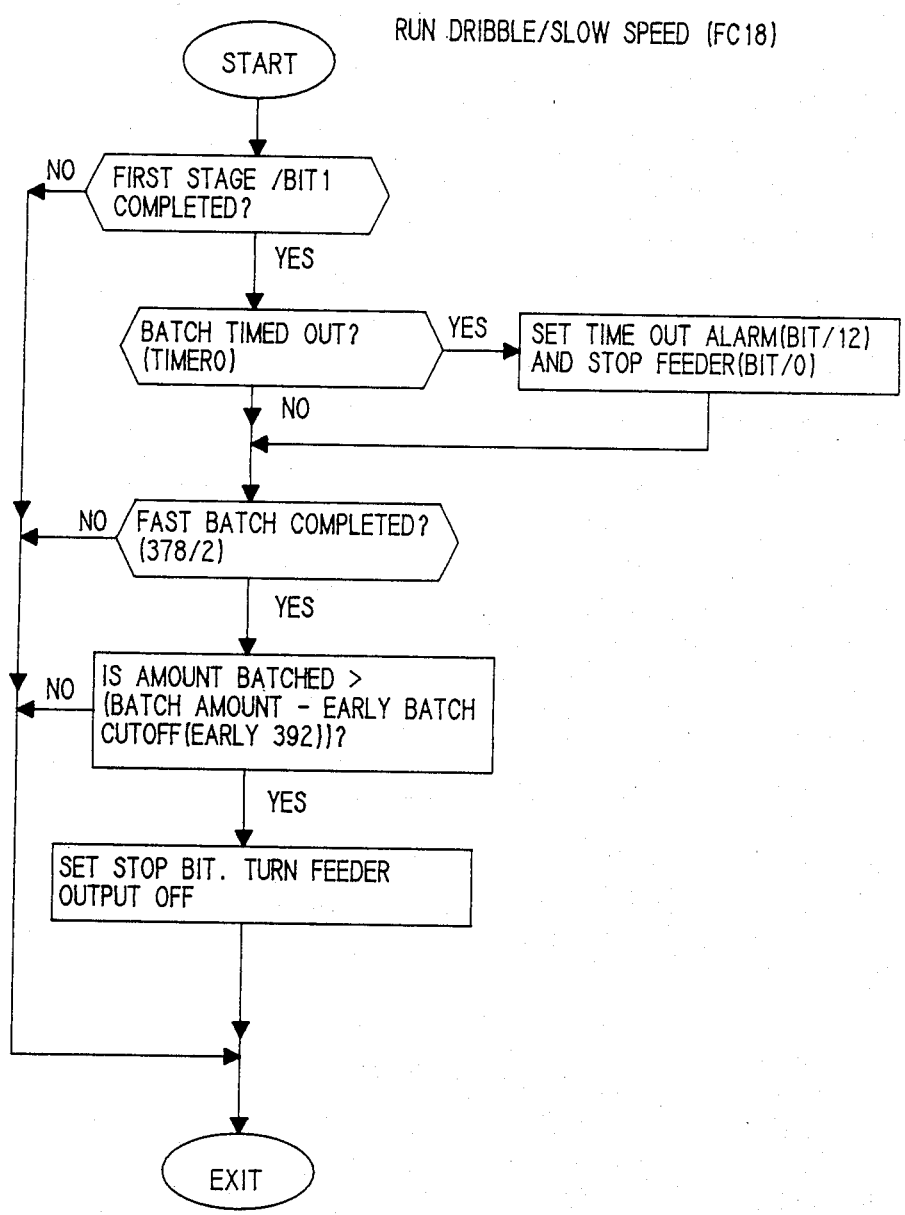

FIGS. 42–44 illustrate an exemplary embodiment of a RS422 master/slave communication task. This task provides communications between system 100 and the respective slave units 148 associated therewith.

FIGS. 45-50 show a suitable time and date task which, when executed, updates the various timers and counters used by the system and handles several "housekeeping" operations associated with the system.

Finally, FIGS. 50-70 show a preferred embodiment of a feeder control task in accordance with another aspect of the present invention. The feeder control task actually effects control of the feeder in one of three operational modes (gravimetric, volumetric, or batch).

Referring now to FIGS. 3A through 3H, RAM 300 includes locations for storing values corresponding to the various user input parameters and various arrays and variables employed by the system during operation. In general, each variable or parameter is represented in a two-byte word or an array of two-byte words. System configuration input data provided by the operator, as will be explained, is suitably stored in nonvolatile RAM; it being recognized that, in addition to the read only memory noted above, computer 118 has associated therewith both volatile and nonvolatile (e.g., battery-backed) random access memory. Each of the "variables" for which space is maintained in memory will hereinafter be individually described.

MODE 301 is a two-byte (16-bit) operator-input parameter indicative of the desired mode of operation: 0=gravimetric, 1=volumetric, 2=batching.

?LBS 386 is a two-byte operator-input parameter indicative of a desired unit of weight (0=pounds, 1=grams, 2=kilograms).

INC 394 is a two-byte system-generated parameter setting the increments in which the scale will display weight and rate.

DCALBS 396 is a double precision operator-entered variable indicative of the number (ranging in value from 0 to scale capacity) used to calibrate the controller (i.e., calibration weight).

CALBS 398 is a two-byte system-generated variable representative of the calibration weight (DCALB) divided by the increments (i.e., INC 394).

CALH.Z 400 is a two-byte system-generated variable indicative of the output of digitizer 116 corresponding to the value of CALBS; CALH.Z is the digital value appearing at the output of digitizer 116 when the operator issues the command to calibrate.

TAREH.Z 402 is a two-byte system-generated variable indicative of the output of digitizer 116 corresponding to zero (tare) weight.

LTAREH.Z 404 is a two-byte system-generated copy of TAREH.Z.

MAX/DIG 334 is a two-byte operator-input parameter (ranging in value from 0 to 28665), defining a maximum digital signal that can be generated by computer 118 to D/A converter 144, in effect setting a maximum metering screw speed.

MIN/DIGA 336 is a two-byte operator-input parameter (ranging in value from 0 to 28665), defining a minimum digital signal that computer 118 is permitted to generate to D/A converter 144, in effect setting a minimum entering screw speed.

Figure 20:
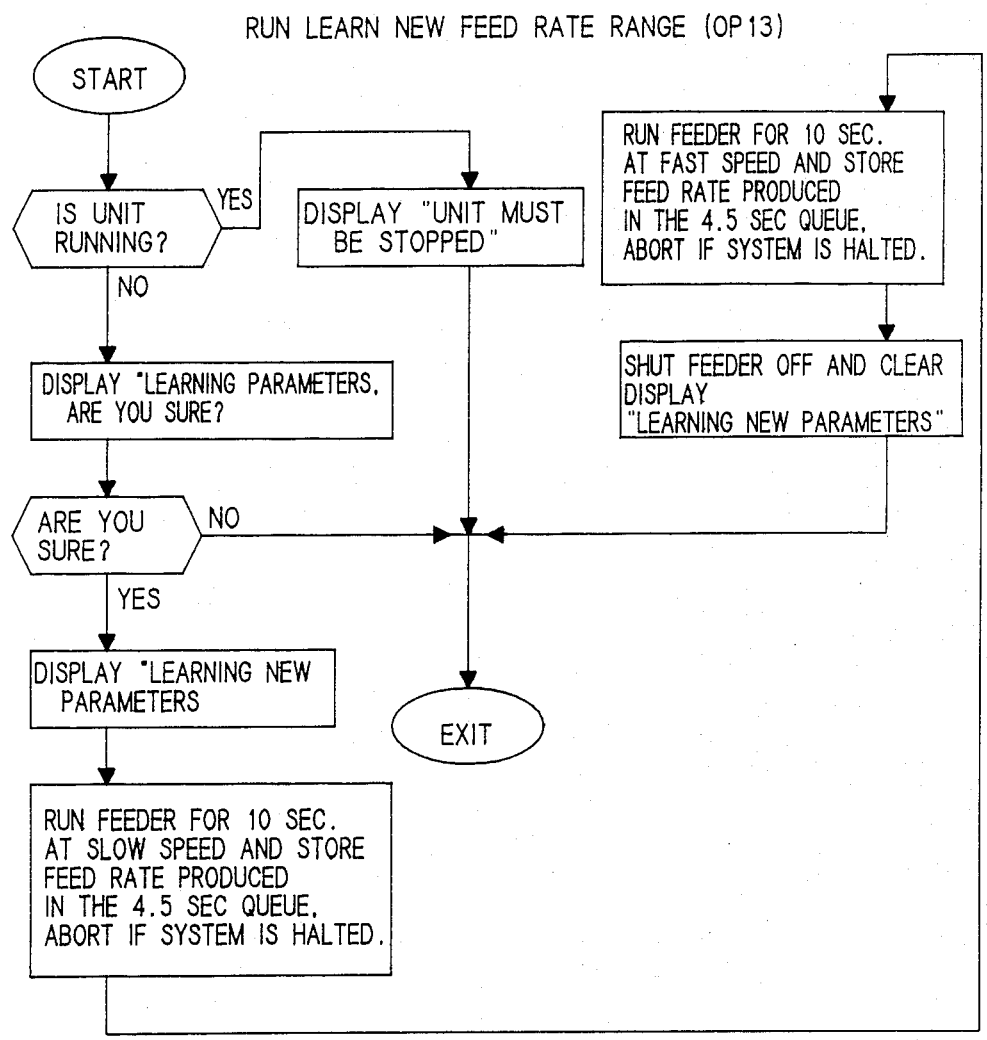
Figure 21:
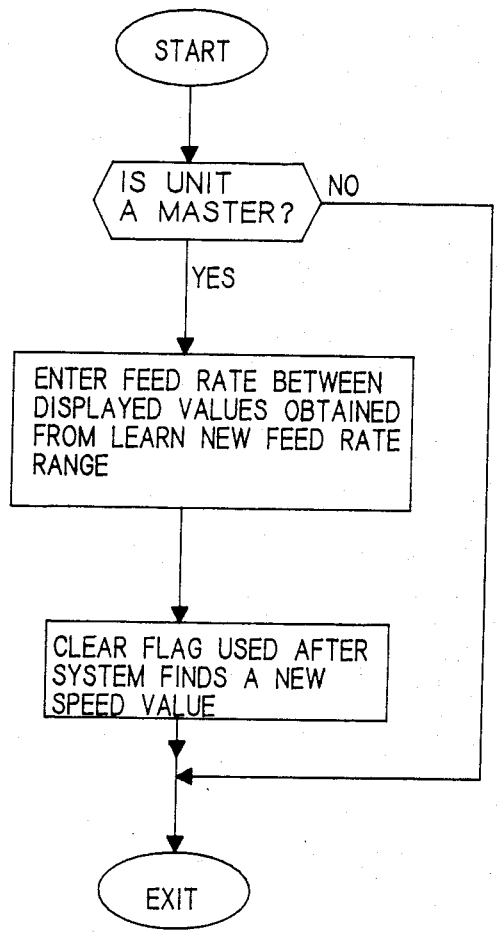
Figure 22:
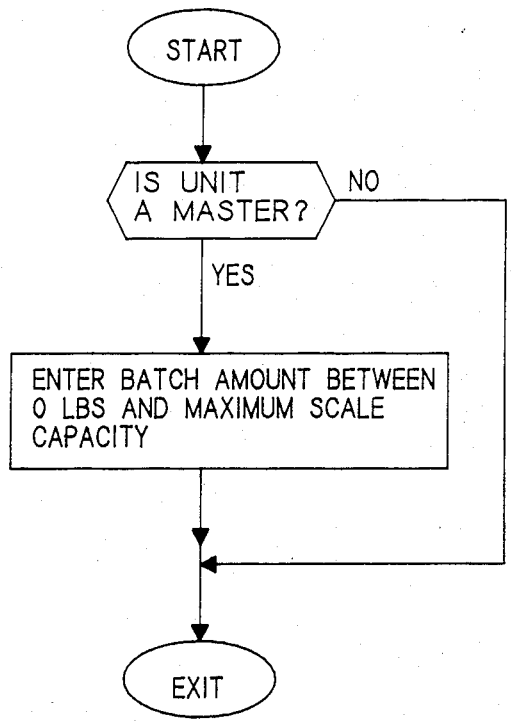
Figure 23:
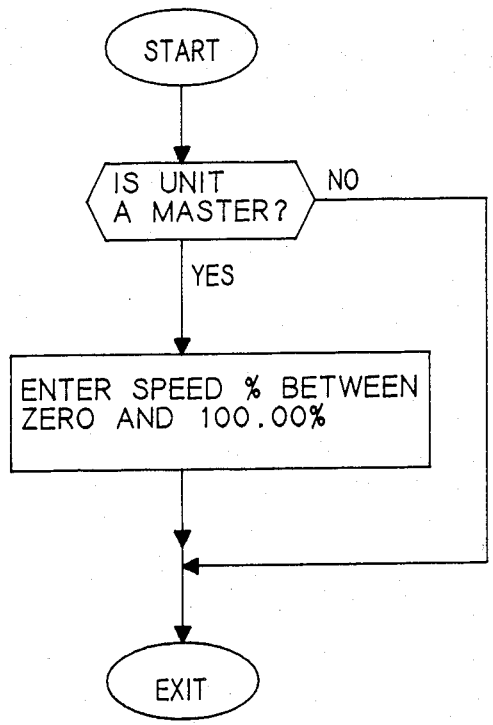
Figure 24:
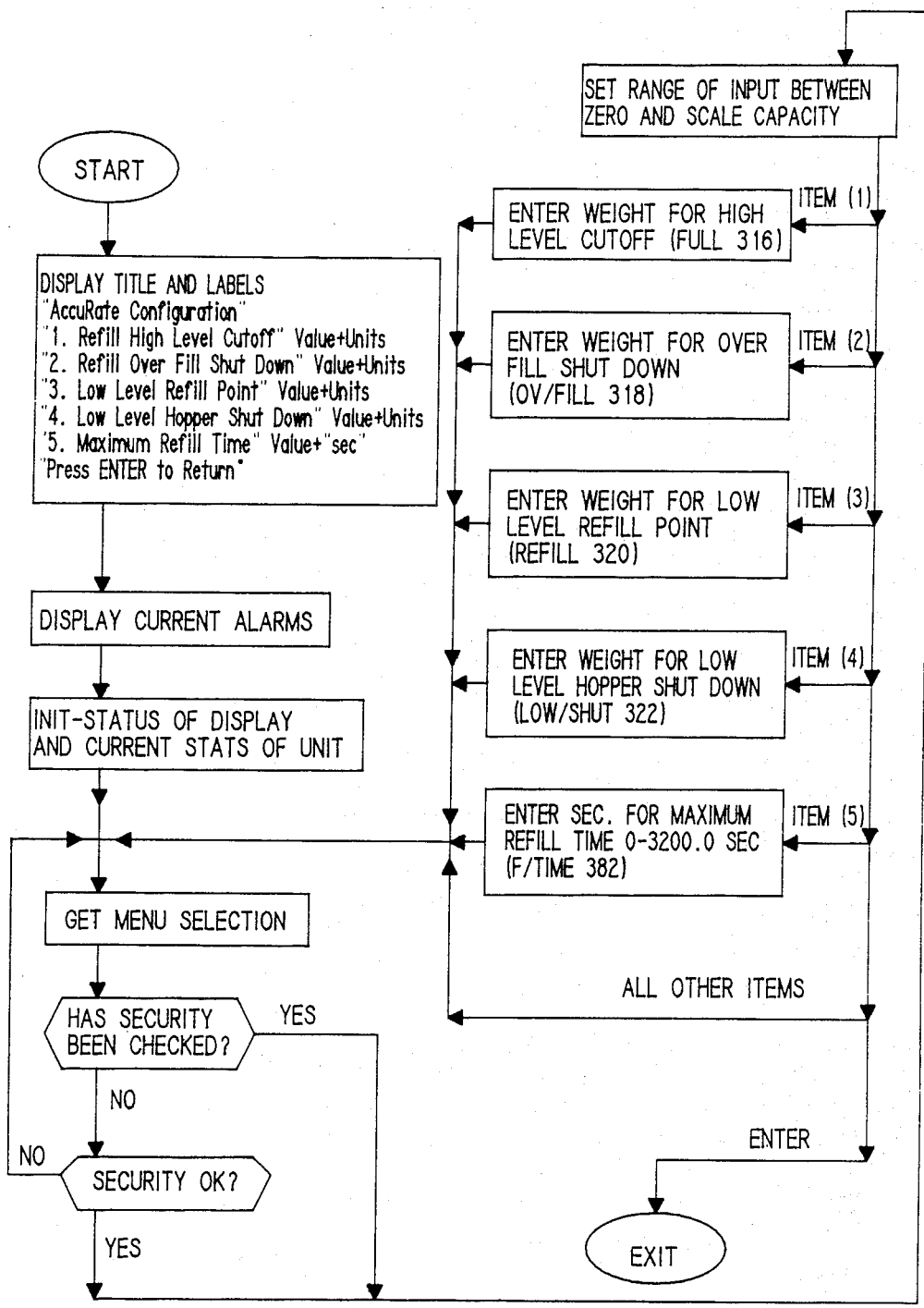
Figure 25:
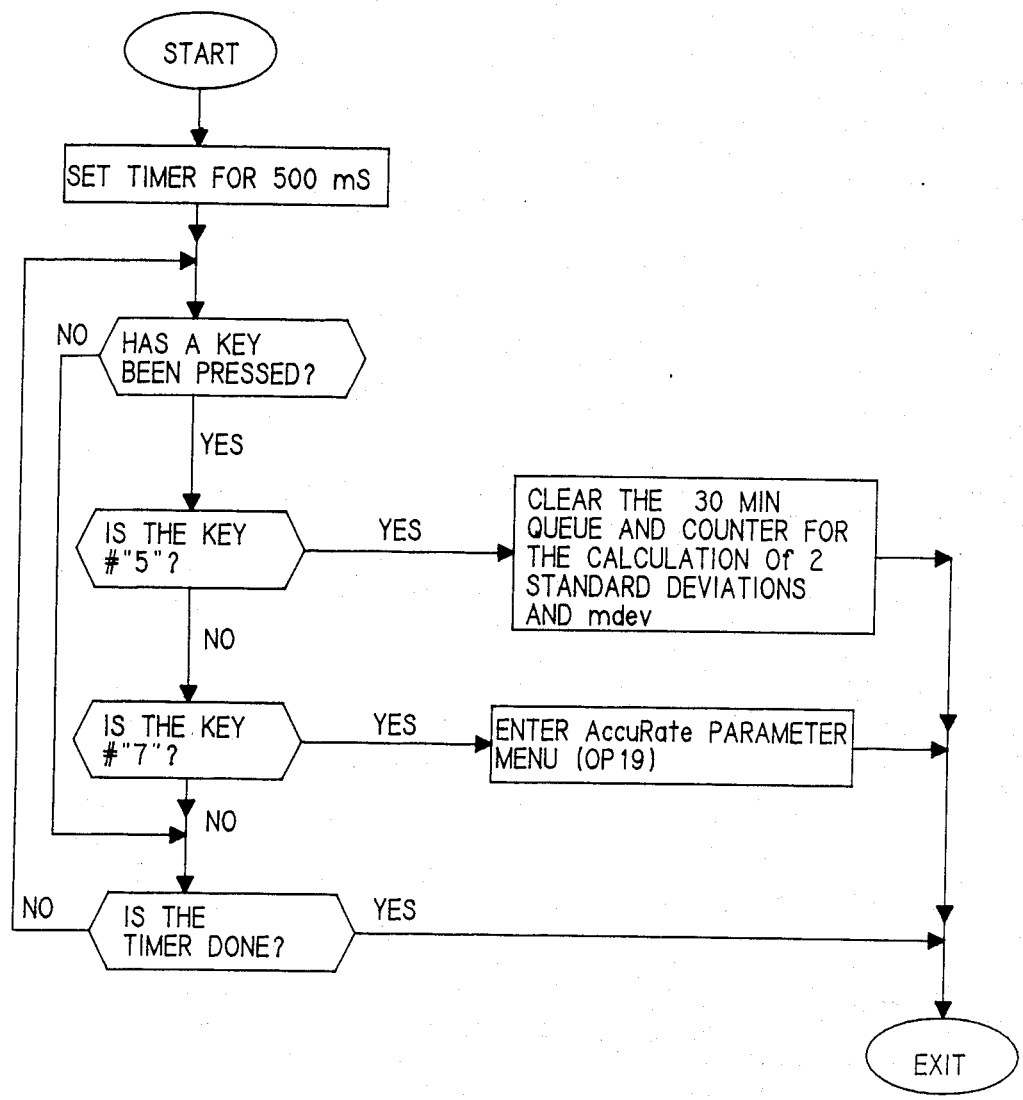

MAXI/FEED 302 is a two-byte system-generated (and operator-programmable) parameter indicative of the feed rate corresponding to the maximum digital signal to D/A converter 144 (MAX/DIG); the MAXI/FEED value is changed by the "Learn New Feed Rate Range" function shown in FIG. 20.

MINI/FEED 304 is a two-byte system-generated (and operator-programmable) parameter indicative of the feed rate corresponding to the minimum digital signal (MIN/DIGA) applied to D/A converter 144 to generate a corresponding minimum analog drive signal to the metering screw motor of feeder 106; like MAXI/FEED, the value of MINI/FEED is changed by the "Learn New Feed Rate Range" function shown in FIG. 20.

SLAVES 326 is a two-byte operator-input parameter (ranging from 0 to 7) indicative of the number of slave units 148 connected to system 100.

%SLAVE 306 is a six-byte (three-word) array (one word corresponding to each operational mode) of operator-input parameters (ranging in value from 1 to 1,000.0), setting percentages of the feed rate, speed, or batch amount of the master unit at which the respective slave unit will run.

SLAVES 308 is an 18-byte array used to maintain the relative addresses or indexes (for communications purposes) of the slave units of system 100 and each slave unit 148 cooperating with system 100.

LSBT 310 is a two-byte operator-input parameter (ranging from 0-32000 units (pounds, grams, or kilograms), employed in batching operations indicative of an amount of material to be dispensed at a low/dribble speed. (As will be explained, in batch mode operations, to maximize the speed of discharging the batch amount without compromising accuracy, a first portion of the batch amount is discharged at a relatively high feed rate, and the remaining amount discharged at a slower "dribble" feed rate.)

%HS 338 is a two-byte operator-input parameter (ranging from 0 to 99.9 percent), indicative of the percentage of full range metering screw speed (determined by the value of MAX/DIG and MIN/DIGA) at which the system will dispense the first portion of a batch in the batch mode.

%LS 340 is a two-byte operator-input parameter of the percentage (ranging from 0 to 99.9 percent) of full range metering screw speed (as determined by MAX/DIG and MIN/DIGA) at which the second portion (low/dribble amount) will be dispensed in batch mode operations.

ATIME 360A is a two-byte operator-input parameter employed in the batch mode operation setting a time period during which the agitation motor is to be driven prior to enabling the screw motor.

BTIME 360 is a two-byte operator-input parameter (ranging in value from 0 to 32000 seconds), indicative of a maximum time period permitted for completion of a batch.

LAGIT 388 is a two-byte operator-input parameter (ranging in value from 0 to 32000), indicative of the low agitation batch weight setpoint.

HAGIT 390 is a two-byte operator-input parameter (ranging in value from 0 to 32000) indicative of the high agitation batch weight setpoint.

EARLY 392 is a two-byte operator-input parameter designating a point at which the feeder metering screw is to be inhibited, prior to completion of a batch, to permit the user to compensate for the dynamics of material flow.

%TOL 312 is a six-byte (three-word) operator-input array, one word for each of the respective operational modes, setting an upper limit of percentage deviation (ranging from 0 to 99.99 percent) from a preset feed rate set point or, in the case of the batching mode operation, weight; a warning will be generated in response to feed rates (weights) exceeding the preset value by more than that percentage of the preset value.

%TOL/SHUT 314 is a six-byte (three-word) operator-input array, one word for each of the respective operational modes, indicative of an extreme upper limit of percentage deviation (ranging from 0 to 99.99 percent) from the preset feed rate value or, in the case of the batching mode operation, weight; the unit will be shut down in response to feed rates (or weights) exceeding the preset value by more than that percentage of the set point value.

%LTOL 362 is a six-byte operator-input array, one word for each operational mode, setting a limit on percentage difference (from 0 to 99.99 percent) from the preset feed rate or, in the case of batching mode operation, weight; a warning will be generated in response to feed rates (or weights) lower than the preset value by more than that percentage of the preset value.

%LTOL/SHUT 364 is a six-byte operator-input array, one word for each operational mode, setting an extreme limit on percentage deviation from the preset feed rate or, in the case of batching mode, weight; the unit will be shut down in response to feed rates (or weights) lower than the preset value by more than that percentage of the preset value.

REFILL 320 is a double precision (four-byte), operator-input parameter indicative of the weight (ranging from 0 to scale capacity) at which the unit discharge gate 102 is to open to initiate a refill cycle.

FULL 316 is an operator-input, double precision parameter indicative of a weight (ranging from 0 to scale capacity) at which discharge gate 102 is to close after a refilling operation.

OV/FIL 318 is an operator-input, double precision parameter, indicative of the weight (ranging from 0 to scale capacity) at which the feeder is deemed to have overfilled.

LOW/SHUT 322 is a double precision, operator-input parameter, indicative of a weight (ranging from 0 to scale capacity) at which the unit is to shut down due to lack of material.

2DECT 330 is a two-byte operator-input parameter (ranging from 1 to 4) indicative of the present fixed point decimal location;

DEC 328 is a two-byte system-generated variable (ranging from −1 to −4) indicative of the negative of the present fixed point decimal location (2DECT);

SAMP/INT 332 is a two-byte operator-input parameter employed in gravimetric mode operations, indicative of a minimum number of interrupts (ranging from 0 to 32000) after a change in the speed of the feeder metering screw required before a successive feeder speed change can be made.

DELAY 342 is an operator-input parameter (ranging in value from 1 to 19) indicative of the length of the queue ACCUM.

CAP 344 is a two-byte operator-input parameter (ranging in value from 0 to 600) indicative of the maximum capacity of scale 108.

PARTS 346 is a two-byte operator-input parameter (ranging in value from 0 to 65000) indicative of the number of increments into which the full capacity (CAP) of scale 108 is to be divided.

MINGAIN 348 is a two-byte operator-input parameter (ranging from 0 to 100.0) indicative of a minimum gain factor to be used in gravimetric control.

GAIN 350 is a two-byte operator-input parameter (ranging from 0 to 100.0) indicative of a maximum gain factor to be used in gravimetric control.

GAIN/INC 352 is a two-byte operator-input parameter (ranging in value from 0 to 100.0) indicative of increments of adjustment (gain) to be used in gravimetric control.

AFUG 354 is a two-byte operator-input variable (ranging in value from 0 to 28665) indicative of a digital signal to be applied by computer 118 to D/A converter 144 to slow the feeder during refill operations and thus compensate for changes in density of the material during the refill process.

SECUR 356 is a four-byte operator-input security code.

SBUF 358 is a four-byte temporary buffer receptive of security code entries from keypad 124.

TOTAL/DATE 324 is a double precision system-generated variable indicative of the time and date when a totalized amount (the amount of material discharged by feeder 106) was last reset.

STATUS/INFO 366 is a 180-byte (90-word) array having respective blocks of ten words corresponding to each of system 100 and slave units 148. Each ten-word block includes the following parameters for the associated unit:

FEED/RATE 368, a two-byte operator-input parameter setting the desired feed rate (gravimetric), percent-of-speed (volumetric), and amount-to-batch (batch);

P/FEED 370, a two-byte system-generated parameter indicative of the present feed rate or batch amount;

M/DEV 372, a system-generated parameter indicative of two standard deviations from the mean feedrate; in batch mode, this parameter is indicative of maximum deviation from amount-to-batch;

RUN/TOTAL 374, a system-generated double precision (four-byte) parameter indicative of the number of pounds of material that have been discharged by the feeder since last reset (as established by the contents of TOTAL/DATE);

HOP/WEIGHT 376, a system-generated double precision (four-byte) variable indicative of the current weight of material in the hopper of feeder 106;

S/STAUS 378, a word containing respective status flags indicative of the operating status of the unit, as follows:

| Bit | Description |
| --- | --- |
| 0 | Start/running for all three modes |
| 1 | First stage of startup completed |
| 2 | Second stage of startup completed |
| 3 | System running |
| 4 | Unit is in refill mode |
| 5 | System is halted |
| 6 | Post refill |
| 7-15 | Not used; |

A/STAUS 380, a word containing respective flags indicative of the alarm status of the unit (system 100 or slave unit 148), as follows:

| Bit | Description |
| --- | --- |
| 0-4 | Not used |
| 5 | External alarm |
| 6 | Over tolerance warning |
| 7 | Under tolerance warning |
| 8 | Over tolerance shutdown |
| 9 | Under tolerance shutdown |
| 10 | Mode select conflict shutdown |
| 11 | Communication failure shutdown |

| Bit | Description |
|---|---|
| 12 | Timer time out shutdown |
| 13 | Hopper low level shutdown |
| 14 | Hopper over full shutdown |
| 15 | Out of feed range shutdown; |

F/TIME 382 is a two-byte operator-input parameter setting the maximum amount of time permitted for the hopper of feeder 106 to fill.

O/RUN/TOTAL 384 is a double precision (four-byte) system-generated variable indicative of the total of material discharged by system 100.

In addition to the foregoing variables maintained in nonvolatile RAM, during the course of operation the system establishes in volatile RAM a number of temporarily stored operating parameters and variables. Each of such operating parameters and variables will hereinafter be individually described.

DOWN 495 is a two-byte countdown timer initially preset to a count equivalent to 269 and decremented in response to each interrupt signal, timing out at 499.98 millisecond (0.5 second) intervals to provide, in effect, a half second clock.

TIMER 406 is a 28-byte (14-word) array of locations employed as respective timers (TIMER 0–TIMER 13). The counters are typically preset at given points in the operation to predetermined values, and then decremented in 0.5 second increments in response to the half second clock, i.e., DOWN 395.

@SCUR 434 is a two-byte temporary variable used in connection with security entries.

−SUM 435 is an 18-byte (nine-word) array, one word corresponding master feeder system 100 and one word to each of the slave units 148, containing a check sum used in display of data operations.

LAST/D/A 436 is a two-byte variable employed in gravimetric mode operations indicative of the last previous digital signal provided by computer 118 to D/A converter 144.

NEW/D/A 438 is a two-byte variable used in the gravimetric mode operations indicative of the digital signal contemporaneously provided by computer 118 to D/A converter 144.

OSTART 440 is a four-byte variable indicative of the starting weight for a run; the OSTART value is used to calibrate the system before beginning a run (tare weight for net weight measurement).

ITEMPRATE 442 is a two-byte variable indicative of the last feed rate recorded during a refill operation.

?RESET 444 is a two-byte word employed in gravimetric operations as a flag to indicate whether or not the feed rate has changed from one run to the next; if ?RESET is set to one, the unit will start the gravimetric mode operation with the last digital signal to the feeder recorded during the refill (the value of ITEMPRATE); if ?RESET is cleared, however, the value of the starting digital signal to D/A converter 144 is set at a value calculated from the maximum and minimum digital signal and maximum and minimum feed rates.

−S/STAUS 446 is an 18-byte (nine-word) array maintaining a copy of S/STAUS. The −S/STAUS array is compared against S/STAUS to detect changes in status.

−A/STAUS 448 is an 18-byte (nine-word) array into which the A/STAUS words for each of the master unit 100 and slave units 148 are copied; this array is compared to A/STAUS to detect changes in alarm status.

SOUND 450 is an 18-byte (nine-word) array, including one word corresponding to master unit 100 and one word to each of the slave units 148, wherein each word contains flags corresponding to the respective alarms corresponding to the A/STAUS word; a bit in the SOUND array corresponding to an alarm is set to cause the sounding of an audio alarm (beep).

SCREEN 452 is a variable indicative of whether the screen being displayed relates to a single unit or to multiple units; single unit displays typically display respective parameter values horizontally across the screen, whereas in screens displaying data relating to multiple units, the data relating to the individual units is displayed in columnar format.

ALARMS 454 is a two-byte variable indicative of the address of an alarm presently being displayed.

3TIMER 456 is a two-byte countdown timer employed in gravimetric mode operations to control the minimum time interval between changes to the speed of the feeder metering screw.

IOC 458 is a two-byte variable indicative of the number of the present I/O point being edited on a screen of system configuration parameters.

1X 460 is a two-byte variable indicative of the depth of a stack employed in the feeder control task.

4X 462 is a two-byte variable indicative of the depth of a stack employed in the time and date task.

2X 464 is a two-byte variable indicative of the depth of a stack employed in the rate queue task.

S%SLAVE 466 is a variable used during the communications task for storing a copy of %SLAVE.

SMODE 468 is a two-byte temporary variable used during the communications task to store indicia of the mode of the slave with which communications are taking place.

SMXF 470 is a two-byte variable employed during the communications task to store the maximum feed rate of the slave with which communications are taking place.

SMF 472 is a two-byte temporary variable used during the communications task to store the minimum feed rate of the slave unit 148 with which communications are taking place.

TSTAT 474 is a temporary variable employed during the communications task to store a copy of the status bits (S/STAUS) for the slave with which communications are taking place.

ACCUM 206a is a variable length first-in-first-out queue which holds weight readings taken at 0.5 second intervals; the length of the queue is determined by operator-input variable DELAY. (As will be explained, the weights in the ACCUM queue are averaged to attain a stable weight reading; a new averaged weight reading can thus be obtained every 0.5 seconds.)

RQUEUE 210a, also referred to herein as the 4½ second queue, is a nine-word first-in-first-out queue which holds a series of average weight readings calculated every 0.5 seconds from the weight readings in the ACCUM queue; the nine words of the queue correspond to a time interval of 4.5 seconds. (Readings from the RQUEUE queue are then used to calculate a feed rate.)

RQHEAD 478 is a two-byte pointer to the address of the head of queue RQUEUE.

QUE 476 is a nine-word array utilized in the calculation of a rate to organize the readings from RQUEUE in a sequential form with the tail of RQUEUE at element one of the QUE array and the head at element nine of the array.

30Q 216*a* is a 30-element, 30-minute queue used in the calculating standard deviations.

30P 480 is a two-byte pointer to the head of queue 30Q.

AVTOTAL 212*a* is a double precision accumulator used to average 120 computations of the 60-second feed rates (calculated by subtracting the value in the head location from the tail location in queue OQUEUE) used by the system to generate entries into 30Q.

AVPOINT 214*a* is a two-byte counter which maintains indicia of the number of readings reflected in accumulator AVTOTAL, used in generating an average feed rate.

OQUEUE 208*a*, also referred to herein as the 60 second queue, is a 130-word (121 word effective length) queue for maintaining successive average weights calculated from the ACCUM queue obtained at intervals of 0.5 seconds; more specifically, queue OQUEUE maintains 121 average weight readings.

OQHEAD 482 is a pointer to the head of queue OQUEUE and is employed to operate OQUEUE as a circular queue.

OFLAG 484 is a flag employed to indicate that queue OQUEUE is full.

2H.Z 200*a* is an accumulator used to sum all successive approximation readings from digitizer 116.

1H.Z 202*a* is a counter for maintaining a count of the entries in accumulator 2H.Z for calculation of an average of successive approximation readings occurring over a 0.5 second interval.

H.Z 204*a* is a two-byte word for storing the average of the digital readings calculated using accumulator 2H.Z and counter 1H.Z.

SDEC 486 is a nine-word array, including one word for each of master system 100 and slave units 148, indicative of the decimal point locations employed by each of the units.

SST 488 is a two-byte flag employed during the communications task to indicate that the system has been started and to prevent the respective slaves from shutting down the system before all units have had a chance to start; respective bits in the word correspond to the individual slave units.

AST 489 is a flag word employed during the communications task to update slave alarms, and to prevent the slave unit from resetting alarm bits before the information is communicated to the master unit; respective bits of the word correspond to the individual slave units.

In addition, a number of other variables (shown in FIGS. 3A–3H) are generated by the system relating to the communications task and calculation of standard deviations.

In operation, the system disclosed above operates efficiently and effectively as a loss-in-weight feeder, having both improved accuracy and reliability. In general, loss-in-weight feeder 100 is a metering device, which measures the loss in weight detected by the scale as a means of determining the rate of discharge of a substance from the feeder. Once the rate has been determined, it may be adjusted by speeding up or slowing down the output or feed element of the device.

Loss-in-weight feeder 100 is capable of operating in three different modes indicated above in respect of the identified variables. These are gravimetric, volumetric, and batch modes.

In the gravimetric mode, the system obtains weight readings from scale 108, computes the rate at which a substance is being discharged from feeder 106, compares the actual rate to a predetermined desired feed rate, and sends output signals to the motor control of feeder 106 to effect changes to the rate of discharge to produce a close approximation of the desired feed rate. During gravimetric operation, feeder 106 discharges material continuously, including periods in which the system is refilling.

When the system is operating in volumetric mode, the rate at which feeder 106 is dispensing material is similarly monitored, but the controller does not monitor and adjust the feed rate; i.e., does not make changes to the speed based on deviations of actual speed from desired speed. Under normal conditions, volumetric mode is not used during a discharging operation. Volumetric mode operation is typically used as a diagnostic technique for determining the degree to which feeding system 100 runs out of tolerance during a normal operation. This information may then be used to make manual corrections in the event it becomes necessary to operate the system in manual mode; i.e., if the control function is not operating properly. Volumetric operation is also continuous.

Finally, loss-in-weight feeder 100 is capable of operating in batch mode. As noted above, gravimetric and volumetric operations are in general continuous; once the feeder begins to discharge a substance, it will not cease operation. Conversely, batch mode permits the operator to instruct the feeder to discharge a certain quantity of substance. In other words, batching is a noncontinuous dispensing of a material. In operation, the system will run and dispense the desired weight of a substance and then stop.

The operation of feeder system 100 begins when the system is switched on by the operator. Upon initialization, the system performs a brief diagnostic check of the hardware. If no errors are detected at this time, the operator is informed that the system is proceeding into normal operation. The failure to generate the required signal provides the operator with an indication that a fault has occurred somewhere in the system. In that case, the system will not proceed into normal operation.

Initially, the operator will be prompted by software to enter the time and date, or to acknowledge the default time and date by striking the "ENTER" key. Additionally, the operator may depress the "ACK" (Acknowledge) key (prior to entering the date). If the system senses a depression of the ACK key at any point prior to the entry of the date parameter, all of the previously stored user entered variable information (i.e., in the nonvolatile portion of RAM 300) is cleared and default values (stored in EPROM) are reinstated into the user variable portion of RAM 300. As noted hereinabove, a portion of RAM 300 is battery backed. This accommodates the storage of user-entered variables when the system is nonoperational. The ability to store user-entered information permits the operator to proceed with the operation of the feeder utilizing parameters entered during a prior operation of the system. In many instances, certain information, such as set points (discussed below), does not change between operations. For this reason, it is often advantageous to simply proceed with operation utilizing parameters entered during a prior run. As noted above, however, if the user desires to begin operation with the default values, this may be accomplished by depressing the ACK key in the manner described.

As noted above, one of the variables stored in battery-backed RAM is a variable MODE, stored at location 301 in RAM 300. MODE 301 stores indicia of the last mode of operation of system 100, or the default mode (gravimetric). Assuming the mode selected is gravimetric (the default), a main operation screen for gravimetric mode is acccordingly displayed. Information displayed includes the "Feed Rate Set Point," "Present Feed Rate," "Maximum Deviation," "Amount In Hopper," "Totalized Amount," "Time Date Last Reset," and "Mode of Operation".

As briefly noted above, set points are operator-entered values corresponding to desired levels or rates at which the system will operate. In the case of the feed rate set point, the operator can establish the desired or targeted rate at which system 100 will operate. This information is stored as variable FEED/RATE in RAM 300 at location 368.

The operator is also informed of the present feed rate (expressed in weight units/minute, e.g., 165 lbs/min). Specifically, information is taken from the variable P/FEED 370, which is updated each ½ second during operation of feeder 106. Upon initialization, the last value stored during the last prior run (or "0" if memory has been cleared) is displayed.

The value of "maximum deviation" is computed by the system. During operation in the gravimetric mode, the system attempts to operate at a rate corresponding to the value of FEED/RATE 368. In practice, however, some variation from the desired rate may occur. Accordingly, the system computes the actual average rate of operation and, using that value, generates a value corresponding to two standard deviations. The computation of standard deviation may be carried out using techniques which are well known in the art. That value provides the operator with indicia of the extent to which the unit has stabilized. A high value indicates the system has not stabilized, in turn indicating that some form of corrective action is required by the operator. At initialization, the value displayed corresponds to the last standard deviation computation made during the preceding run.

The value displayed as "amount in hopper" informs the operator of how much material remains in the unit. This value is taken from the variable HOP/WEIGHT generated by the system based on readings obtained from scale 108.

The value of "totalized amount" represents the amount of material (weight) run through the system since the last time O/RUN/TOTAL 384 was reset; time date last reset is the time and date that O/RUN/TOTAL 384 was last reset and is stored in the variable TOTAL/DATE at location 324 in RAM 300.

Finally, "mode of operation" and an indication of whether the unit is operating as a master or as a slave is displayed. The mode of operation is determined with reference to variable MODE 301, as previously discussed, and master/slave status is determined by examining the contents of array SLAVES 308; SLAVES 308 contains the address of each unit in the system (i.e., here the "System" comprising a master unit and all associated slaves units). If the value in the first element of array SLAVES 314 is equal to 0 (i.e., zero), then the unit is a master. Conversely, if the address is a value other than zero, then the unit is a slave; the display would then reflect that status.

In addition to the information regarding the operation of the feeder, the system also displays the current function assigned to each of the function keys. The functions available from the main operation screen of gravimetric mode include calibration (F5), refill configuration (F4), feed configuration (F3), manual refill (F2), and run/stop (F1). Depressing "F1" causes feeder 106 to be switched on (run enabled) if it is presently disabled or causes feeder 106 to be disabled if it is presently enabled. Striking "F2" permits the operator to manually control the refill of the hopper. In practice, this is accomplished by sending a signal (signal 136) to discharge gate 102 (opening discharge gate 102).

Calibration of the unit may be initiated by depressing function key F5. Calibration is used to establish an operating range for digitizer (A/D converter) 116. In one embodiment of the invention, two points are used to establish a relationship between the digital output readings of A/D converter 116 and corresponding weight values. Because the output of A/D converter 116, in combination with scale 108, is highly linear, establishing two known points permits the system to determine any weight value placed on scale 108 within an acceptable degree of accuracy. This is accomplished by interpolation and extrapolation, or what is sometimes referred to as "two-point linearization." During calibration, the initial output displayed on CRT 122 indicates the value of the current scale count. Current scale counts correspond to the value output by A/D converter 116. Once the system has been calibrated, the current weight in the hopper will also be displayed.

More specifically, as related to the most preferred embodiment of the present invention, the operator places the minimum load (feeder 106 plus "headload") on scale 108, which is preferably a mechanically counterbalanced scale. (Headload is a minimal amount of the material being discharged.) Weights are added to the counterbalance until the digital output from A/D converter 116, corresponding to the voltage output from the load cell, reaches a value of between 500 and 1,000. Once the digital readings are brought within this range, the operator strikes function key F2. If the operator is unable to bring the digital output value of A/D converter 116 within the desired range, i.e., 500 to 1,000, adjustments may be made to active low-pass filter 114. This is facilitated by a potentiometer which may be adjusted to vary the output voltage of active low pass filter 114 to permit A/D converter 116 to obtain a signal which may be converted to a digital output value within the desired range.

Once a tare weight has been established, the operator next places a known weight on scale 108; generally a weight equivalent to at least 10% and typically more of the maximum load of scale 108 is preferred to expand the range over which linerization will be approximated. Assuming, for example, the maximum weight to be measured by scale 108 is 50 pounds, a suitable weight for use in calibrating scale 108 might be 25 pounds. Once the weight has been placed on scale 108, the operator depresses another function key, F1, to instruct the system that a "calibration weight" is present on scale 108. The operator then enters the specific weight value (calibration weight) into the system using the number keys on keypad 124. Having established a zero weight (tare weight) and a calibration weight, the system may now estimate the weight of any material placed in the hopper through the use of interpolation or extrapolation techniques using two-point linearization. Values generated during the calibration process are stored by the system in RAM 300.

Assuming the output of the scale is highly linear with respect to changes in weight over the entire range of the scale, the use of two-point linearization, as described above, will produce acceptably accurate weight readings for any amount of weight placed thereon. In practice, however, some nonlinearity may prevent complete reliance on two-point linearization for calibration of the system. In that event, there may be an unacceptable deviation between the actual weight on the scale and the weight signal representative thereof. In an alternate embodiment of the present invention, the value of the feed rate set point (i.e., FEED/RATE 368 (used to develop the output signal) to D/A converter 144) may be adjusted to compensate for any non-linear characteristic using an EPROM lookup table.

For example, a range of values representative of various weight readings along the entire range of the scale may be stored in a table in EPROM. Associated with each reading would be a value (i.e., an offset carrying a sign) reflective of the amount by which the operator-entered feed rate set point would have to be adjusted (for the particular weight reading in question) to produce the feed rate which would have resulted if the output of the scale were completely or ideally linear. Thence, for any weight value generated during operation of the feeder, the offset would be added to or subtracted from (depending on whether the offset was positive or negative) FEED/RATE 368 to produce an error-compensated rate signal more closely reflecting the desired feed rate (i.e., the value entered by the operator). In practice, each of the weight readings forming the lookup table may represent a range of values. During the operation of the feeder, a lookup would only be performed (to find the corresponding offset) when the signal generated by the scale fell into a different range within the table.

Other approaches, e.g., multi-point linearization, may also be used to establish a relationship between the output of a scale and known weight without departing from the spirit of the invention, as expressed herein. In the case of multi-point linearization, for example, assuming a 50 lb scale is being used, if known weights of 10, 20, 30, 40 and 50 pounds are each, in turn, placed on the scale so that five calibration weights (spanning the full range of the scale) are established in RAM, then it would only be necessary to interpolate over a range of 10 lbs to establish any given weight value for material on the scale. Thus, to the extent the readings taken from the scale may have some non-linear characteristic, the effect this would ordinarily have on the accuracy of the scale is minimized.

The A/D output value corresponding to the zero weight (tare weight) is stored in TAREH.Z 402 (a copy of which is also stored in LTAREH.Z 404), the A/D output value corresponding to the calibration weight is stored in CALBS 398, and the actual weight value entered by the operator is stored in DCALBS 396. Return to the main operations screen is then effected by depressing the exit key, F5.

Refill configuration parameters are used by the system to determine operational aspects of the refill process, i.e., establishing various set points. The operator may select the "Refill Configuration" menu by depressing F4 on keypad 124. When this is done, refill configuration parameters are displayed (and available for update) which include: "Refill High Level Cutoff Set Point," "Refill Overfill Shutdown Set Point," "Low Level Refill Set Point," "Low Level Hopper Shutdown Set Point," and "Maximum Refill Time."

The "refill high level cutoff set point," which is stored into the variable FULL 316, is used by the system to determine when to close discharge gate 102 after a refilling operation has occurred (i.e., when the weight of the material in the hopper reaches a certain level). This set point is a weight value which may vary from zero to the maximum capacity of scale 108. All weight values entered may be expressed as whole units (i.e., pounds) and fractional portions thereof (i.e., tenths or hundredths of pounds). Ordinarily, a value less than, but approaching, scale capacity is desired. The refill overfill shutdown set point, which is stored in OV/FIL 318 is a weight value between 0 and the maximum capacity of scale 108, and is the point at which feeder 106 will be considered overfilled. Reaching this point during an operation would cause system 100 to shut down. In practice, OV/FIL 318 is set at a value in the range between the value stored in FULL 316 and the maximum capacity of scale 108.

The "low level refill set point," stored in REFILL 320, is the set point used by the system in determining the point at which to begin a refill operation. The value of REFILL 320 is a weight value and is ordinarily close to zero. Low level hopper shutdown set point, stored in LOW/SHUT 322, is used by the system to determine the point at which the unit should shut down as a result of insufficient material in the hopper. LOW/SHUT 322 is a weight value, and is ordinarily set in the range of between zero and REFILL 320.

The "maximum refill time," which is stored in F/TIME 382, is expressed in terms of seconds and tenths of seconds, and is used by the system to determine when to shut down the unit as a result of a refill operation time being greater than the time the operation should have taken. This condition might result, for example, if in discharge gate 102 failed to open properly or if bin 101 had run out of material.

As noted above, each of the described parameters is displayed upon entry into the refill configuration screen. Each of these parameters is also assigned a numeric value. Values stored in system variables may be changed by the operator by selecting the number assigned to the selection the operator wishes to change. When the operator is ready to return to the main operation screen (i.e., after making desired changes to the refill configuration parameters), a return may be effected by simply depressing the "Enter" key without choosing any of the values corresponding to the various parameters.

Refill configuration and calibration may be selected by the operator from any main operations menu (i.e., the main operations menu displayed in conjunction with operation in volumetric mode). The function performed by each is not specific to any mode of operation (this is also true with respect to the key used to stop/start the unit and to initiate a manual refill operation). Feeder configuration parameters (F3) do vary to some extent depending upon the mode of operation. Assuming that the mode of operation is gravimetric, pressing function key F3 would permit the operator to select the feeder configuration menu for gravimetric mode to display and selectively reenter various configuration parameters used by the system in that mode. The configuration parameters (headings displayed) include: "Mode Select," "Address of Unit," "Percent Feed Rate of Slave,"

"Learn New Feed Range," "Set Point," "High Out of Tolerance Alarm," "Low Out of Tolerance Alarm," "High Out of Tolerance Shutdown," "Low Out of Tolerance Shutdown," "Totalizer Reset" and System Security."

As in the case of the "refill configuration" screen, each value/option displayed is assigned a numeric value. The operator may select and change a value (or initiate certain functions, i.e., "learn new feed rate range").

Choosing "mode select" permits the user to change the present mode of operation; if for example, the system is operating in gravimetric mode, the operator could change the mode to volumetric or batch.

The "address of unit" corresponds to the address assigned to the unit for purposes of communication. The address of each unit associated with a master is stored in array SLAVES 308 of the master. Additionally, the address of each of the slave units associated with the master is also stored in the variable ME at location 493 of RAM 300.

"Percent feed rate of slave" is used by the master in a master/slave configuration to determine the actual rate at which the slave will operate. Specifically, in a master/slave configuration, the actual rate at which a unit operates is only entered with respect to the master. The value assigned to the variable FEED/RATE (discussed below) determines the rate at which the master will operate. Each slave then operates at a rate which is expressed as some percentage of the master's feed rate. For example, a slave may operate at a rate which is 10 percent of the master's feed rate. The value "10" would then be entered as the "percent feed rate of slave". Once entered, that value is stored in %SLAVE 306. On the feeder configuration display for the master, this entry has no meaning; a value of zero is accordingly displayed.

"Learn new feed rate range" is, in general, used by the system to determine the effective operating range (feeder rate) in which the system may operate. The unit is first run at a slow speed for a 10-second interval of time. The system determines the output rate of feeder 108 during that period. The unit is then run at a fast rate for a 10-second interval. Based on readings obtained during that interval, the maximum rate of feeder 106 is determined. The fast speed and slow speed settings used in establishing the rates correspond to digital output values selected by the operator (see FIGS. 25 and 26). Thus, "learn new feed rate range" is used to establish a range of permissible values which may be used as the feed rate set point. The minimum feed rate value determined during the learn new feed rate range operation is in MINI/FEED 304, and the maximum rate developed during the learn new rates function is stored in MAXI/FEED 302.

The value of FEED/RATE is used by the system as the target feed rate. FEED/RATE is an operator-entered parameter, but the value selected must fall within the minimum/maximum values developed by the system during the learn new feed rate range function described above. If the unit is a slave, FEED/RATE may not be entered; feed rate set points for slaves are calculated by the system based on the master's feed rate set point and the value of %SLAVE 306.

In operation, the system develops a range over which the unit may be operated. The range establishes, in effect, tolerance levels to prevent the unit from operating at an unacceptable rate. In practice, each extreme of the range is defined by two values; the first value determines when an alarm is to be sounded to warn the operator that an out of tolerance condition has developed, and a second value which establishes when the unit is to be halted in response to an out of tolerance condition. These values are referred to as the high and low out of tolerance alarms and the high and low out of tolerance shutdown set points. Each of these values is entered by the operator as a percentage of the feed rate set point. For example, the high out of tolerance alarm ay be entered as "20." In that case, if the rate of the unit exceeds the set point value by more than 20% (i.e., 20% faster) for longer than a predetermined time interval (i.e., 15 seconds), the unit will be shut down. Once entered, each of these values is written into RAM 300. The high out of tolerance alarm set point is stored in %TOL 312, the low out of tolerance alarm is stored in variable %LTOL 362, the high out of tolerance shutdown set point is stored in variable %TOL/SHUT 314, and the low out of tolerance shutdown set point is stored in variable %LTOL/SHUT 364.

"Totalizer reset" permits the operator to reset the values of RUN/TOTAL 374 and TOTAL/DATE 324 which, as previously noted, are used to keep track of the amount of material run through feeder 106 since the time and date values stored in TOTAL/DATE 324 were last reset.

"System security" permits the operator to change the security code utilized by the system to prevent unauthorized access to certain functions associated with the operation of unit 100. The security code is stored in variable SECUR 356.

Once the operator has completed the display/update of the feeder configuration parameters as described above, a return to the main operation screen may be effected by depressing the "Enter" key without selecting an item for update. The feeder configuration screen discussed above is used by the system whenever the mode selected, as determined by the status of variable mode 301, is gravimetric.

Assuming, volumetric mode is selected, then slightly different information would be displayed to the operator on the main operations screen. As in the case of gravimetric operation, the main operation screen for volumetric operation includes information regarding the present operation of the system, and soft key (function key) definitions for selecting operations associated with volumetric mode. Operations which may be selected, for example, include calibration (F5), refill configuration (F4), feeder configuration (F3), manual refill (F2), and run/stop (F1). Run/stop, manual refill, refill configuration, and calibration are the same as the corresponding operations referred to above in conjunction with gravimetric mode. The information displayed to the operator (on the main operations screen for volumetric mode) includes "Percent Speed," "Present Feed Rate," "Maximum Deviation," "Amount in Hopper," "Totalized Amount," "Time Date Last Reset," and "Mode of Operation." Each of these items corresponds to its identically named counterpart discussed in conjunction with main operations in gravimetric mode, with the exception of "Percent Speed."

"Percent speed" is used by the system for determining the speed at which feeder 106 will operate in volumetric mode. The value specified is expressed in terms of a percent of the maximum speed of feeder 106 and is operator entered from the configuration screen, as will be explained.

If the unit is operating in the volumetric mode, feeder configuration parameters may be displayed and selectively updated by depressing F3 from the main operations screen. The configuration parameters (headings) include: "Mode Select," "Address of Unit," "Percent Speed of Slave," "Slave," "Speed Percentage," "High Out of Tolerance Alarm," "Low Out of Tolerance Alarm," "High Out of Tolerance Shutdown," "Low Out of Tolerance Shutdown," "Totalizer Reset," and "System Security." Each value/option displayed is assigned a numeric value which, when entered by the operator, permits the operator to selectively change the value of the option chosen (or initiate the corresponding function. Striking the "Enter" key without selecting an option causes the system to exit the feeder configuration parameter menu. With the exception of "Speed Percentage" (corresponding with percent speed referred to above), each of the values/options displayed is again the same as in gravimetric mode.

The value of "speed percentage" is stored in FEED/RATE 368. The speed percentage parameter permits the operator to select the speed at which feeder 106 will operate. As previously noted, this value is expressed in terms of a percent of the maximum speed established for the unit. Upon return to the main operations screen, the value of FEED/RATE 368 will be displayed to the operator as "percent speed."

Assuming batch mode is selected, the main operation screen for batch operations will be displayed. The values displayed include: "Amount to Batch," "Amount Last Batched," "Maximum Deviation," "Amount in Hopper," "Totalized Amount," "Time Date Last Reset," and "Mode of Operation." The items displayed, except "Amount to Batch" and "Amount Last Batched," correspond to the identically named counterparts described in conjunction with the main operations screen for gravimetric mode operation.

"Amount to batch" refers to the size of a batch, expressed in terms of weight, to be discharged by the unit during a single batching operation. The value of amount to batch is stored in FEED/RATE 368.

"Amount last batched" refers to the amount of material (weight) discharged during the last full batching operation (the last batch cycle) and is stored in the variable O/RUN/TOTAL 384.

The function key definitions are also displayed to the user as a part of the main operations screen in batch mode. Function keys F1 (Run/Stop), F2 (Manual Refill), F4 (Refill Configuration), and F5 (Calibration) all effect the same functions described in conjunction with the main operation screens of the gravimetric and volumetric modes. Function key F3 (Feeder Configuration) permits the operator to display/selectively update the feeder configuration parameters for the operation in the batch mode.

Feeder configuration parameters displayed on the feeder configuration menu for batch mode include "Mode Select," "Address of Unit," "Percent Batch of Slave," "Amount to Batch," "Percent High Speed Batching," "Percent Low Speed Batching," "Amount to Batch at a Low Speed," "Early Batch Cutoff," "Pre-Batch Agitation Time," "Agitation Start-End Weights," "Maximum Batch Time," "Reset Maximum Batch Deviation," "High Out of Tolerance Alarm," "Low Out of Tolerance Alarm," "High Out of Tolerance Shutdown," "Low Out of Tolerance Shutdown," "Totalizer Reset," and "System Security." The feeder configuration menu permits the user to select each item on the screen for update. Accordingly, each item is assigned a numerical value for entry by the operator.

Figure 26:
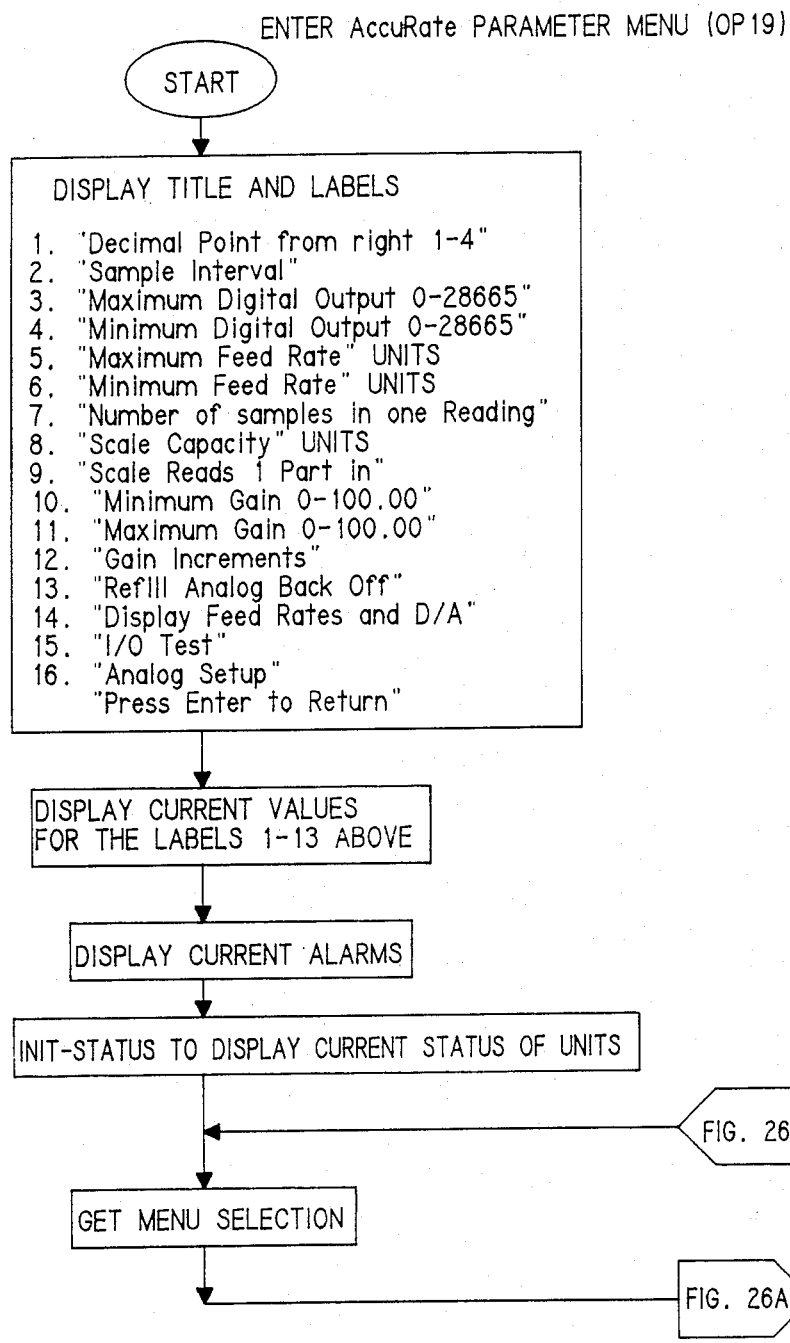
Figure 26A:
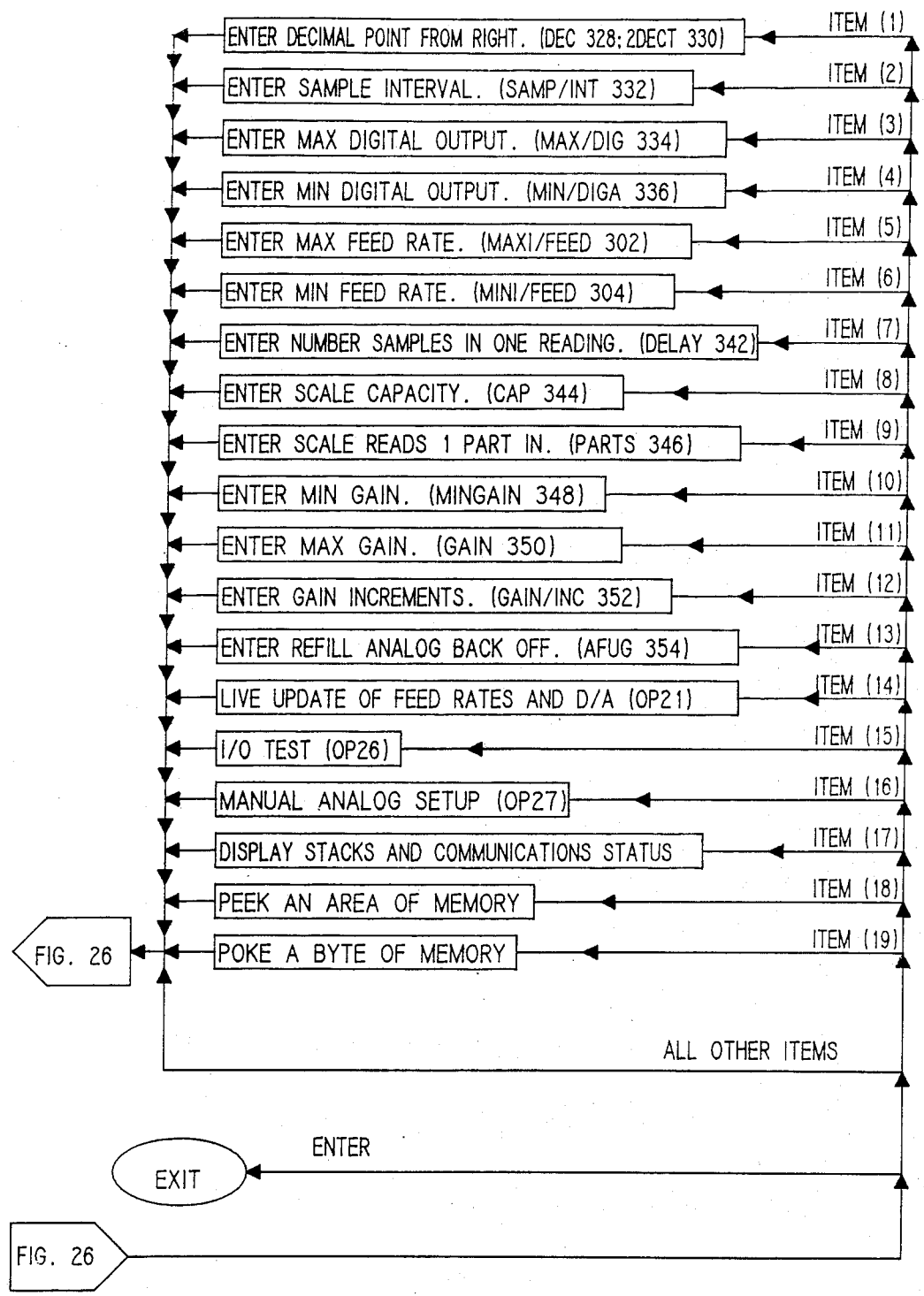
Figure 27:
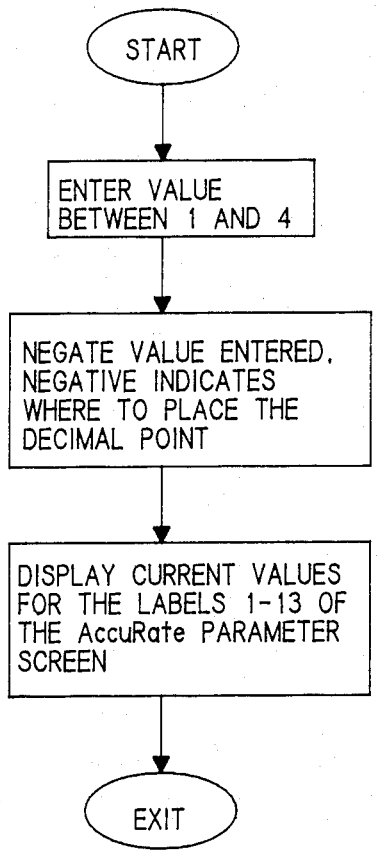
Figure 28:
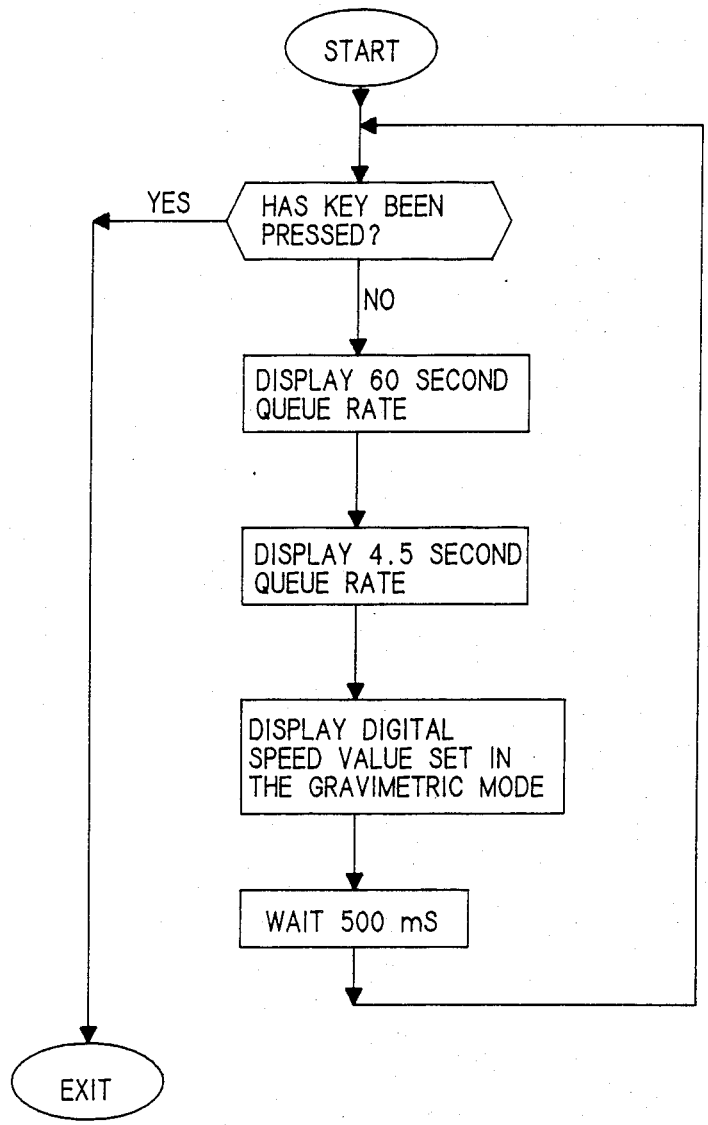
Figure 29:
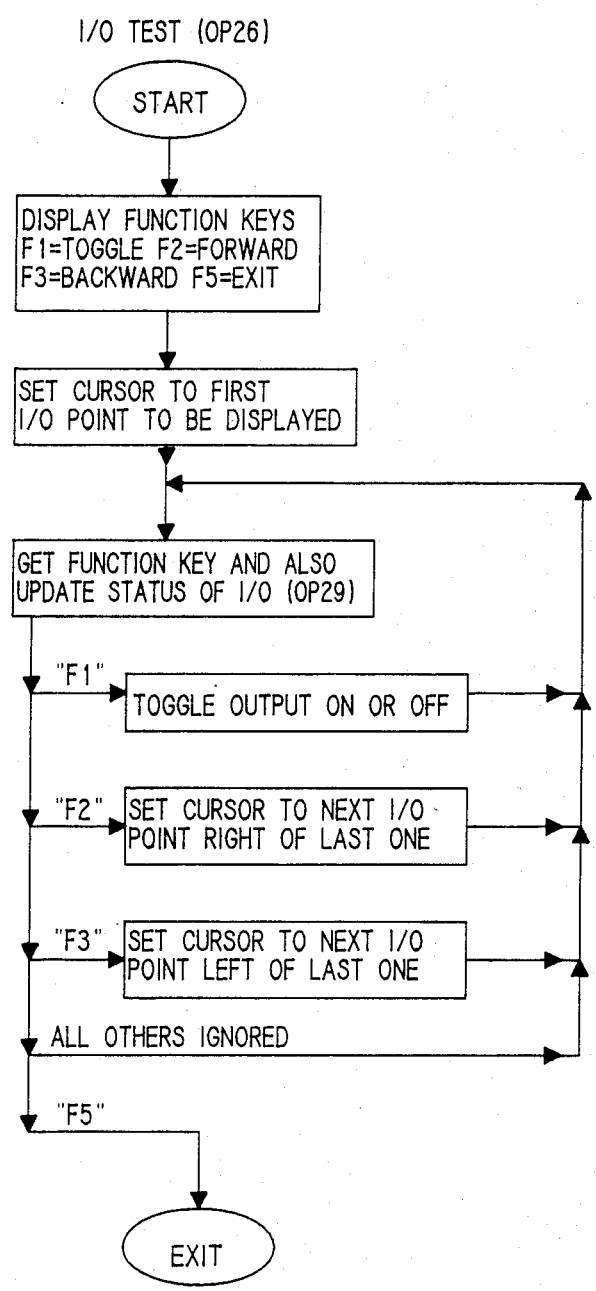
Figure 30:
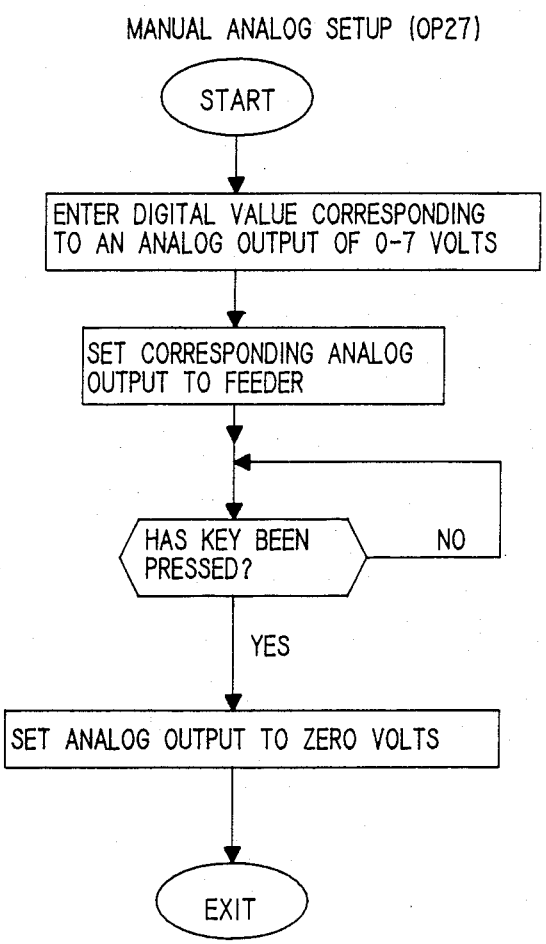
Figure 31:
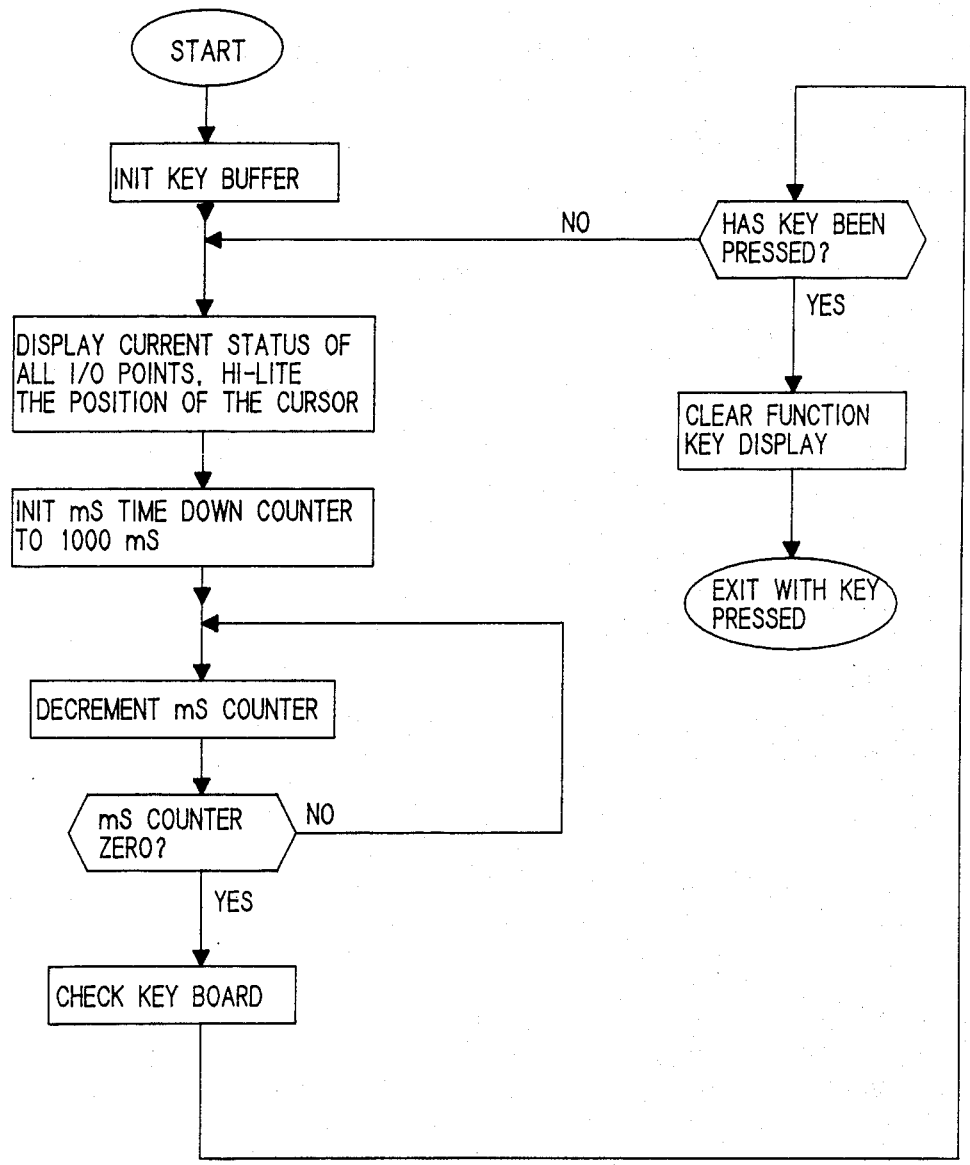
Figure 32:
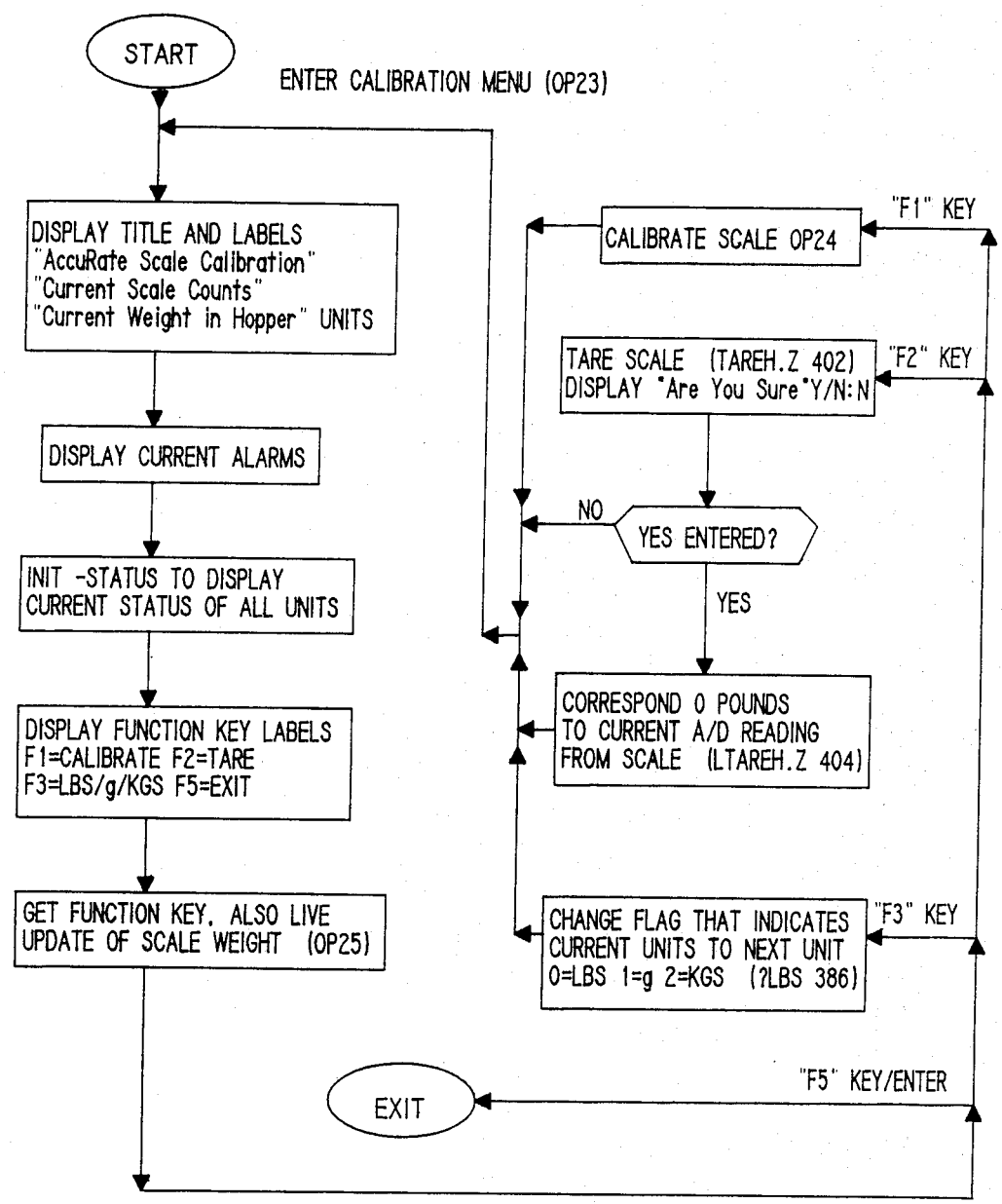
Figure 33:
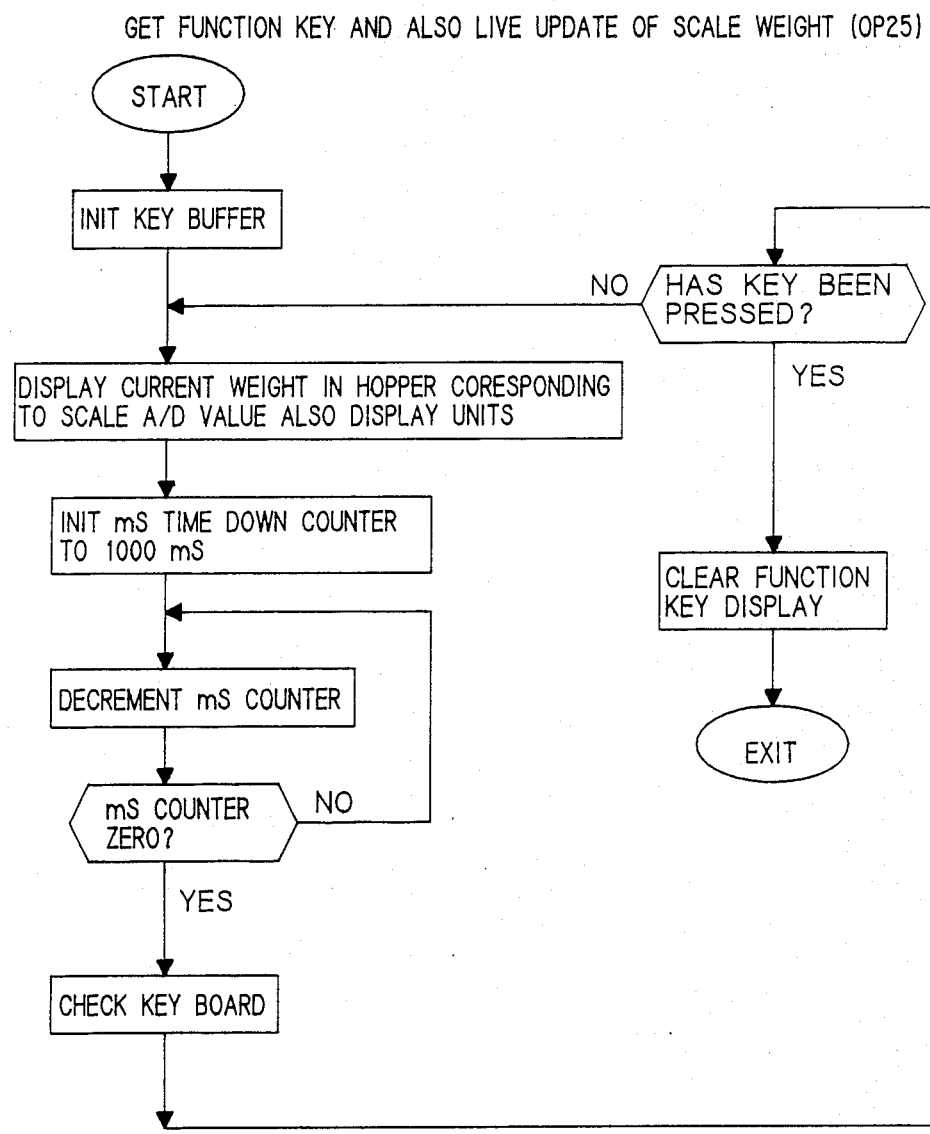
Figure 34:
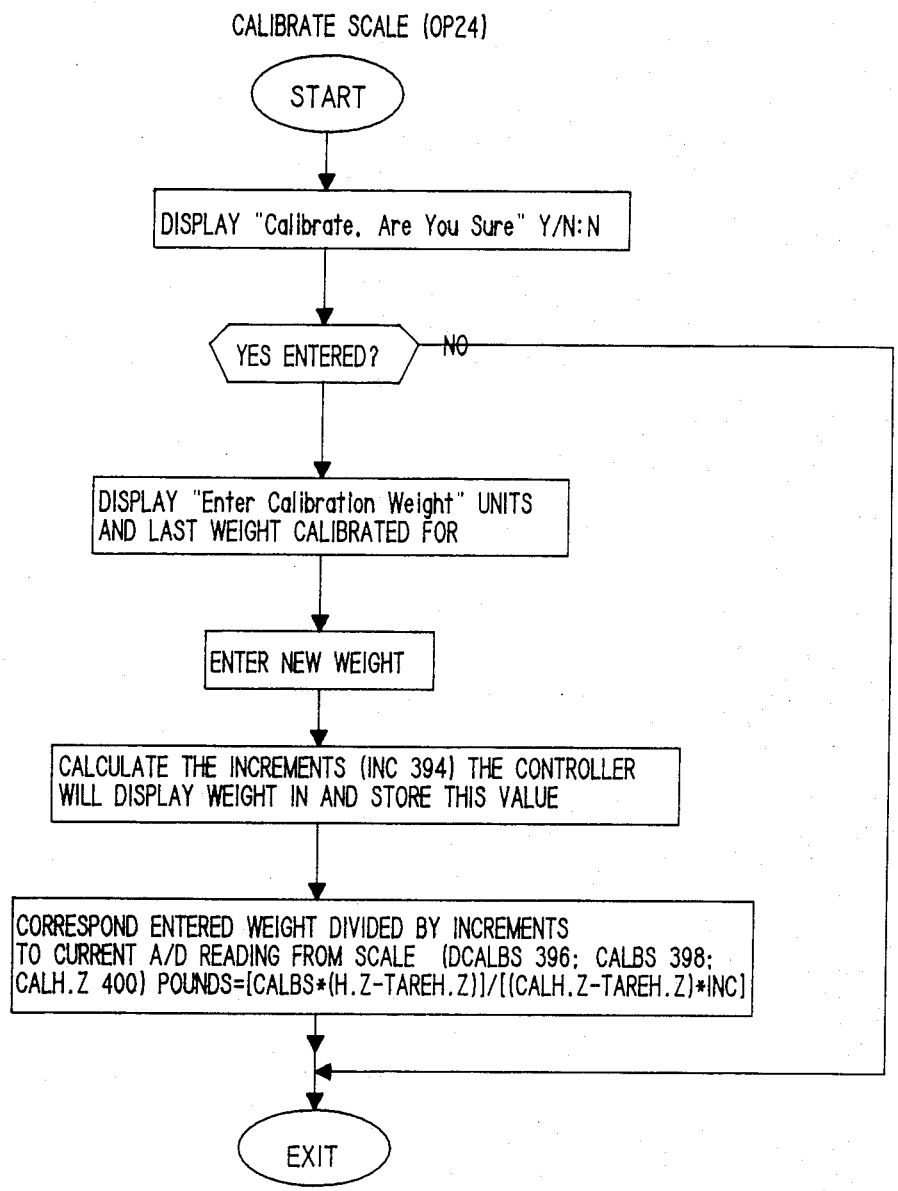
Figure 35:
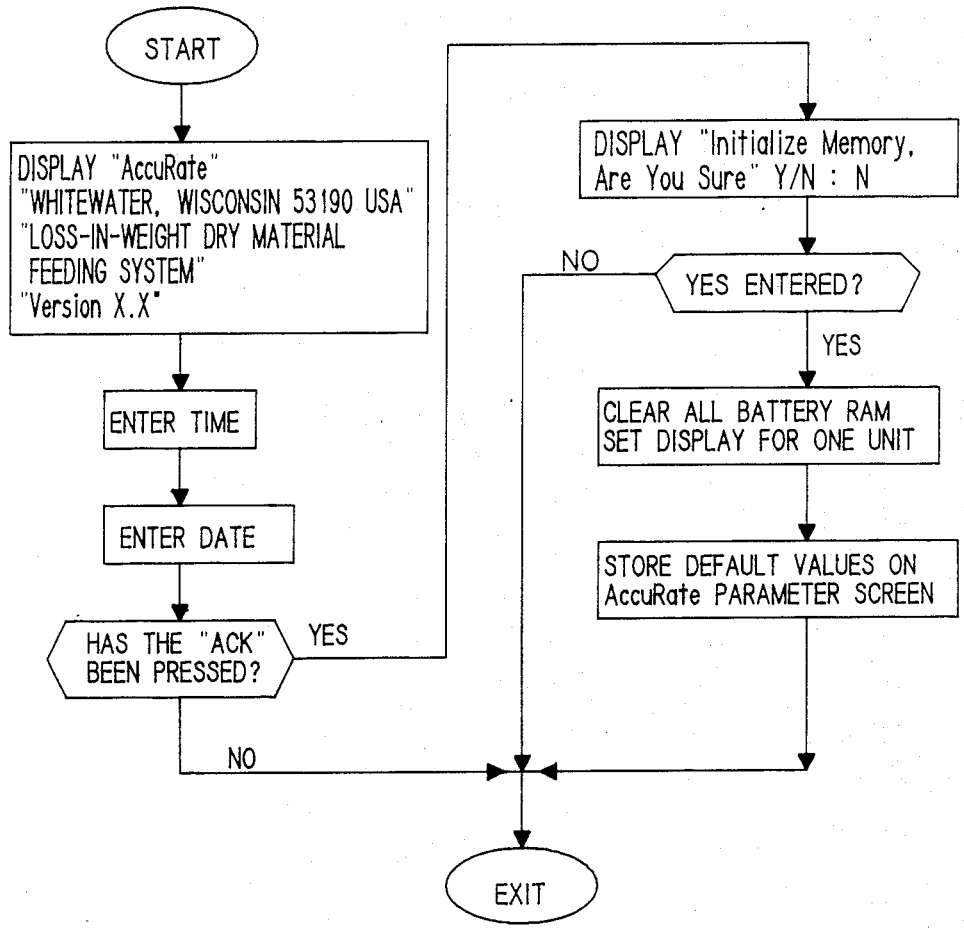

The final operator interface screen, which permits the operator to selectively enter data common to each of the three modes discussed hereinabove, is referred to as the "Parameters Menu". The Parameters Menu displays information regarding many of the operational parameters used by the system and permits the operator to selectively update those values. These parameters are illustrated in conjunction with FIGS. 26 and 26A.

The rate determination function in accordance with the preferred embodiment of the present invention is performed by the rate queue update task in conjunction with the feeder control task. This function is implemented through the use of a series of queues, including associated accumulators and counters. Their interrelationship will now be described.

Figure 2:
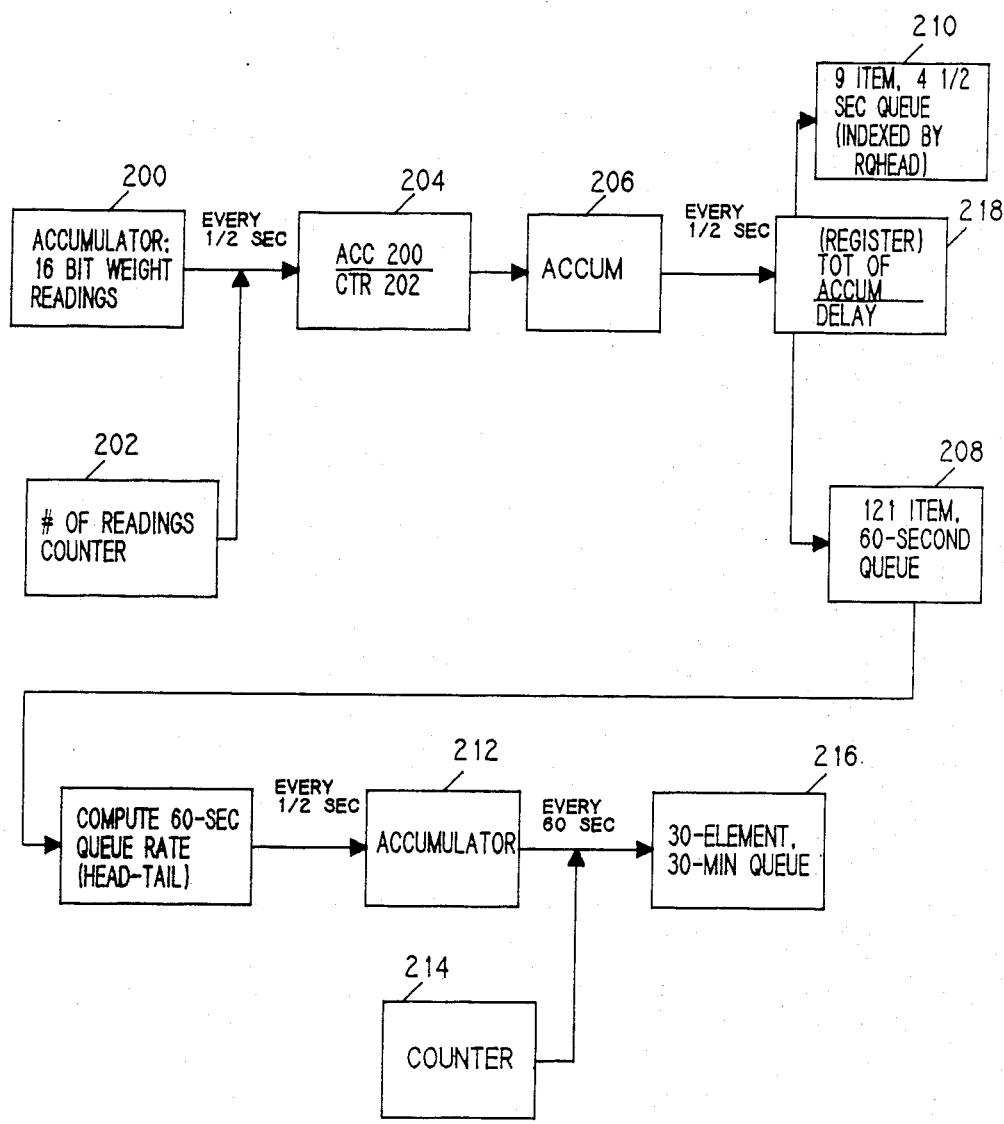
FIG. 2 is a block diagram of a rate queue update task in accordance with one aspect of the present invention.
Figure 3D:
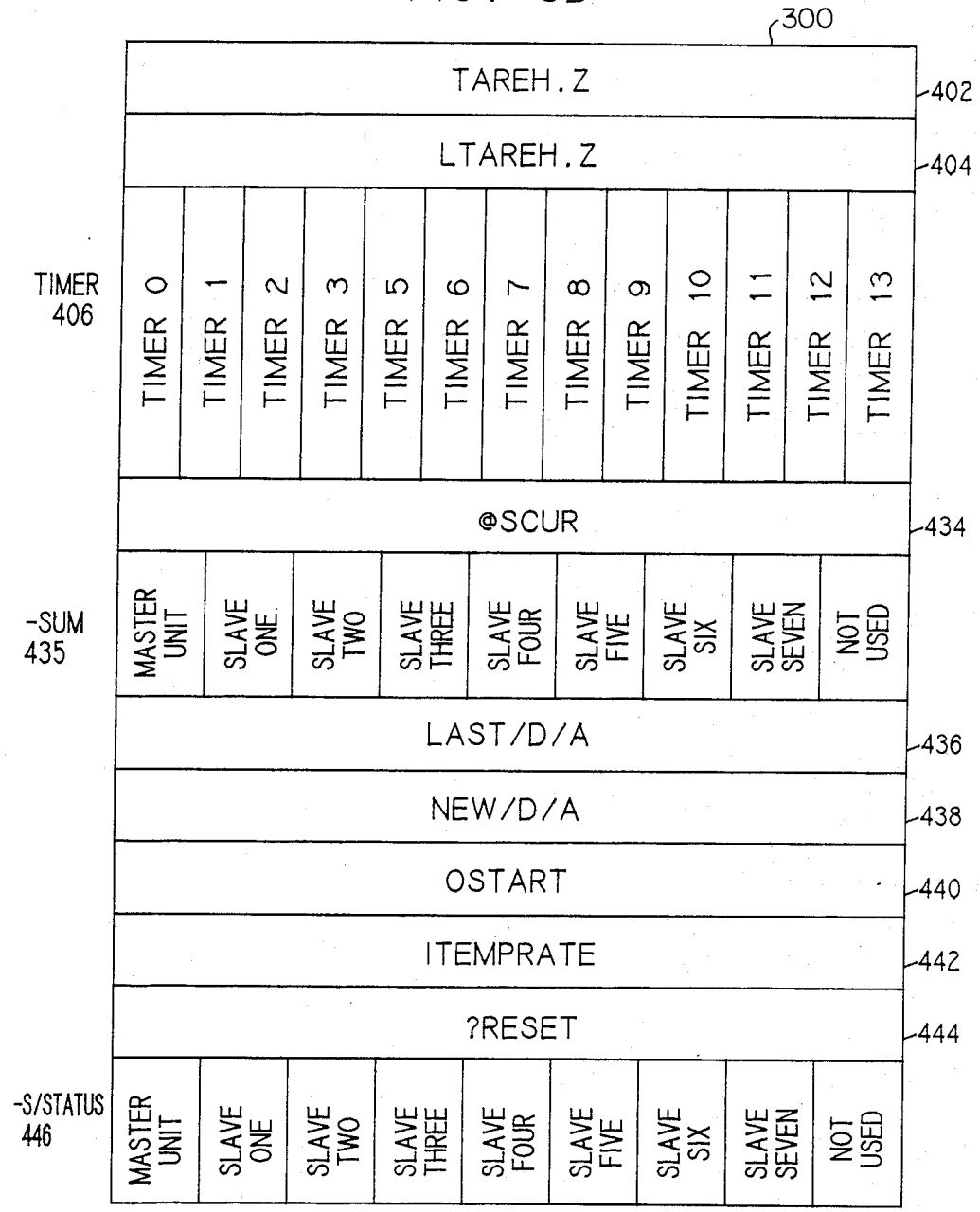
Figure 3F:
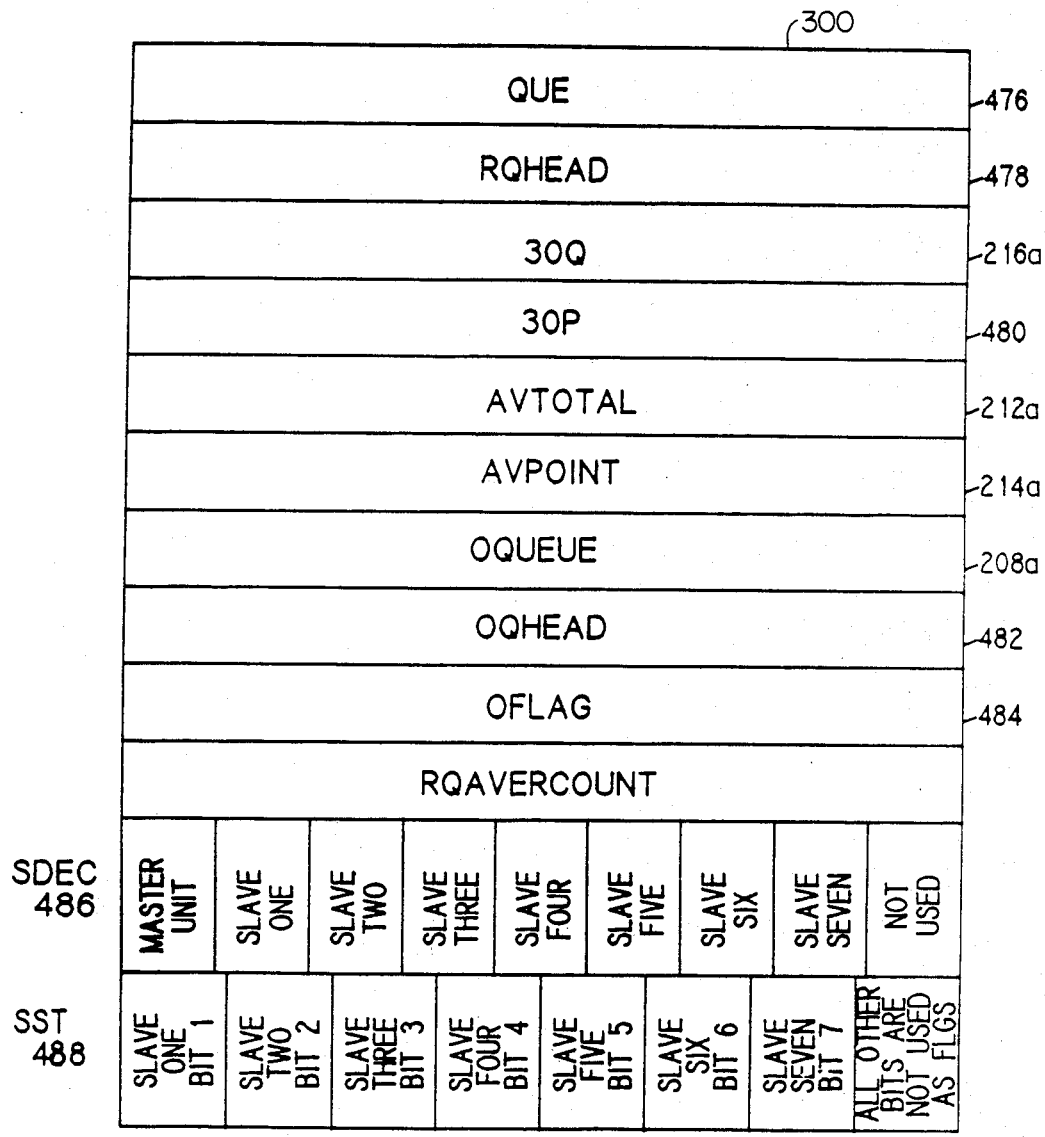
Figure 3H:
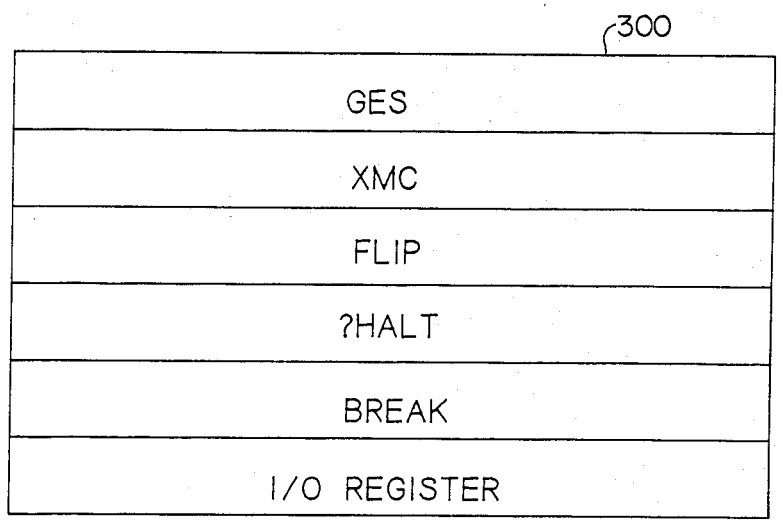

With specific reference to FIG. 2, the rate determination function preferably includes accumulator 200 (also referred to as 2H.Z), counter 202 (also referred to as 1H.Z), register 204 (also referred to as H.Z), variable length array (queue) 206 (also referred to as ACCUM), 60-second queue 208 (also referred to as OQUEUE), a 9-element, 4½-second queue 210 (also referred to as RQUEUE), accumulator 212 (also referred to as AVTOTAL) and associated counter 214 (also referred to as AVPOINT), and 30-minute queue 216 (also referred to as 30Q).

As previously noted, output signals are produced by the load cell of scale 108 as material is being discharged from feeder 106. The analog signal is then digitized by successive approximation A/D converter 116 to produce a series of digital values which are accumulated in accumulator 200. Counter 202 is incremented each time an additional reading from A/D converter 116 is accumulated into accumulator 200. Every half second, the contents of accumulator 200 is divided by the value of counter 202 to obtain an average weight reading for the values collected over the preceding half second. That average value is stored in register 204. The average weight value in register 204 is next copied into queue 206. This also occurs at the end of each half second interval.

Queue 206 is a continuous queue containing elements 0–19. The length of queue 206 depends on how many half second readings are necessary to generate a stable average value. Ideally, queue 206 would contain a single element; the fewer elements comprising the array the more responsive the array becomes to weight changes. However, it is ordinarily necessary to agitate the material in the hopper, resulting in vibration which tends to produce occasional spurious rate readings. Collecting a plurality of samples smoothes the affect of deviant samples. In practice, a queue length of between four and nine elements tends to produce the best results, although up to 19 elements remain available if required.

In a continuous queue, such as queue 206, as each average value from register 204 is read into queue 206, it becomes the last value in the queue (the tail). At that time, it has an index value of zero. Then, on the occurrence of each subsequent half second interval, each of the elements of queue 206 is copied in succession into the next position in the queue, i.e, into the position of the queue having an index value which is one greater than the place in the queue from where it has been transferred. The element of the queue having the highest index value, i.e., 4 in a 5-element queue, is known as the head of the queue. Until the queue is filled, the element having the highest index value is treated as the head of the queue. Once the queue is filled, then as each half second interval elapses and the queue accordingly updated, the element then at the head of the queue is eliminated from the queue.

A register 218 is employed to sum the elements of queue 206. After each half second interval, the values contained in queue 206 are averaged. The length of queue 206, which is initially supplied by the operator (one of the elements supplied by the operator in conjunction with the system "parameters menu"), is stored in variable DELAY 342. Register 218 is divided by the value of DELAY 342 to produce the average value. The averaged value is then copied into queue 208, which is a 121-element (60-second) continuous queue containing averaged values collected over the preceding 60 seconds, and into 9-item queue 210. Queue 210 is also a continuous queue, and contains averaged weight readings (average of queue 206) collected over the preceding 4½ seconds.

Each half second, the tail of 60-second queue 208 (normally the smallest value in the queue during dispensing) is subtracted from the head of queue 208 normally the largest value in the queue) to establish a single arithmetric rate value for the immediately preceding 60-second time interval (60-second queue rate). The 60-second queue rate (head minus tail) is then added to the contents of accumulator 212. Counter 214 is then incremented to reflect the number of values which have been accumulated. Every 60 seconds (i.e., after 120 new elements have been accumulated in accumulator 212), the value of accumulator 212 is divided by the value of counter 214 and the resulting value (average) is copied into 30-element, 30-minute queue 216. Queue 216 is used by the system to compute the two-standard deviation value previously discussed, which is stored in MDEV 372.

In general, the system attempts to operate at the rate designated by FEED/RATE 368. As deviations from the desired feed rate are detected, signals are produced and applied to the motor control card through D/A converter 144 to effect a speed change to feeder 106. The operation of the rate computation and speed change function will now be described.

The present invention advantageously controls the operation of feeder 106 so that, over time, the desired or optimal feed rate can be achieved. In general, feeder unit 100 employs an adaptive gain system. "Gain" in this sense is an incremental increase or decrease to the rate at which feeder 106 is operating. The adjustment is made in accordance with the magnitude of the difference between the 60-second queue rate and the operator-entered feed rate set point (FEED/RATE 368). The actual gain used by the system is equal to the lesser of a preset minimum gain plus the incremental gain just noted, or a preset maximum gain. The incremental gain is determined by multiplying the magnitude of the difference between the 60-second queue and the preset feed rate by a preset increment of gain, scaling the differential by an amount selected by the operator.

Accuracy and reliability of loss-in-weight feeders made in accordance with the present invention are both materially improved by virtue of such an adaptive gain system, conforming actual feed rate with desired feed rate. This is achieved, in one aspect of the present invention, on a basis which approaches real time by computing a correction signal based on a proportionated deviation signal determined as a time-weighted variable which is a function of the detected variations in actual feed rate. Time weighting, observed data, and proportionated control of correction signals combine to improve the operational efficacy of the system.

The foregoing aspect of the invention is implemented, in a highly-preferred embodiment thereof, using a combination of operator-entered data in the form of setpoints and minimum/maximum allowable variations which are compared to data representative of samples processed through queues in which reside temporarily updated data representative of actual conditions. As previously noted, a setpoint (FEED/RATE 368) is entered by the operator to establish a desired feed rate of material from the loss-in-weight feeder. When the system detects a deviation from the desired rate, it is necessary to adjust the actual feed rate to some point above or below the desired rate depending on the nature of the deviation from the target rate. The instant system approach also takes into account the fact that a period of time has elapsed in which the flow of material occurred at a rate other than the desired rate; if the system were only to change the rate of discharge to the target rate, it would not be able to compensate for the period during which the actual rate varied from the target rate. For example, if the target rate was ten pounds per minute, and for six seconds the actual rate was nine pounds per minute, then the total amount discharged over the six-second period would be 0.9 pounds when one pound should have been discharged. To adjust the rate of feeder 106 back to ten pounds per minute would not cure the deficiency. This situation is addressed in another aspect of the present invention, by dynamically altering the target rate.

In accordance with this aspect of the invention, the 60-second queue is utilized to establish a 60-second queue rate as the simple arithmetic difference between first and last data entries therein, reflective of the actual conditions over the 60-second period of interest. A deviation (D) is computed as the difference between the setpoint (SP) and the 60-second queue rate (60q).

$$D = SP - 60q \qquad (1)$$

It is preferred to correct the output of the feeder by altering the fed rate in a proportioned amount. An initial step in determining the appropriate correction or error signal is the computation of a temporary adjusted setpoint (TASP). This value is ascertained through a multistep calculation and comparison, beginning with a scaling generally proportional to the desired degree of accuracy in the system. Scaling also reflects boundary conditions to be established on acceptable variations for the correction factor. This initial scaling step is achieved by dividing FEED/RATE 368 (FR below) by a constant, empirical factor reflective of these boundary conditions. In accordance with a highly-preferred embodiment of the present invention, in which an output accuracy on the order of about ½% is desired, FEED/RATE 368 is divided by the factor of 200 to obtain a comparative variable U:

$$\frac{FR}{200} = U \qquad (2)$$

FR = U (2)

In an alternative embodiment of the present invention, the above-described empirical factor may be operator entered. In this manner, its value may be selectively altered to further tailor the rate computation process to fit the particular conditions of the user's environment.

The factor U is then compared to the deviation D determined in equation (1) to calculate TASP. More specifically, if U is less than the absolute value of D, then:

$$TASP = FR + U \quad (3); \text{ or}$$

if U is greater than or equal to the absolute value of D calculated in equation (1), then:

$$TASP = FR + D \quad (4)$$

An error signal is developed on the basis of both the temporary setpoint determined in accordance with the foregoing conditions and a value which is a function of the time-weighted data representative of the actual conditions occurring in the discharge of substance from the loss-in-weight feeder. These time-weighted values are obtained from the 4½-second queue based on the following polynomial expansion:

Assume: Nine values representing weight samples ($b_1$–$b_9$) are developed over a 4½ second period, one each half second;
For time (t) = 0 → 4.0 (in half second increments),
t(0.0); $b_9$
t(0.5); $b_8$
t(1.0); $b_7$
t(1.5); $b_6$
t(2.0); $b_5$
t(2.5); $b_4$
t(3.0); $b_3$
t(3.5); $b_2$
t(4.0); $b_1$ Then:

$$(b_9 - b_1) + (b_9 - b_2) + (b_9 - b_3) + (b_9 - b_4) + (b_9 - b_5) + (b_9 - b_6) + (b_9 - b_7) + (b_9 - b_8) + \quad (5)$$
$$(b_8 - b_1) + (b_8 - b_2) + (b_8 - b_3) + (b_8 - b_4) + (b_8 - b_5) + (b_8 - b_6) + (b_8 - b_7) +$$
$$(b_7 - b_1) + (b_7 - b_2) + (b_7 - b_3) + (b_7 - b_4) + (b_7 - b_5) + (b_7 - b_6) +$$
$$(b_6 - b_1) + (b_6 - b_2) + (b_6 - b_3) + (b_6 - b_4) + (b_6 - b_5) +$$
$$(b_5 - b_1) + (b_5 - b_2) + (b_5 - b_3) + (b_5 - b_4) +$$
$$(b_4 - b_1) + (b_4 - b_2) + (b_4 - b_3) +$$
$$(b_3 - b_1) + (b_3 - b_2) +$$
$$(b_2 - b_1)$$

The entire expansion may then be reduced algebraically to the factor:

$$4\tfrac{1}{2}q = 8(b_9 - b_1) + 6(b_8 - b_2) + 4(b_7 - b_3) + 2(b_6 - b_4) \quad (6)$$

Time weighting is reflected in two aspects of equation (6). First, the expansion term ($b_9 - b_1$) is anticipated to have the greatest value of all expanded terms because it represents the widest variation in time over which weight samples are taken. Under steady state conditions, therefore, the greatest amount of material is likely to be discharged from the feeder over that greatest time interval, and the differential in weight thus is anticipated to be the greatest. Second, that term has the greatest multiplying factor (8), which further increases the weighting of that element in the equation.

With that understanding, an error factor is computed as the difference between the temporary setpoint and the 4½-second queue rate, as follows:

$$E = TASP - 4\tfrac{1}{2}q \quad (7)$$

For the reasons mentioned above, application of the entire error signal as a correction factor is to be avoided; a proportionated factor (PF) is applied to avoid undesirably broad fluctuations. That proportionating factor is most preferably determined as a function of the deviation determined by equation (1) in comparison with minimum and maximum gains established by the operator. In this example, the absolute value of the deviation is multiplied by a power of ten sufficient to eliminate the decimal places. More specifically, if the controller is designed to provide three significant places beyond the decimal point, the absolute value of the deviation is multiplied by 1,000. The result is multiplied by an operator-inputted parameter corresponding to a desired incremental gain to yield a threshold proportioning factor (B) in accordance with the following:

$$(D \times 10^x)\text{GAIN/INC (location 352)} = B \quad (8)$$

wherein x represents the number of significant figures in the decimal places of the computed factor "D."

A minimum gain is necessary in accordance with the described embodiment to ensure proper operation. Thus, B is added to a minimum gain factor, which is also an operator-inputted variable (MINGAIN 348), such that $$B + \text{MINGAIN} = C \quad (9)$$

The computed proportioning factor is then compared against the maximum gain value (GAIN) permitted by the system, once again as a boundary condition. If the computed factor C is greater than the maximum gain, then the proportioning factor is set to be equal to the maximum gain (i.e., PF = GAIN); if the computed factor C is less than or equal to the maximum gain, its value is applied as the proportioning factor (i.e., PF = C).

At this juncture, a correcting value may be computed as the simple product of the error (E) from equation (7) times the proportioning factor developed immediately aforesaid. Thus, the correction factor ("CF") becomes:

$$PF \times E = CF \quad (10)$$

A signal characteristic of the correction factor CF, once converted to a digital value which is in the range required by D/A 144, is applied to adjust the output of the loss-in-weight feeder to bring actual output into conformity with desired output. It is a signal which is developed at a rate selected by the operator of the system. The time between computations of the correction factor for the feed rate will vary depending upon material to be discharged, ambient conditions, and other factors known to those of skill in the art, which impact on the characteristics of the substance being discharged. Computing the factor too quickly, i.e., too often over the course of a discharge cycle, creates a situation of unnecessarily close control and the possibility of hunting, or overcompensation because of an inability of the 4½-second queue to approximate properly the anticipated occurrences over the 60-second queue. On the other hand, awaiting computation too long a time can result in unnecessarily prolonging the time period between required corrections. The proper selection of a time interval for computation is well within the skill of those operating the systems based upon the exigencies at hand; a time between computations on the order of about 2½ seconds being considered average under most operating conditions (it being conceivable, however, that the output correction signal may be computed as often as every ½ second or, perhaps, over time intervals approaching one minute.)

While the present invention has now been described with reference to certain preferred embodiments, those skilled in the art will appreciate the various substitutions, changes, modifications and omissions may be made without departing from the spirit thereof. Accordingly, the foregoing description should be viewed merely as exemplary and not as limitative on the scope of the following claims.

What is claimed is:

1. A loss-in-weight feeder for discharging a flowable substance from a reservoir through a controllable discharge member under regulated conditions, comprising:
   scale means for developing a weight signal representative of the weight of at least the material being discharged from said reservoir;
   digital converting means in operative communication with said scale means for sampling said weight signal and developing digital weight signals representative thereof at a predetermined sampling rate;
   storage means in operative communication with said digital converting means for accumulating said digital weight signals;
   computing means in operative communication with said digital converting means for developing arithmetic average weight signals from said digital weight signals representative of the actual feed rate from said reservoir;
   input means, operatively associated with said storage means, for entering a signal representative of the desired feed rate from said reservoir into said storage means;
   said computing means also being used for developing a correction signal based on a proportioned deviation signal determined as a time-weighted variable which is a function of any deviation between the actual feed rate and the desired feed rate; and
   feedback means communicating with said computing means for applying said correction signal to said feeder to adjust the actual feed rate through said discharge member.

2. The loss-in-weight feeder of claim 1, wherein said predetermined time intervals are about one half second in duration.

3. The loss-in-weight feeder of claim 1, wherein said digital converting means for sampling said weight signal comprises a 16-bit successive approximation analog-to-digital converter.

4. The loss-in-weight feeder of claim 3, wherein an active low pass filter is interposed between said scale means and said analog-to-digital converter.

5. The loss-in-weight feeder of claim 1, wherein said scale means is a mechanically counterbalanced flexure type scale.

6. The loss-in-weight feeder of claim 5, wherein said scale includes a weight-to-electrical transducer having a linear conversion characteristic.

7. The loss-in-weight feeder of claim 6, wherein said transducer is a copper berylium flexure strain gauge.

8. The loss-in-weight feeder of claim 1, wherein said computing means for developing arithmetic weight signals includes:
   first means for developing a first arithmetic weight signal over each of a plurality of predetermined time intervals, representative of the actual feed rate from said reservoir during each of said time intervals, and
   second means for developing a second arithmetic weight signal, representative of the actual feed rate from said reservoir over a plurality of said time intervals.

9. The loss-in-weight feeder of claim 8, wherein said storage means for accumulating said digital weight signals comprises at least one queue.

10. The loss-in-weight feeder of claim 9, wherein said second means includes a first of said queues.

11. The loss-in-weight feeder of claim 10, wherein said second arithmetic signal is computed as the difference between an element of said first queue which is the earliest in time and an element of said first queue which is the latest in time.

12. The loss-in-weight feeder of claim 11, wherein each element of said first queue is derived from said first arithmetic weight signals.

13. The loss-in-weight feeder of claim 10, wherein a signal representative of the instantaneous rate from said reservoir is derived from a second of said queues, said signal having a value time-weighted in favor of the greatest temporal expanse of data in said second queue, said value further including at least one set of data having a lesser temporal expanse.

14. The loss-in-weight feeder of claim 13, wherein said second queue is an "n" element queue and said value is derived in accordance with the expanded polylnominal:

$$w(b_n - b_m) + x(b_n - 1 - b_{m+1}) + y(b_{n-2} - b_{m+2}) \ldots z(b_{n-1} - b_{m+i}),$$

wherein:
   w, x, y and z are constants;
   b represents a data point resident in an element in said queue;
   n is the highest number of elements in said queue;
   m is the lowest element in said queue; and
   i is an integer which terminates the polynomial in accordance with the relationship between the terms n−i and m+i.

15. The loss-in-weight feeder of claim 14, wherein each of said first and second queues is a continuous queue, and further wherein the instantaneous rate signal is derived as a signal having a value determined as:

$$4\tfrac{1}{2}q = 8(b_9 - b_1) + 6(b_8 - b_2) + 4(b_7 - b_3) + 2(b_6 - b_4)$$

16. The loss-in-weight feeder of claim 15, wherein an error factor "E" is computed in accordance with the relationship:

$$E = TASP - 4\tfrac{1}{2}q$$

wherein:
TASP is a calculated value determined as the lesser of the difference between said second arithmetic weight signal and said desired feed rate and said desired feed rate divided by an empirically determined factor.

17. The loss-in-weight feeder of claim 16, wherein said correction signal is derived from a correction factor, CF, determined in accordance with the relationship.

$$CF = PF \times E$$

wherein PF is a proportionating factor less than unity.

18. The loss-in-weight feeder of claim 18, wherein said proportionating factor has a value determined to be the lesser of:
 (a) the sum of (1) the product of (A) an operator-entered data value representative of a selected increase or decrease to the speed of said feeder output and (B) the difference between (i) the value of said second arithmetic weight signal and (ii) the value of a signal characteristic of said desired feed rate and (2) an operator-entered value representative of a selected minimum gain; and
 (b) an operator-entered value representative of a selected maximum allowable gain.

19. A method for adjusting the rate in a loss-in-weight feeder comprising the steps of:
 developing a series of weight signals representative of the average weight of material discharged by said feeder during each of a plurality of time intervals of predetermined length;
 storing said averaged weight signals in a plurality of rate queues:
 computing a value representative of the actual rate of said feeder from elements comprising a first of said rate queues;
 determining the degree of deviation between an operator entered set point and said actual rate;
 selecting a temporary set point as the lesser of said deviation and an empirically determined value;
 computing a second rate representative of the instantaneous rate of said feeder based on the values comprising a second of said rate queues;
 computing an error factor as the difference between said temporary set point and said second rate;
 computing a proportioning factor as the product of an operator entered variable representative of gain and the difference between said operator entered set point and said actual rate;
 adding to said proportioning factor an operator entered value representative of minimum gain to determine total gain;
 comparing said total gain with an operator entered value representative of maximum gain;
 computing a correction factor as the product of the lesser of said total gain and said maximum gain and said value representative of the difference between said temporary set point and said rate; and
 generating a signal representative of said correction factor to adjust the rate in said feeder.

* * * * *